US010532310B2

(12) United States Patent
Burton et al.

(10) Patent No.: US 10,532,310 B2
(45) Date of Patent: Jan. 14, 2020

(54) FILTER CARTRIDGES; AIR CLEANER ASSEMBLIES; HOUSINGS; FEATURES; COMPONENTS; AND, METHODS

(71) Applicant: Donaldson Company, Inc., Minneapolis, MN (US)

(72) Inventors: David J. Burton, Minneapolis, MN (US); Hubert Julius Rahn, Minneapolis, MN (US)

(73) Assignee: Donaldson Company, Inc., Minneapolis, MN (US)

(*) Notice: Subject to any disclaimer, the term of this patent is extended or adjusted under 35 U.S.C. 154(b) by 183 days.

(21) Appl. No.: 15/539,600

(22) PCT Filed: Dec. 23, 2015

(86) PCT No.: PCT/US2015/000452
§ 371 (c)(1),
(2) Date: Jun. 23, 2017

(87) PCT Pub. No.: WO2016/105560
PCT Pub. Date: Jun. 30, 2016

(65) Prior Publication Data
US 2019/0111374 A1 Apr. 18, 2019

Related U.S. Application Data

(60) Provisional application No. 62/097,060, filed on Dec. 27, 2014.

(51) Int. Cl.
*B01D 45/18* (2006.01)
*B01D 46/52* (2006.01)
(Continued)

(52) U.S. Cl.
CPC ........... *B01D 46/526* (2013.01); *B01D 45/12* (2013.01); *B01D 45/14* (2013.01);
(Continued)

(58) Field of Classification Search
CPC .. B01D 46/526; B01D 46/26; B01D 46/0005; B01D 46/0023; B01D 50/002;
(Continued)

(56) References Cited

U.S. PATENT DOCUMENTS 4,925,561 A 5/1990 Ishii et al.
5,049,326 A 9/1991 Matsumoto et al.
(Continued)

FOREIGN PATENT DOCUMENTS

DE  20 2006 020 287     3/2008
DE     202008017059 U1  5/2010
(Continued)

OTHER PUBLICATIONS

International Search Report and Written Opinion for PCT/US2015/000452 dated Jun. 17, 2016.
(Continued)

*Primary Examiner* — Dung H Bui
(74) *Attorney, Agent, or Firm* — Merchant & Gould P.C.

(57) ABSTRACT

Air cleaner assemblies, components, features and methods of assembly and use are described. Example air cleaner assemblies are depicted and described in which a main filter cartridge sealing surface is recessed from an open end of a housing body. An access cover of the housing is configured with a portion extending inwardly to engage a main filter cartridge portion and bias it against the main filter cartridge sealing surface. In selected assemblies, the portion of the access cover extending inwardly toward the main filter cartridge, is a precleaner having flow separator tubes therein.

19 Claims, 44 Drawing Sheets

(51) Int. Cl.
*B01D 45/12* (2006.01)
*B01D 46/00* (2006.01)
*B01D 46/10* (2006.01)
*B01D 50/00* (2006.01)
*B01D 45/14* (2006.01)
*B01D 46/24* (2006.01)
*B01D 46/26* (2006.01)
*F02M 35/02* (2006.01)
*F02M 35/024* (2006.01)

(52) U.S. Cl.
CPC ..... *B01D 46/0005* (2013.01); *B01D 46/0023* (2013.01); *B01D 46/10* (2013.01); *B01D 46/2411* (2013.01); *B01D 46/26* (2013.01); *B01D 46/525* (2013.01); *B01D 50/002* (2013.01); *F02M 35/0205* (2013.01); *F02M 35/0216* (2013.01); *F02M 35/02416* (2013.01); *B01D 46/527* (2013.01); *B01D 2265/02* (2013.01); *B01D 2267/40* (2013.01); *B01D 2271/02* (2013.01); *B01D 2271/022* (2013.01); *B01D 2279/60* (2013.01)

(58) Field of Classification Search
CPC ................ B01D 45/14; B01D 46/2411; B01D 2271/022; B01D 2265/02; B01D 2279/60; B01D 46/10; B01D 46/527; B01D 2271/02; F02M 35/0216; F02M 35/0205; F02M 35/02416
See application file for complete search history.

(56) References Cited

U.S. PATENT DOCUMENTS

| | | | |
|---|---|---|---|
| 5,562,825 A | 10/1996 | Yamada et al. | |
| 5,613,992 A | 3/1997 | Engel | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,888,442 A | 3/1999 | Kometani et al. | |
| 5,895,574 A | 4/1999 | Friedmann et al. | |
| 5,902,364 A | 5/1999 | Tokar et al. | |
| 6,039,778 A | 3/2000 | Coulonvaux | |
| D428,128 S | 7/2000 | Gillingham et al. | |
| 6,179,890 B1 | 1/2001 | Ramos et al. | |
| D437,401 S | 2/2001 | Ramos et al. | |
| 6,190,432 B1 | 2/2001 | Gieseke et al. | |
| 6,210,469 B1 | 4/2001 | Tokar | |
| 6,235,195 B1 | 5/2001 | Tokar | |
| 6,293,984 B1 | 9/2001 | Oda | |
| 6,350,296 B1 | 2/2002 | Warner | |
| 6,673,136 B2 | 1/2004 | Gillingham et al. | |
| 7,070,641 B1 | 7/2006 | Gunderson | |
| 7,247,183 B2 | 7/2007 | Connor et al. | |
| 7,625,419 B2 | 12/2009 | Nelson et al. | |
| 8,012,227 B2 * | 9/2011 | Greif | B01D 45/16 55/337 |
| 8,518,139 B2 | 8/2013 | Jessberger | |
| 8,685,130 B2 | 4/2014 | Nelson et al. | |
| 8,728,193 B2 | 5/2014 | Flagstad et al. | |
| 9,242,199 B2 | 1/2016 | Nelson et al. | |
| 9,308,482 B2 | 4/2016 | Kaiser | |
| 9,446,339 B2 | 9/2016 | Rieger et al. | |
| 9,463,404 B2 | 10/2016 | Rieger et al. | |
| 9,555,370 B2 | 1/2017 | Flagstad et al. | |
| 9,579,596 B2 | 2/2017 | Rieger et al. | |
| D810,786 S * | 2/2018 | Chen | D15/5 |
| 10,029,202 B2 | 7/2018 | Nelson et al. | |
| 2002/0124734 A1 | 9/2002 | Spannbauer | |
| 2003/0217534 A1 | 11/2003 | Krisko | |
| 2004/0187689 A1 | 9/2004 | Sporre et al. | |
| 2004/0194441 A1 | 10/2004 | Kirsch | |
| 2005/0016138 A1 * | 1/2005 | Sheidler | B01D 45/16 55/347 |
| 2005/0130508 A1 | 6/2005 | Yeh | |
| 2007/0289265 A1 * | 12/2007 | Coulonvaux | B01D 46/0023 55/324 |
| 2008/0209869 A1 * | 9/2008 | Rother | B01D 45/16 55/337 |
| 2008/0282890 A1 | 11/2008 | Rocklitz et al. | |
| 2009/0056293 A1 | 3/2009 | Styles | |
| 2009/0127211 A1 | 5/2009 | Rocklitz et al. | |
| 2010/0032365 A1 | 2/2010 | Moe et al. | |
| 2010/0258493 A1 | 10/2010 | Kindkeppel | |
| 2011/0308214 A1 | 12/2011 | Jessberger | |
| 2013/0019576 A1 * | 1/2013 | Krisko | B01D 45/16 55/357 |
| 2014/0208705 A1 | 7/2014 | Krull | |
| 2014/0251895 A1 | 9/2014 | Wagner | |
| 2014/0260143 A1 | 9/2014 | Kaiser | |
| 2014/0290194 A1 | 10/2014 | Karlheinz et al. | |
| 2014/0318091 A1 | 10/2014 | Rieger et al. | |
| 2014/0318092 A1 | 10/2014 | Rieger | |
| 2015/0013289 A1 | 1/2015 | Hasenfratz et al. | |
| 2015/0013291 A1 | 1/2015 | Neef | |
| 2016/0305375 A1 * | 10/2016 | Finn | B01D 46/0002 |
| 2017/0001134 A1 | 1/2017 | Rieger et al. | |
| 2017/0175685 A1 | 6/2017 | Metzger | |
| 2017/0234277 A1 | 8/2017 | Flagstad et al. | |

FOREIGN PATENT DOCUMENTS

| | | |
|---|---|---|
| DE | 10 2009 009 066 | 8/2010 |
| WO | WO 97/40918 A1 | 11/1997 |
| WO | WO 03/047722 A2 | 6/2003 |
| WO | WO 03/084641 A2 | 10/2003 |
| WO | WO 2004/007054 A1 | 1/2004 |
| WO | WO 2004/082795 A2 | 9/2004 |
| WO | WO 2005/077487 A2 | 8/2005 |
| WO | WO 2005/094665 A2 | 10/2005 |
| WO | WO 2008/106375 | 9/2008 |
| WO | WO 2009/033040 | 3/2009 |
| WO | WO 2014/210541 | 12/2014 |
| WO | WO 2016/034657 | 3/2016 |
| WO | WO 2016/077377 A1 | 5/2016 |

OTHER PUBLICATIONS

Allowed claims for U.S. Appl. No. 15/417,389 (corresponds to US 2017/0234277).

* cited by examiner

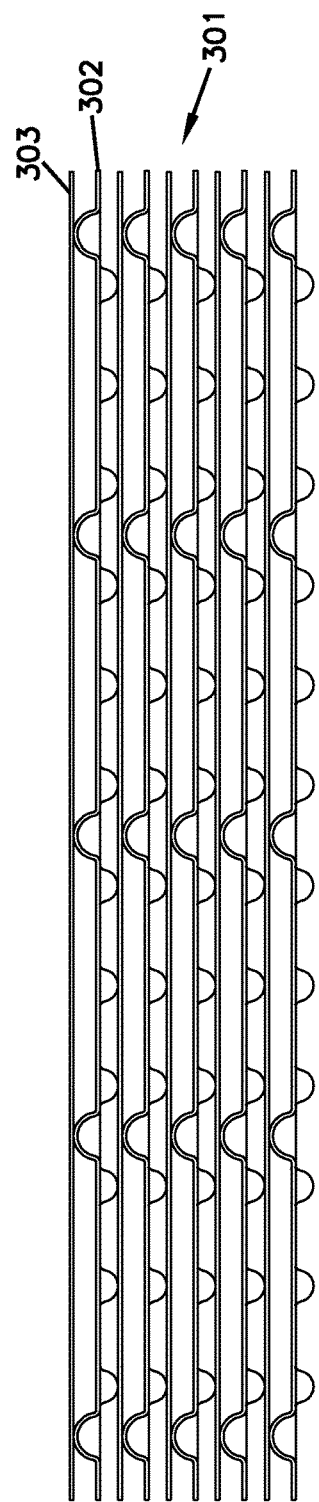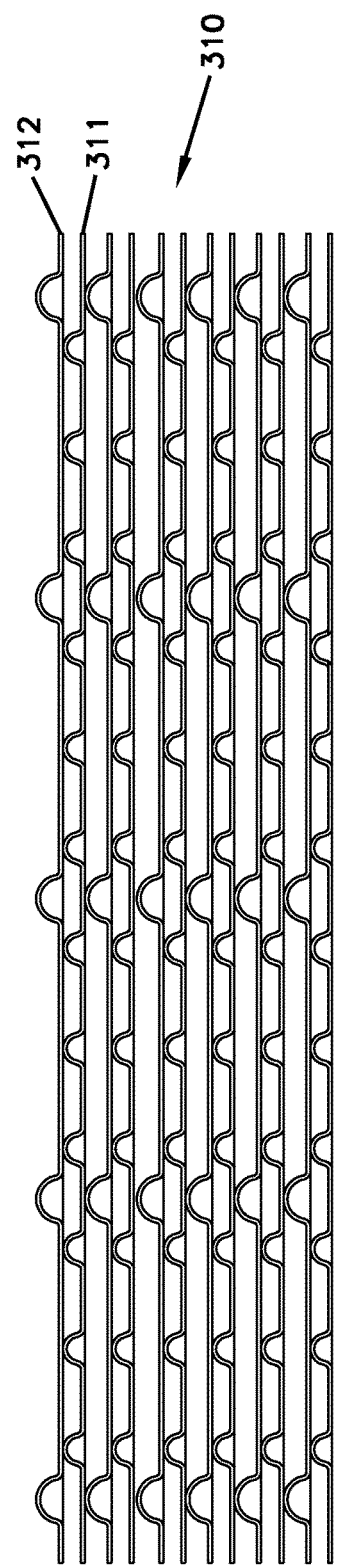
FIG. 9
FIG. 10

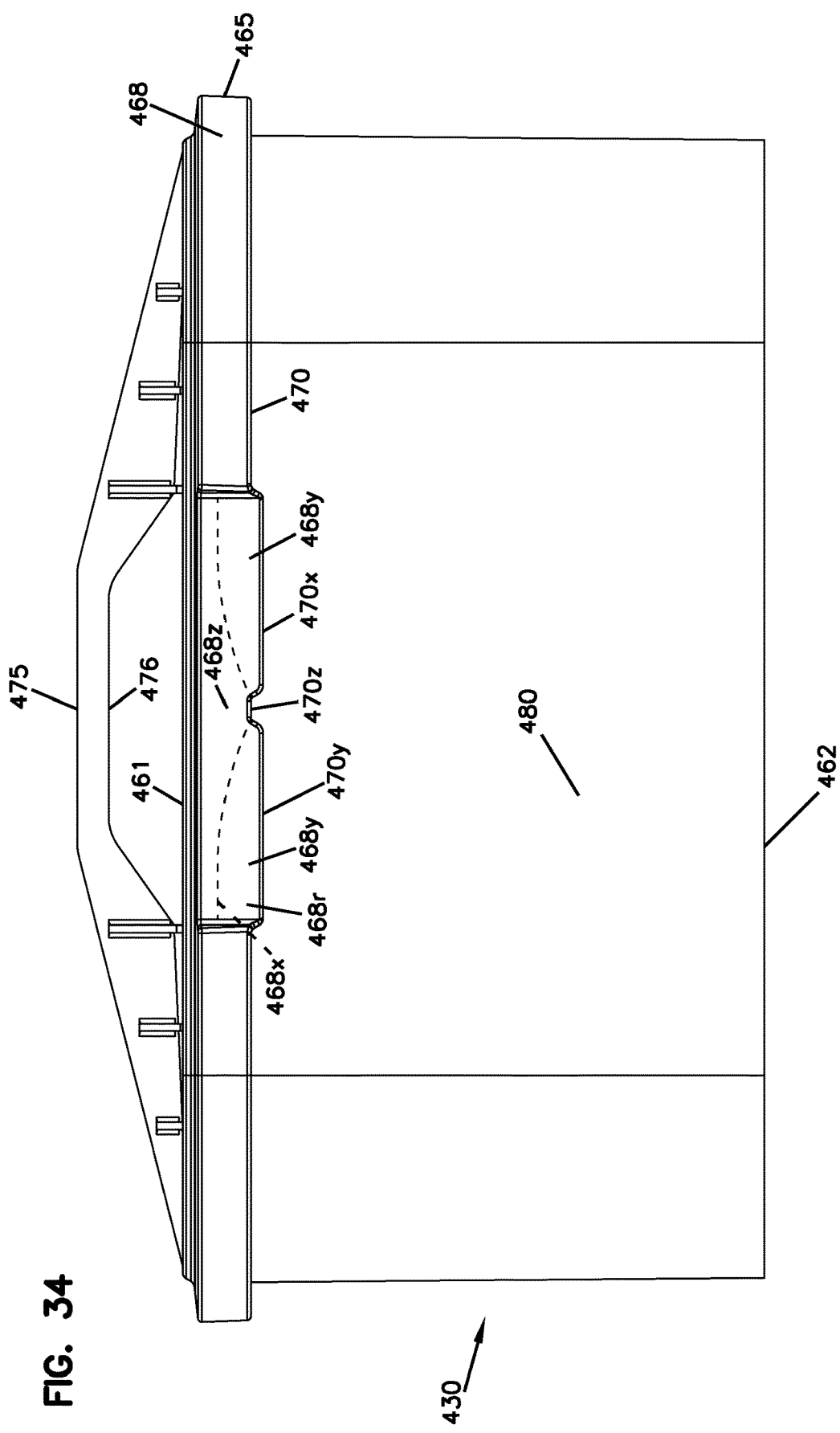

FILTER CARTRIDGES; AIR CLEANER ASSEMBLIES; HOUSINGS; FEATURES; COMPONENTS; AND, METHODS

CROSS-REFERENCE TO RELATED APPLICATIONS

This application is a National Stage Application of PCT/US2015/000452, filed Dec. 23, 2015, which claims benefit of U.S. provisional application 62/097,060, filed Dec. 27, 2014. The complete disclosure of PCT/US2015/000452 and U.S. 62/097,060 are incorporated herein by reference. To the extent appropriate, a claim of priority is made to each of PCT/US2015/000452 and U.S. 62/097,060.

FIELD OF THE DISCLOSURE

The present disclosure relates to filter arrangements, typically for use in filtering air; such as intake air for internal combustion engines. The disclosure particularly relates to filter arrangements that cartridges having opposite flow ends. Air cleaner arrangements and features; and, methods of assembly and use, are also described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

Air cleaner assemblies are described, in which a removeable main filter cartridge is positioned, for filtration of air passing therethrough, for example, combustion intake air to an engine arrangement, or for other equipment that requires filtered air. Also components and methods of assembly are described.

An example air cleaner assembly is described, which includes a precleaner assembly comprising a plurality of flow separator tubes. The precleaner assembly is configured as a portion of an access cover, positioned to project into an open end of a housing body such that the the tubes are surrounded by the housing body. Typically, the amount of this projection is at least 40 mm, usually at least 60 mm.

In other arrangements characterized, the air cleaner assembly does not include a precleaner assembly, but the access cover includes a shield or inner peripheral wall or ring that projects into the housing body to a location surrounded by the housing body.

Typically, the amount of projection of the shield or peripheral wall (in the case of the arrangement with no flow tubes, or if with the flow tubes), is at least 40 mm, usually at least 60 mm, and often 100 mm or more).

A variety of specific air cleaner housings are described, with advantageous features. Also, main filter cartridges and safety filter cartridges are described.

Methods of assembly and use are described.

In general, many various advantageous features are characterized. There is, however, no specific requirement that a selected system include each and every one of the advantageous features characterized herein, in order to obtain some advantage in accord with the present disclosure.

BRIEF DESCRIPTION OF THE DRAWINGS

FIG. 9 is a schematic, fragmentary, cross-sectional view of a further alternate media type usable in a media pack in accord with the present disclosure.

FIG. 10 is a schematic, fragmentary cross-sectional view, of a first variation of the media type of FIG. 9.

FIG. 12 being taken generally toward an inlet end of the air cleaner assembly.

FIG. 16A is an enlarged fragmentary schematic view of a portion of a housing body of the types of FIG. 16.

FIG. 34 is a schematic side elevational view of a filter cartridge component usable in accord with selected features according to the present disclosure.

DETAILED DESCRIPTION

I. Example Media Configurations, Generally

Figure 1:
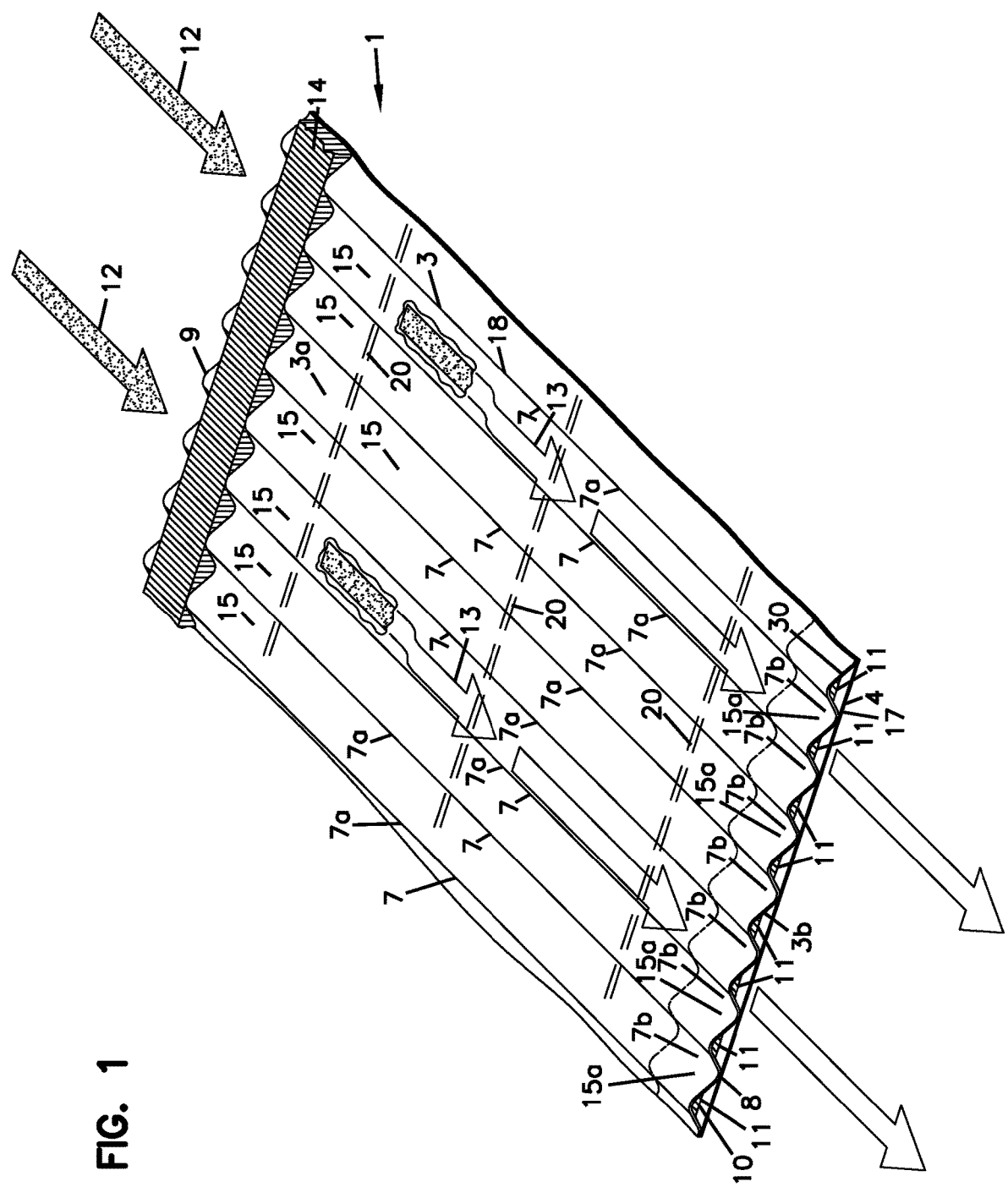
FIG. 1 is a fragmentary, schematic, perspective view of a first example media type useable in arrangements according to the present disclosure.

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet, and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause corrugations in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media (media having media ridges) secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

In general, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight. By "straight" in this context, it is meant that through at least 70%, typically at least 80% of the length between edges 8 and 9, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

Adjacent edge 8 is provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

Adjacent edge 9, is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.")

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
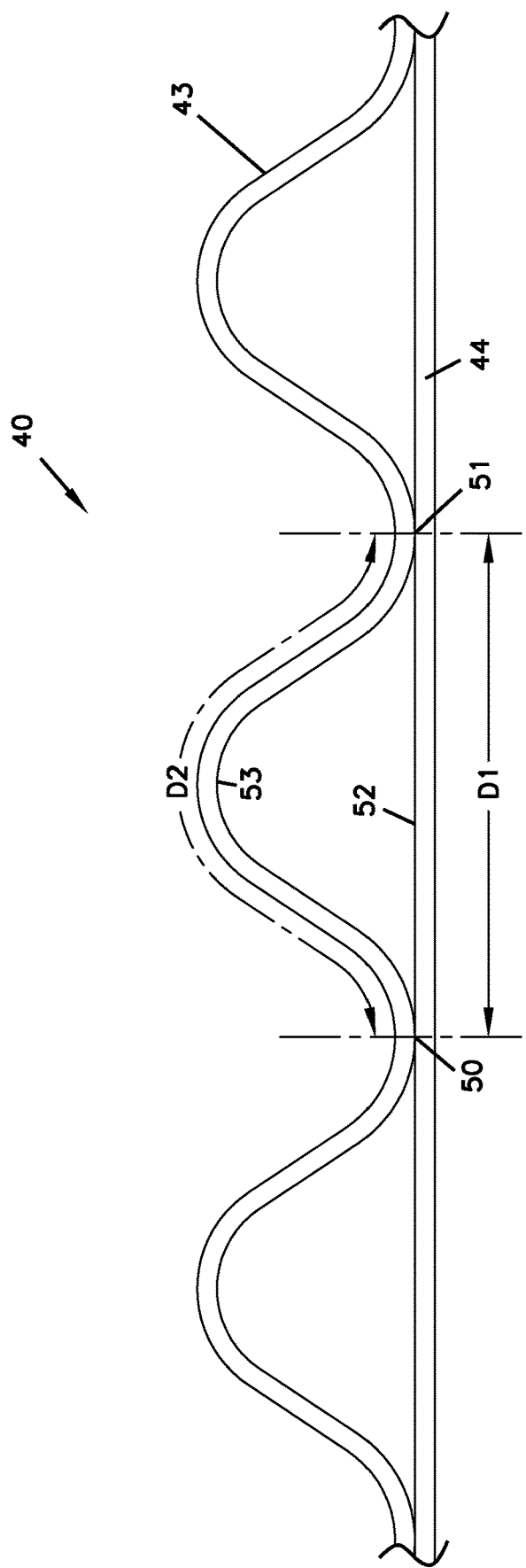
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
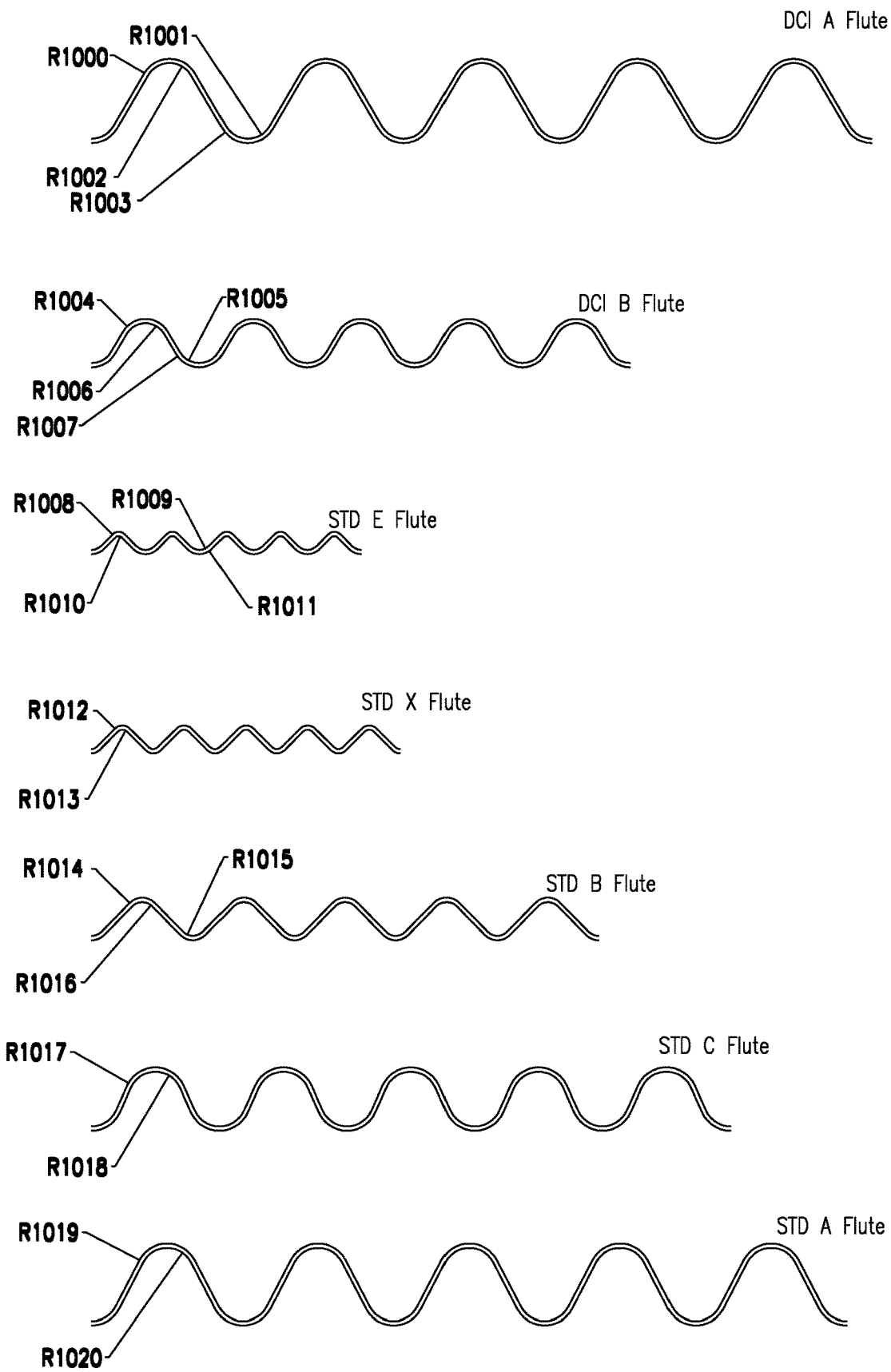
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat = 1.52:1; The Radii (R) are as follows:
   R1000 = .0675 inch (1.715 mm); R1001 = .0581 inch (1.476 mm);
   R1002 = .0575 inch (1.461 mm); R1003 = .0681 inch (1.730 mm);
DCI B Flute: Flute/flat = 1.32:1; The Radii (R) are as follows:
   R1004 = .0600 inch (1.524 mm); R1005 = .0520 inch (1.321 mm);
   R1006 = .0500 inch (1.270 mm); R1007 = .0620 inch (1.575 mm);
Std. E Flute: Flute/flat = 1.24:1; The Radii (R) are as follows:
   R1008 = .0200 inch (.508 mm); R1009 = .0300 inch (.762 mm);
   R1010 = .0100 inch (.254 mm); R1011 = .0400 inch (1.016 mm);
Std. X Flute: Flute/flat = 1.29:1; The Radii (R) are as follows:
   R1012 = .0250 inch (.635 mm); R1013 = .0150 inch (.381 mm);
Std. B Flute: Flute/flat = 1.29:1; The Radii (R) are as follows:
   R1014 = .0410 inch (1.041 mm); R1015 = .0310 inch (.7874 mm);
   R1016 = .0310 inch (.7874 mm);
Std. C Flute: Flute/flat = 1.46:1; The Radii (R) are as follows:
   R1017 = .0720 inch (1.829 mm); R1018 = .0620 inch (1.575 mm);
Std. A Flute: Flute/flat = 1.53:1; The Radii (R) are as follows:
   R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 1-3, see FIGS. 4-7

Figure 4:
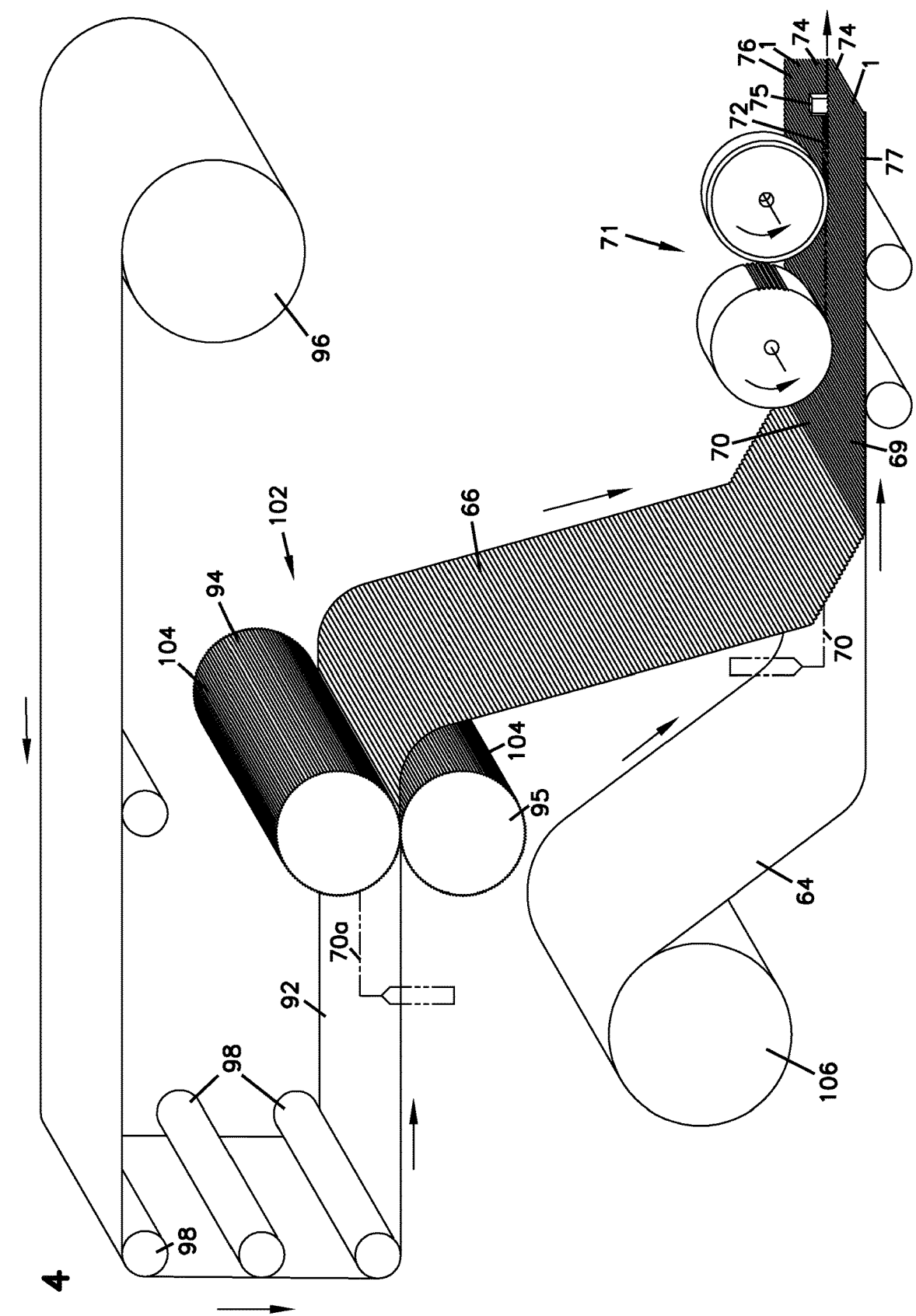
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
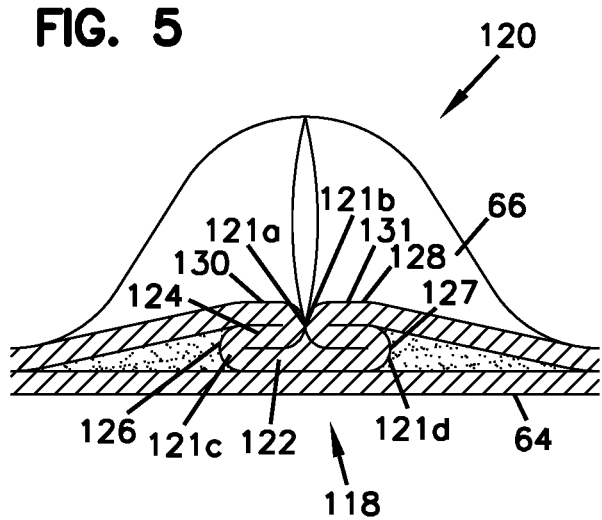
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
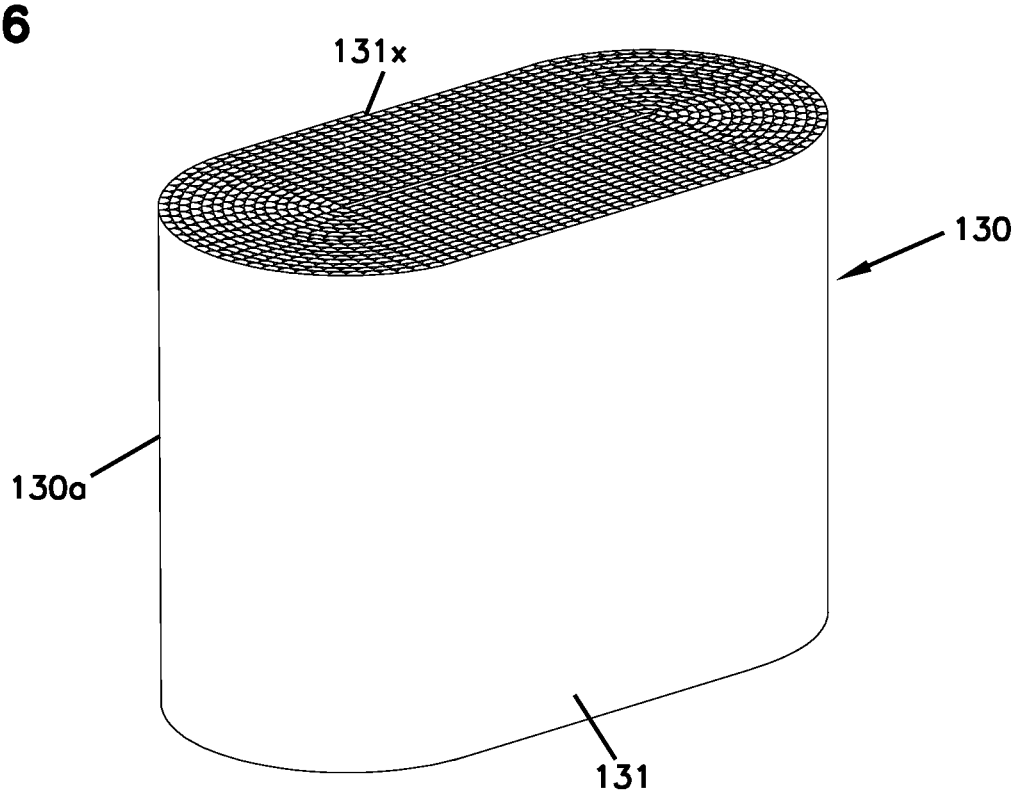
FIG. 6 is a schematic perspective view of a coiled filter arrangement usable in a filter cartridge according to the present disclosure, and made with a strip of media in accord with FIG. 1.

In FIG. 6, a coiled media pack (or coiled media) 130 constructed by coiling a single strip of single faced media is depicted, generally. The particular coiled media pack depicted is an oval media pack 130*a*, specifically a racetrack shaped media pack 131. The tail end of the media, at the outside of the media pack 130 is shown at 131*x*. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
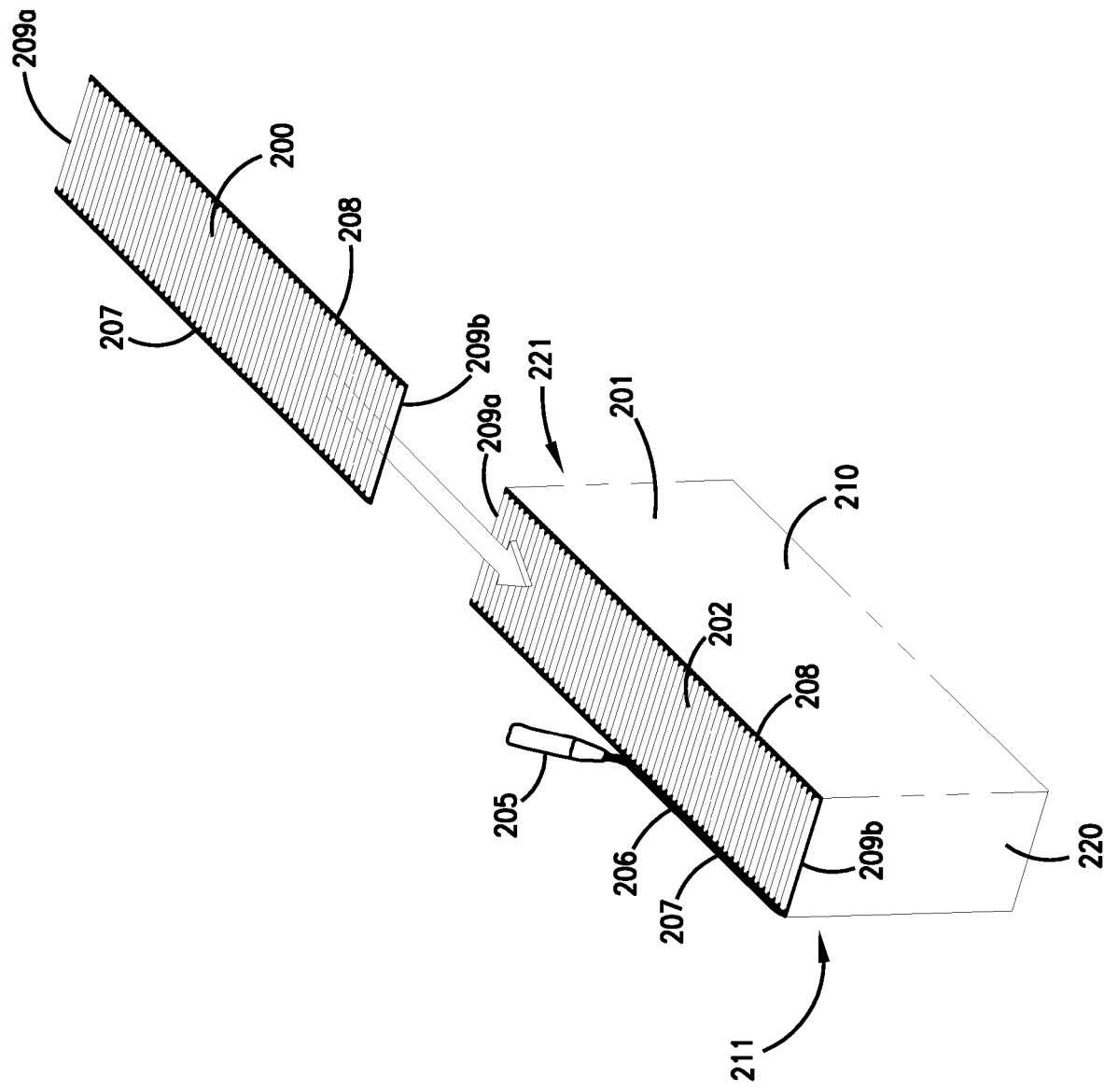
FIG. 7 is a schematic perspective view of a stacked media pack arrangement usable in a filter arrangement according to the present disclosure and made with a strip of media in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209*a*, 209*b*. Inlet and outlet flutes of the corrugated sheet/facing sheet combination comprising each strip 200, 202 generally extend between the front and rear edges 207, 208, and parallel to side edges 209*a*, 209*b*.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
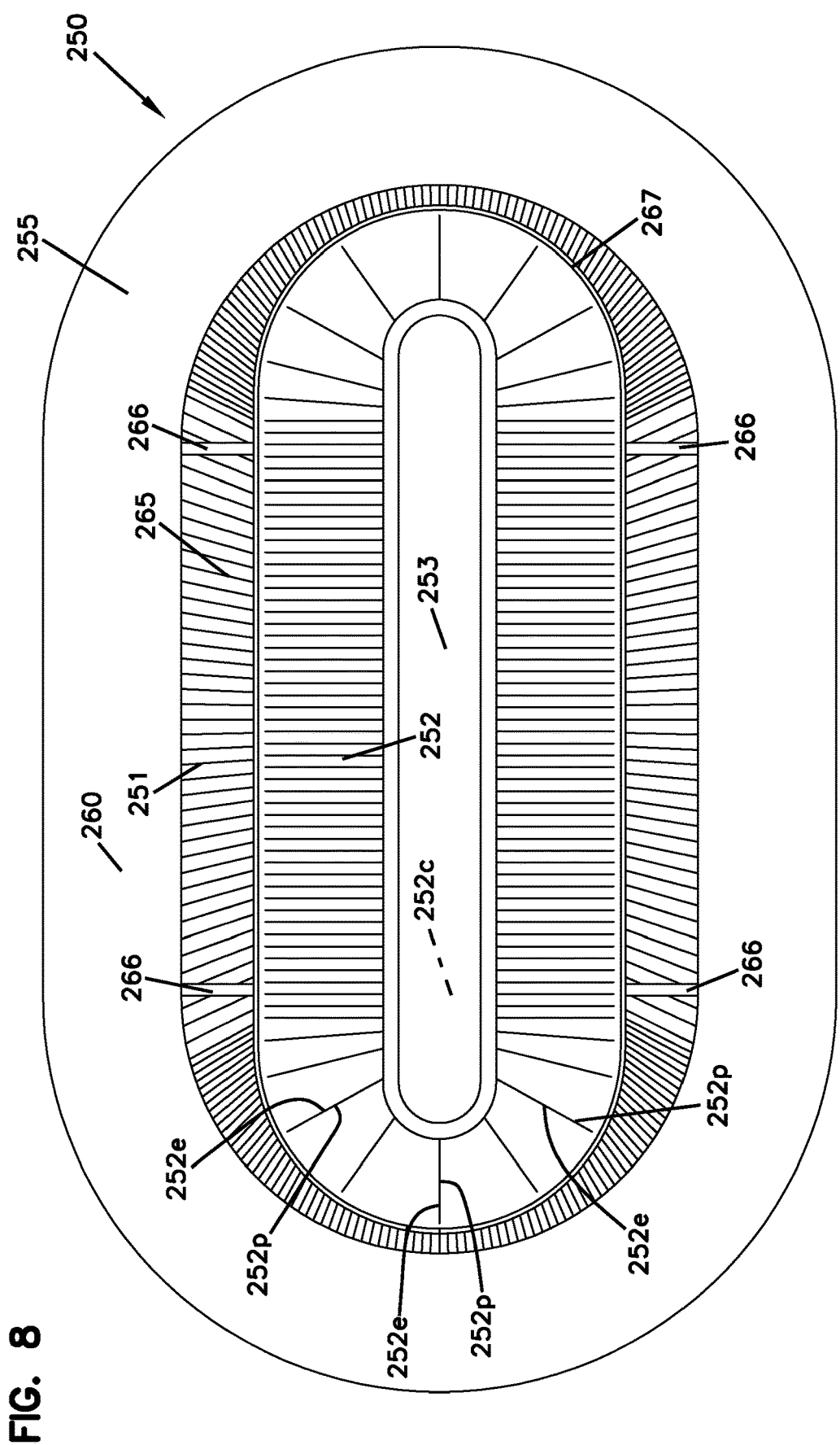
FIG. 8 is a schematic flow end view of a filter media pack using an alternate media to the media of FIG. 1, and alternately usable in selected filter cartridges in accord with the present disclosure.

C. Selected Media or Media Pack Arrangements Comprising Multiple Spaced Coils of Fluted Media; FIGS. 8-8B Alternate types of media arrangements or packs that involve flown between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
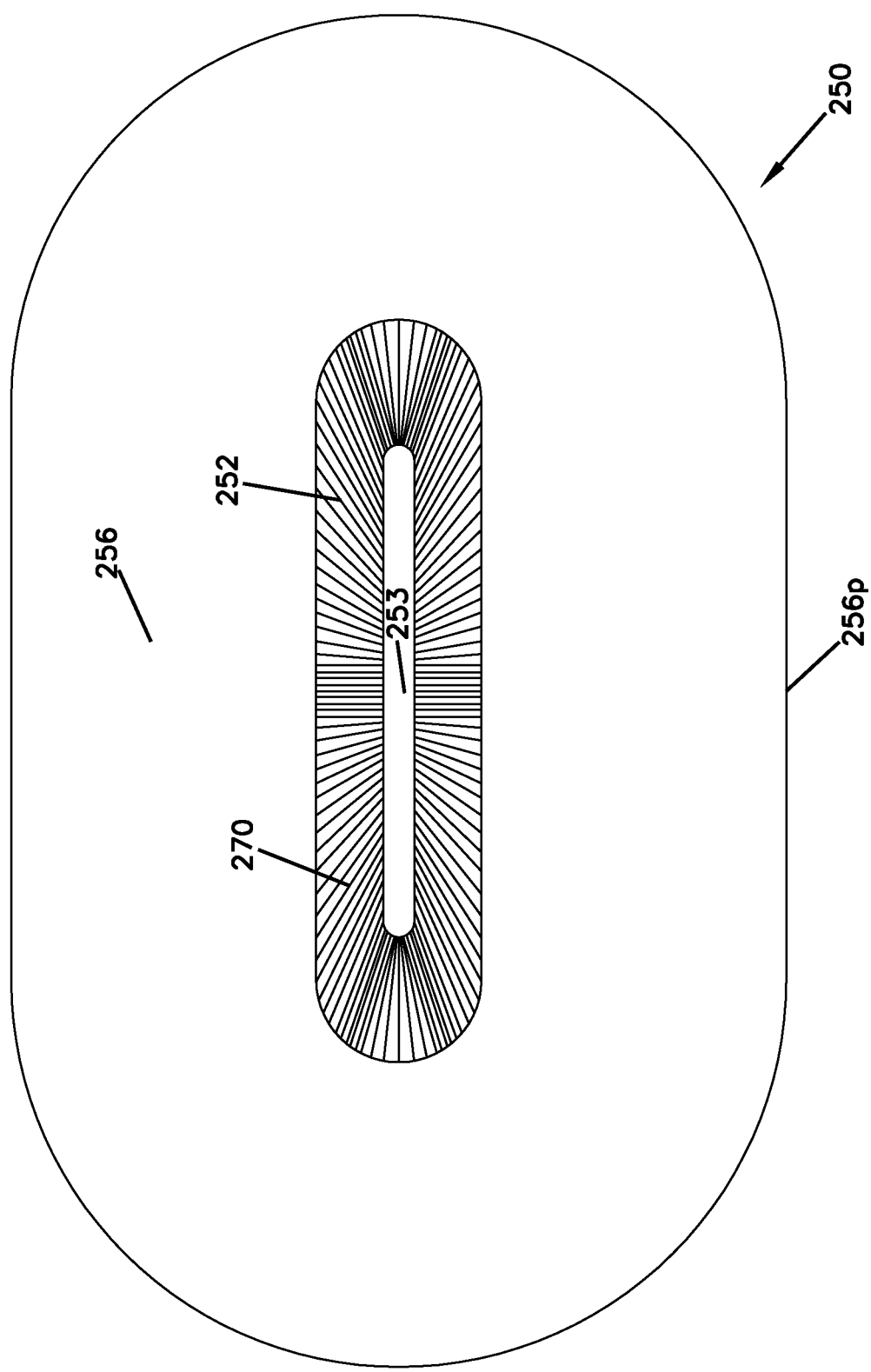
FIG. 8A is a schematic opposite flow end view to the view of FIG. 8.
Figure 8B:
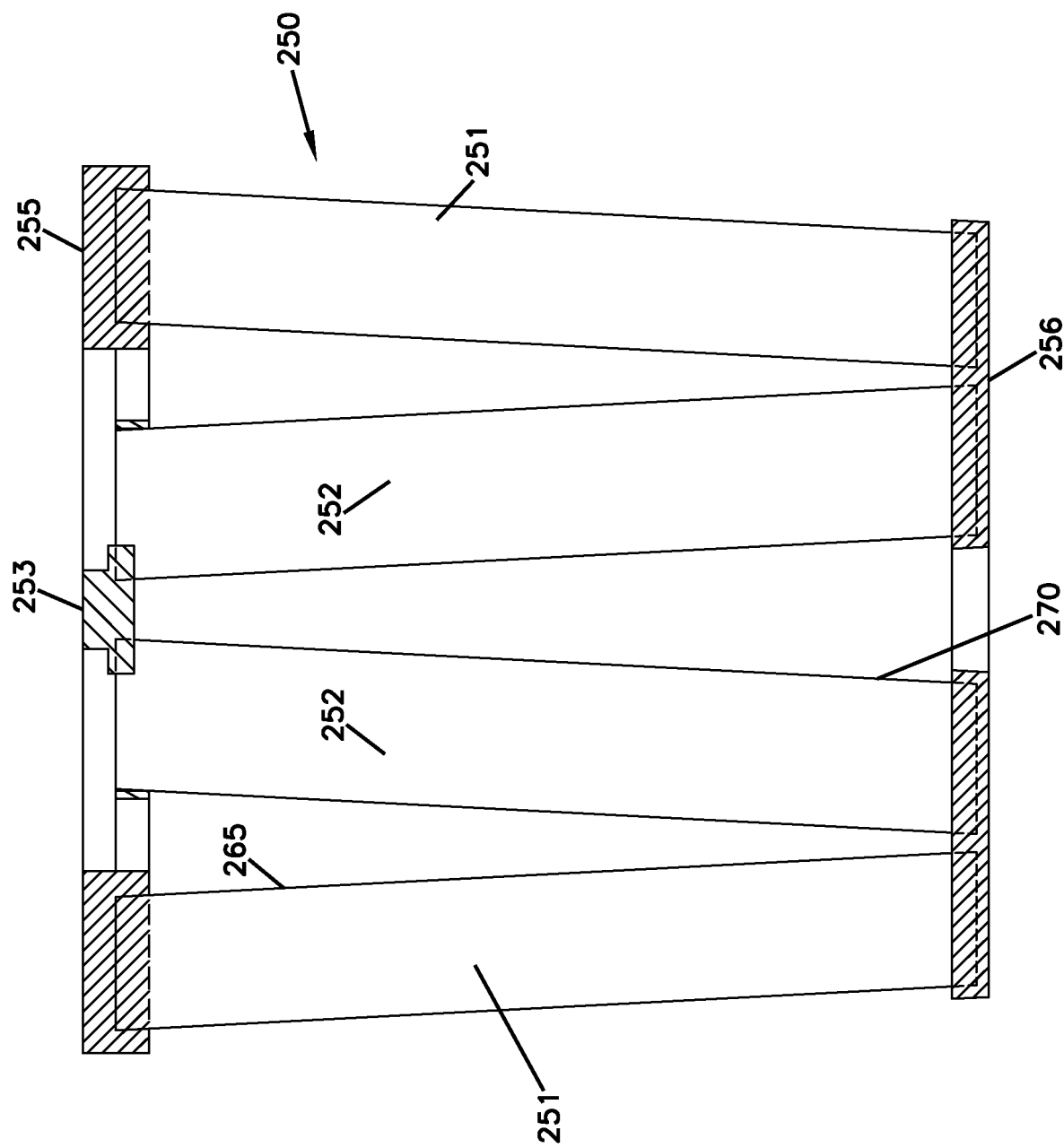
FIG. 8B is a schematic cross-sectional view of the media pack of FIGS. 8 and 8A.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 9-11

Figure 11:
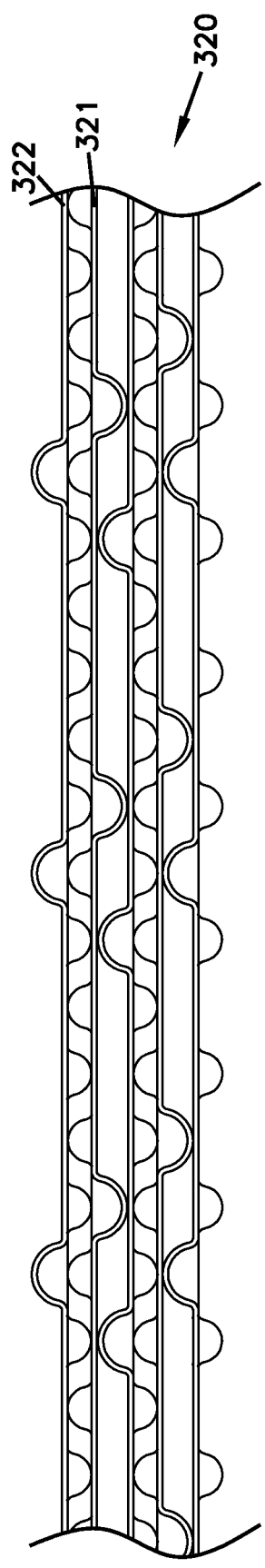
FIG. 11 is a schematic, fragmentary, cross-sectional view, of a second variation of the media type of FIGS. 9 and 10.

Herein, in FIGS. 9-11, some schematic, fragmentary, cross-sectional views are provided of still further alternate variations of media types that can be used in selected applications of the principles characterized herein. The examples are described in U.S. Ser. No. 62/077,749, filed Nov. 10, 2014 and owned by the Assignee of the present disclosure, Donaldson Company, Inc. In general, each of the arrangements of FIGS. 9-11 represents a media type that can be stacked or coiled into an arrangement that has opposite inlet and outlet flow ends (or faces), with straight through flow.

In FIG. 9, an example media arrangement 301 from U.S. Ser. No. 62/077,749 is depicted, in which an embossed sheet 302 is secured to a non-embossed sheet 303, then stacked and coiled into a media pack, with seals along opposite edges of the type previously described for FIG. 1 herein.

In FIG. 10, an alternate example media pack 310 from U.S. Ser. No. 62/077,749 is depicted, in which a first embossed sheet 311 is secured to a second embossed sheet 312 and then formed into a stacked or coiled media pack arrangement, having edge seals generally in accord with FIG. 1 herein.

In FIG. 11, a third example media arrangement 320 from U.S. Ser. No. 62/077,749 is depicted, in which a sheet 321, which is embossed on both sides, is secured to another layer 322 of a similar media, but inverted, and stacked or coiled into a media pack 320, with edge seals somewhat analogous to FIG. 1.

The examples of FIGS. 9-11 are meant to indicate generally that alternate media packs can be used in accord with the principles herein. Attention is directed to U.S. Ser. No. 62/077,749 incorporated herein by reference, with respect to the general principles of construction and application of these media types.

E. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

II. Selected Identified Issues with Various Air Cleaners

A. General

Air cleaner assemblies that use relatively deep filter media packs, for example using media in general accord with one or more of FIGS. 6-11, have proliferated. As to example actual products in the marketplace, attention is directed to the air cleaners of Donaldson Company, Inc. the Assignee of the present disclosure sold under the trade designation "Powercore;" and, also, to the products of Mann & Hummel provided under the designation "IQORON."

In addition, air cleaner assemblies using such media packs can be incorporated in a wide variety of original equipment (on road trucks, buses; off road construction equipment, agriculture and mining equipment, etc.) on a global basis. Service parts and servicing are provided by a wide range of suppliers and service companies.

B. Identification of Appropriate Filter Cartridges

It is very important that the filter cartridge selected for servicing be an appropriate one for the air cleaner of concern. The air cleaner is a critical component in the overall equipment. If servicing is required to occur more frequently than intended, the result can be added expense, downtime for the equipment involved and lost productivity. If the servicing is not done with a proper part, there may be risk of equipment failure or other problems.

The proper cartridge for the air cleaner of concern and equipment of concern, is generally a product of: product engineering/testing by the air cleaner manufacturer; and, specification/direction/testing and qualification by the equipment manufacturer and/or engine manufacturer. Servicing in the field may involve personnel selecting a part that appears to be similar to the one previously installed, but which is not a proper, rigorously qualified, component for the system involved.

It is desirable to provide the air cleaner assembly, regardless of media specific type, with features that will help readily identify to the service provider that an effort to service the assembly is being made with a proper (or improper) filter cartridge. Optional features and techniques described herein can be provided to obtain this benefit as described below.

In addition, assembly features and techniques which are advantageous with respect to manufacture and/or filter component integrity are described. These can be implemented with features and techniques of the type relating to helping ensure that the proper cartridge is installed in an assembly, or in alternate applications.

C. Mass Air Flow Sensor Issues

In many systems, a mass air flow sensor is provided downstream from the filter cartridge and upstream from the engine, to monitor air flow characteristics and contaminant characteristics. In some instances, minor modifications in media pack configuration and orientation, can lead to fluctuations in mass air flow sensor operation. It is therefore sometimes desirable to provide the air cleaner assembly with features in the filter cartridge and air cleaner, such that variation in air flow from the filter cartridge is managed to a relative minimum. This can facilitate mass air flow sensor use and operation. The features and techniques described herein can be provided to advantageously obtain this benefit.

D. Stable Filter Cartridge Installation

In many instances, the equipment on which the air cleaner is positioned is subject to substantial vibration and shock during operation. The types of media packs described above in connection with FIGS. 6-11, are often constructed relatively deep, i.e. with having depth of extension in the air flow direction of at least 50 mm and often at least 80 mm more, in many instances more than 100 mm. Such deep filter cartridges can load with substantial amounts of contaminant during use, and gain substantially in weight. Thus, they can be subject to significant vibration momenta during operation. It is desirable to provide features in the filter cartridge that help ensure stable positioning of the cartridge, avoidance of damage to the media (or media pack) in the event of movement, and avoidance of seal failure during such vibration and shock.

Similarly, the equipment may be subject to a wide variety of temperature ranges during storage and use. These can lead to expansion/contraction of materials relative to one another. It is desirable to ensure that the filter cartridge and air cleaner are constructed in such a manner that seal integrity is not compromised under these circumstances. The features and techniques described herein can be applied to address these concerns, as discussed below.

E. Preferred Precleaner Variations

In many instances, it is desirable to have an optional precleaner on the air cleaner assembly. The precleaner generally removes a portion of the dust or other particulate material (sometimes liquid particulate material) entering the air cleaner through the air flow inlet, before that material reaches an internally positioned filter cartridge. This can help extend the lifetime of operation of the assembly without servicing, as well as protect the filter cartridge against damage. Herein, assemblies particularly configured for use with optional precleaner arrangements are described. Also described are some preferred features of such precleaners. In still other arrangements, a precleaner may be a separate assembly from an air cleaner, or it may be not be used at all. Selected principles of the present disclosure are provided, that facilitate operation in those latter manner.

F. Summary

The features characterized herein can be used to advantage to address one or more of the concerns described above. There is no specific requirement that the features be implemented in a manner that maximally addresses all concerns. However, selected embodiments are described in which all of the concerns identified above are addressed to a significant and desirable extent.

III. An Example Air Cleaner Assembly and Features, FIGS. 12-23

In FIGS. 12-23, an example air cleaner assembly is depicted that includes features, as characterized herein below, usable with filter cartridges having media as previously characterized herein. The media variations described above can be used, and variations from them are possible. The specific choice of media is a matter of preference for cost, assembly and/or filter capability, efficiency or lifetime preferences. Typically, the choice of media will be of the type of FIG. 1, with a length of extension between the two flow faces of at least 100 mm, usually at least 150 mm, typically 200 mm or more, sometimes 250 mm or more, and indeed in some instances 300 mm or more.

A. General Air Cleaner Features, FIGS. 12-13

Figure 12:
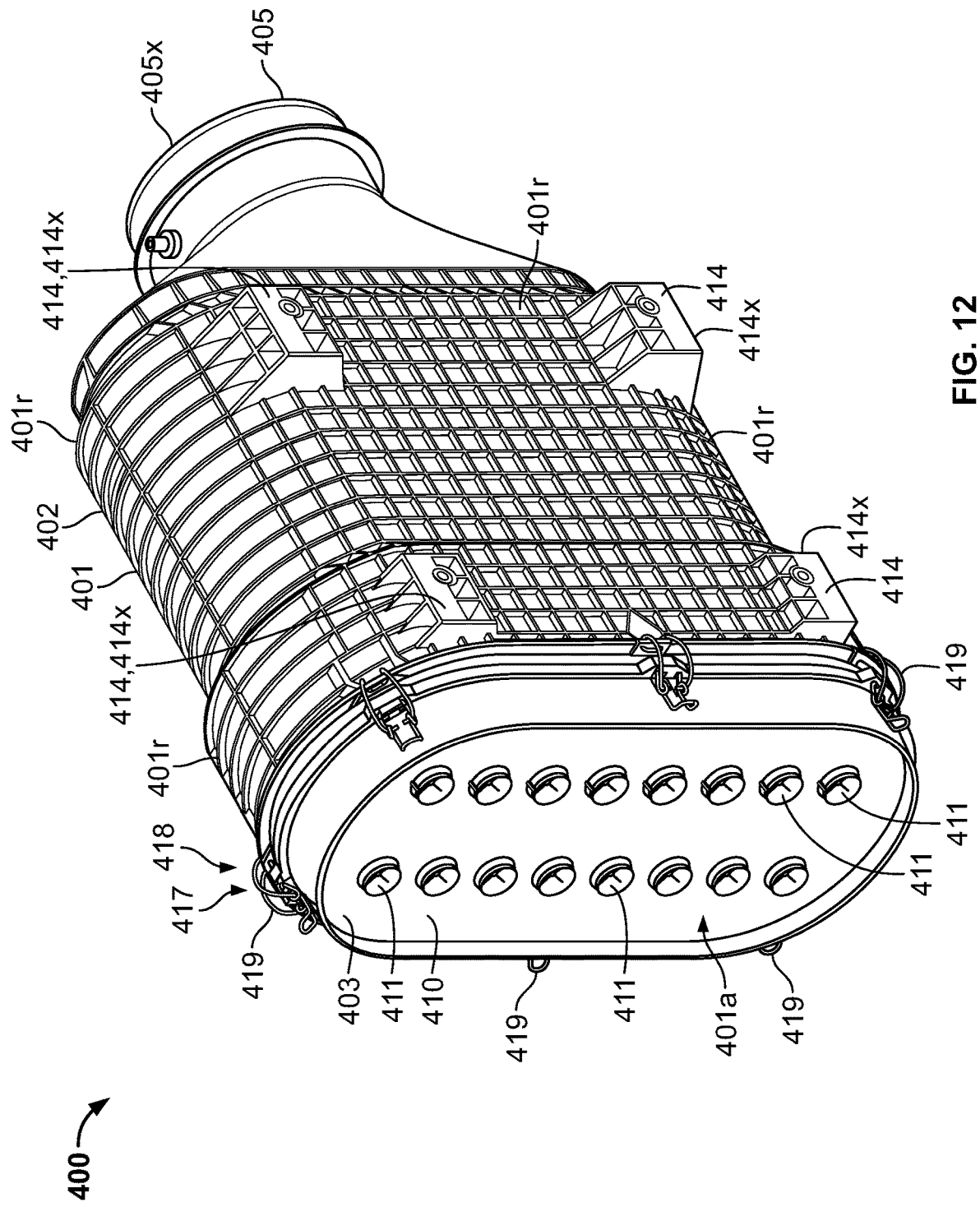
FIG. 12 is a schematic, perspective view of an air cleaner assembly according to the present disclosure.

The reference numeral 400, FIG. 12, generally indicates an example air cleaner assembly according to the present disclosure. The air cleaner assembly 400 generally comprises a housing 401. The housing 401 includes a body 402 with a removable service or access cover 403 thereon, by which access to internally received componentry such as filter cartridges can be obtained.

Referring to FIG. 12, the air cleaner 400, includes, (in the example positioned on the body 402), an outlet arrangement 405. The outlet arrangement 405 is generally positioned for exit of filtered air, from the air cleaner assembly 400 through outlet 405x. The outlet arrangement or assembly 405 can be made separately from a remainder of the body 402 and be attached thereto, or it can be found integral with a remainder of the body 402. With arrangements in which the outlet arrangement 405 is separately made, modular assembly practices can be used, to provide alternate outlet arrangements 405 for different systems of use. This will be characterized in further detail below.

The housing 401 can be constructed with a variety of materials, when various principles according to the present disclosure are provided. The features characterized, are particularly well adapted for use with a housing that is primarily a molded plastic component. The housing 401 of FIG. 12 is generally such a component, and selected housing features, such as body 402, include various structural ribbing members thereon, see ribs 401r, for strength and integrity.

In general, the housing 401 can be characterized as including an air flow inlet 401a, through which air to be filters enters the assembly 400. The particular assembly 400 depicted, also includes a contaminant ejection port or port arrangement, discussed below.

The particular air cleaner assembly 400 depicted, is a two-stage air cleaner assembly, and includes a precleaner 410 thereon. The precleaner 410, in the example depicted, comprises a plurality of separator tubes 411 as characterized below. The precleaner 410 is usable to prelcean selected material (contaminant) carried by an air stream into the air cleaner assembly 400, before the air reaches the filter cartridge positioned therein. Such precleaning generally leads to substantial removal of liquid particulate such as rain water or splashed water, etc. and/or various (especially larger) dust or other particles. Operation of the precleaner 410, and preferred configurations thereof, are described herein below. It is noted that particular example precleaner 410 depicted, comprises a portion of the access cover 403.

Many of the principles characterized herein can be applied in air cleaner assemblies that do not have a precleaner positioned thereon as a component thereof, i.e. for which the precleaner is separate component or is not used at all. Arrangements and options with respect to this are described herein below.

Still referring to FIG. 12, at 414, a mounting pad arrangement is provided, by which the air cleaner assembly 400 can be secured to equipment for use. The example mounting pad arrangement 414 generally comprises a plurality of feet or pads 414x, in the example molded integral with housing body 402, and, in the example, appropriately fit with the receded metal connectors or other types of connector arrangements.

Still referring to FIG. 12, the particular access cover 403 depicted, is secured in place by a connector arrangement 417, and in the example depicted, comprising an overcenter latch arrangement 418. In FIG. 12, a plurality (6) of such wire latches 419 is viewable, providing this function. Of course, an alternate number or location can be used; and/or, alternate connector arrangements can be used, including for example, bolts or other fasteners.

Still referring to FIG. 12, the particular air cleaner housing 401 depicted, generally has a cross-sectional shape with a long axis (in a plane perpendicular to an axis or general direction of air flow when) and a shorter axis perpendicular to the longer axis; and, the air cleaner assembly 400 is depicted configured so that in use it would typically be mounted with the longer cross-sectional axis general vertical; i.e. with a pad arrangement 414 mounted along a side extending generally vertically. The principles described herein can be applied in alternate arrangements, as will be apparent from discussions below.

Figure 12A:
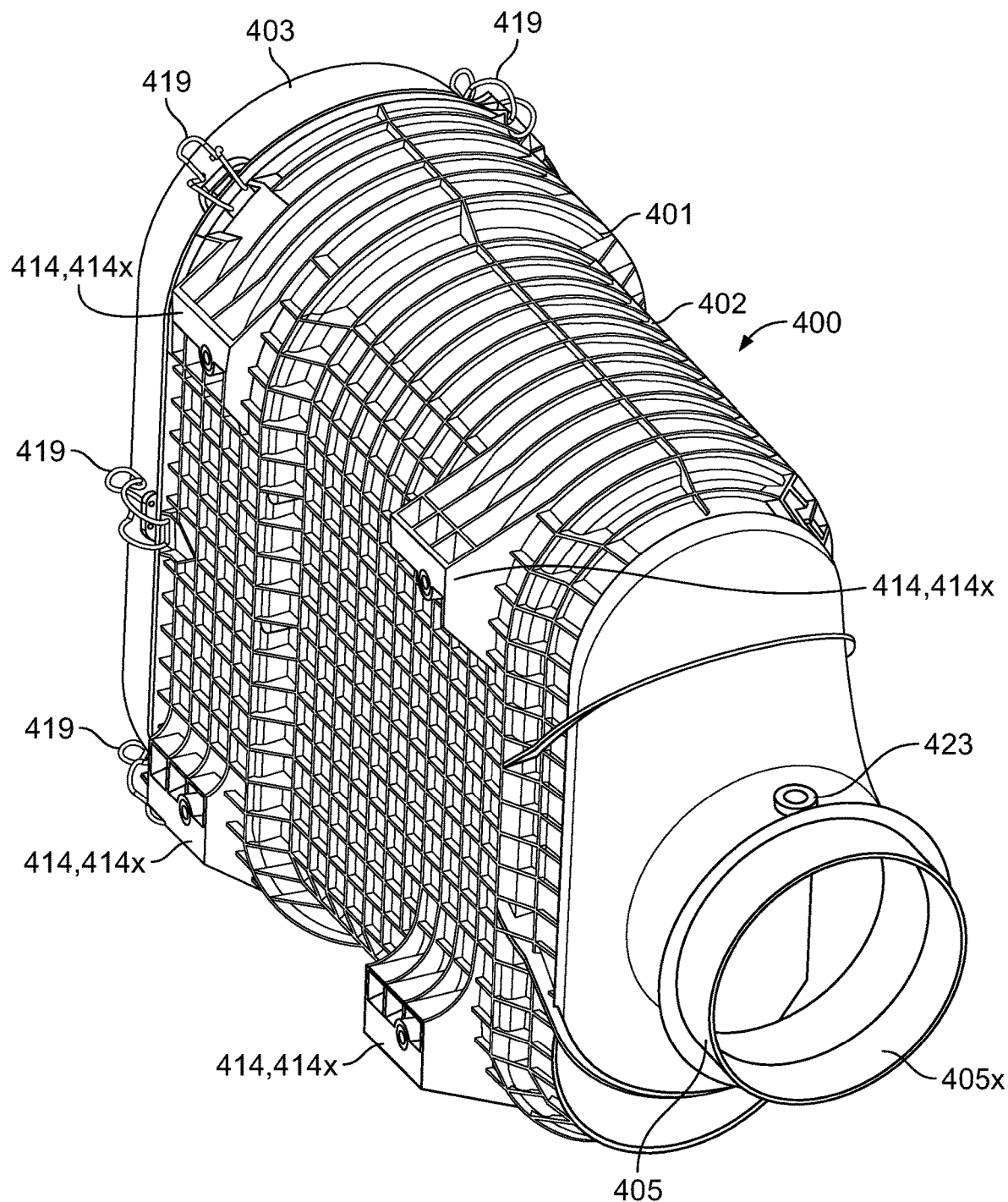
FIG. 12A is a second, schematic, perspective view of the air cleaner assembly of FIG. 12; the view of FIG. 12A being taken generally toward an outlet end of the air cleaner assembly.

In FIG. 12A, an alternate perspective view of the air cleaner assembly 400 is shown. Here the view is taken generally toward the outlet 405. At 423, a utility port in the outlet arrangement 405 is depicted. The port 423 can be used for a restriction indicator or other equipment. In addition, if desired, a mass air flow sensor (MAFS) arrangement can be mounted on outlet arrangement 405 or in ducting further downstream therefrom.

Figure 12B:
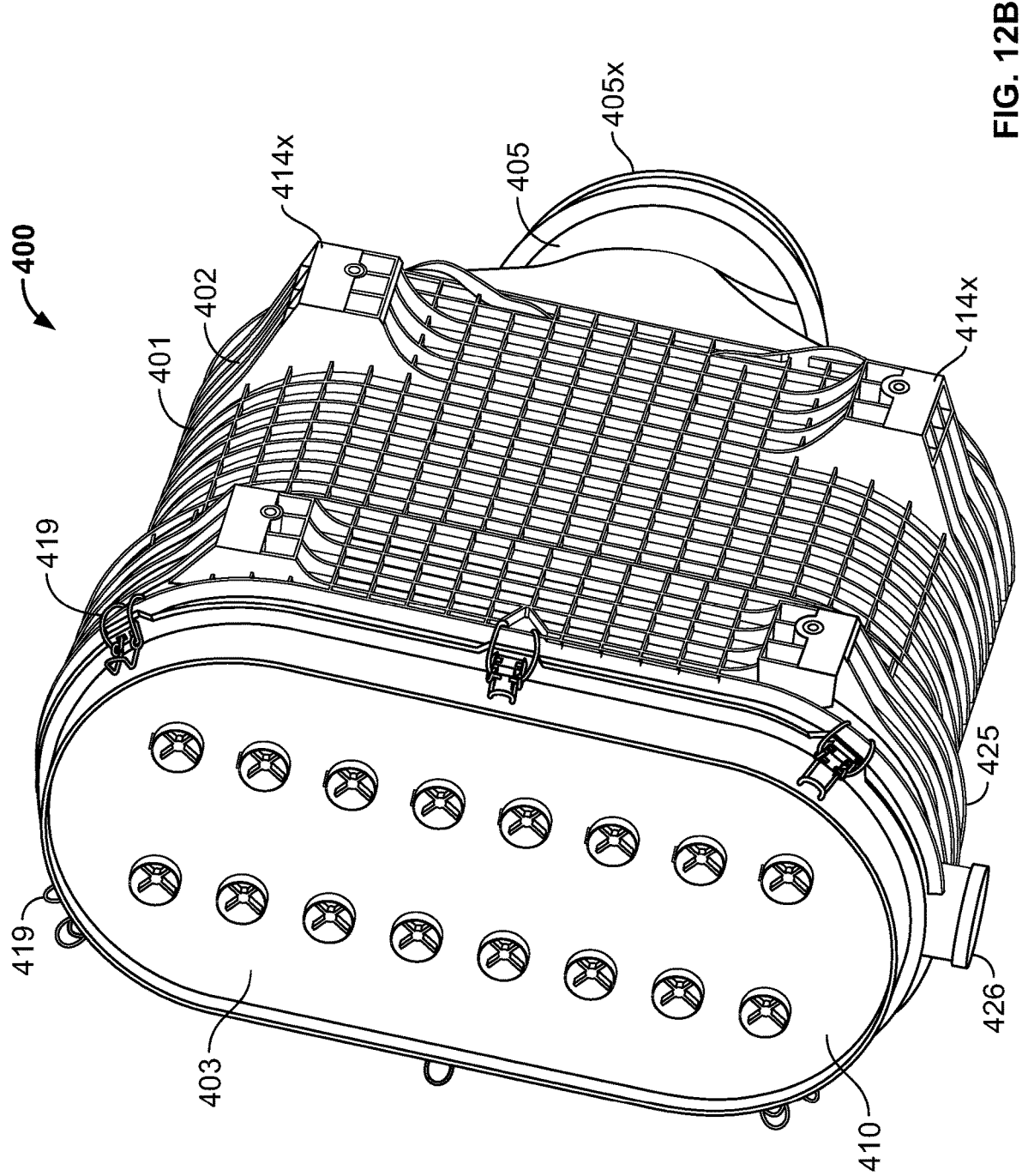
FIG. 12B is a third schematic, perspective view of the air cleaner assembly of FIG. 12; the view of FIG. 12B being taken toward the inlet flow end of the assembly, and depicting selected lower side end features.

In FIG. 12B a second inlet end perspective view of the assembly 400 is depicted. Here, features on a lower end or side (bottom) 425 (in use) are viewable. Attention is directed to contaminant evacuation port arrangement 426. The (outlet) port 426 arrangement is positioned for removal of particulate and/or water (contamination) collected by the precleaner, from the housing 401. It can generally be characterized as a contaminant "evacuation" port or port arrangement due to this function. It will typically be oriented in a portion of the housing 401 directed downwardly in use. Thus, if it is desired to mount the air cleaner assembly 400 differently than with mounting pad arrangement 414, for example along an opposite side, an additional mounting arrangement on that side would need to be provided; or, the port arrangement 426 would need to be positioned at a different location or in the housing body, for example oppositely.

In general terms, for typical applications, the outlet port arrangement 426 would be directed downwardly for gravity assist to material evacuation from the precleaner assembly 410. The port arrangement 410 can be provided with an evacuator valve assembly therein, or it may be attached to a scavenge duct to facilitate removal of material from the precleaner 410.

Still referring to FIG. 12B, it is noted that the particular contaminant evacuator port arrangement 426 depicted, is oriented in the housing body 402. Alternate locations, for example, in a portion of an access cover, are possible.

Figure 13:
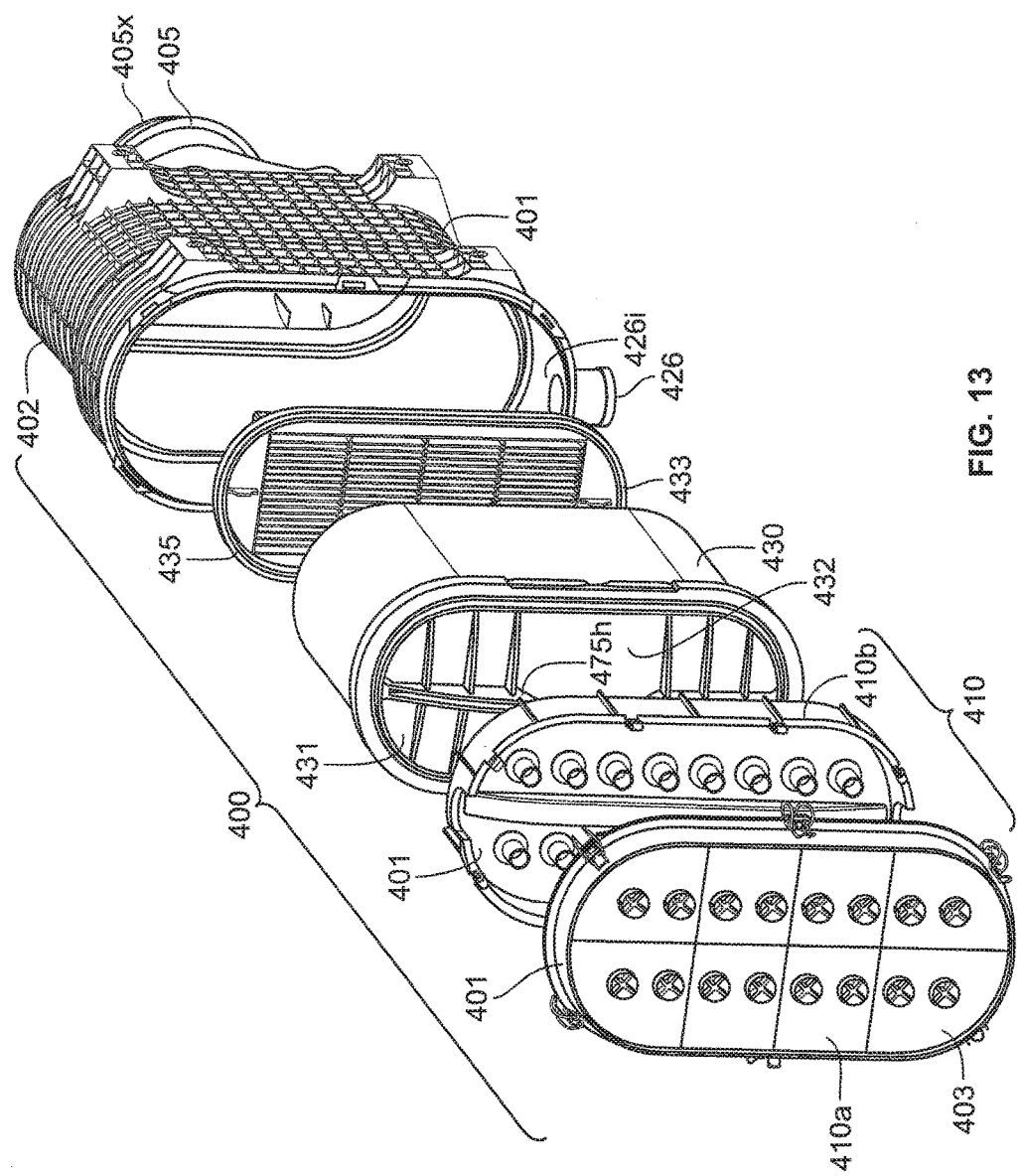
FIG. 13 is schematic, exploded, inlet end perspective, view of the air cleaner assembly of FIG. 12.

Attention is now directed to FIG. 13, an exploded perspective view of the air cleaner assembly 400. At 402, the housing body is depicted. It is noted that the outlet arrangement 405 is not shown separated from the housing body 402. For the example depicted, the outlet arrangement 405 is permanently secured to the housing body 402, for example by being molded integral therewith or by having separately molded and then being secured permanently by heat welding, adhesive or other approaches. Again, alternatives are possible.

At 403, the access cover is depicted, in the example comprising a precleaner 410. The precleaner 410 depicted, comprises two shell or cover components secured to one another: an outer (inlet) cover portion 410a and an inner (outlet tube) cover portion 410b. In some applications characterized herein, the components 410a, 410b are snap-fit or otherwise secured together, but configured to be separable to facilitate cleaning. However, in some applications of the techniques characterized herein, the two covers or shell components 410a, 410b can be secured together during assembly, and not be separable again.

The general operation of the precleaner 410, again, is to separate material (contaminant) upon entering into the air cleaner to allow for evacuation through outlet port 426 in housing body 402. This inhibits certain materials from ever reaching the internally received filter cartridge componentry.

In FIG. 13, at 430 a filter cartridge is depicted. The filter cartridge 430 is generally a main or primary filter cartridge, and in use to selectively separate particulate or containment material not separated by the precleaner 410. Cartridge 430 is generally a service part (or removable component), i.e. periodically during the lifetime of the air cleaner 400, the filter cartridge 430 would be removed and be refurbished or be replaced. The filter cartridge 430 comprises filter or filtration media 431 which may be any of a variety of types, for example various ones of these characterized herein above. The typical cartridge 430 used with principles according to the present disclosure, is a "straight through flow" arrangement, which has a first (inlet) flow face or end 432 and opposite outlet (flow) face or end 433, with filtering flow of air through the filter cartridge 430 generally being from the inlet end 432 to the outer end 433.

Still referring to FIG. 13, the particular air cleaner assembly 400 depicted includes an optional secondary or safety filter 435. The (optional) safety or secondary filter 435 is generally positioned between the main filter cartridge 430 and the outlet 405x. In a typical arrangement, the (optional) secondary filter cartridge 435 is removably positioned within the air cleaner assembly 400, and can be a service component. However, it is typically not subject to very significant dust load in use, and may be rarely, if ever, changed. It is an advantageous feature separate that it be structurally from the main cartridge 430, since it can remain in place protecting internal components from dust, even when the main filter cartridge 430 is removed.

B. Some Example Assembly Variations (Briefly), FIG. 14

Figure 14:
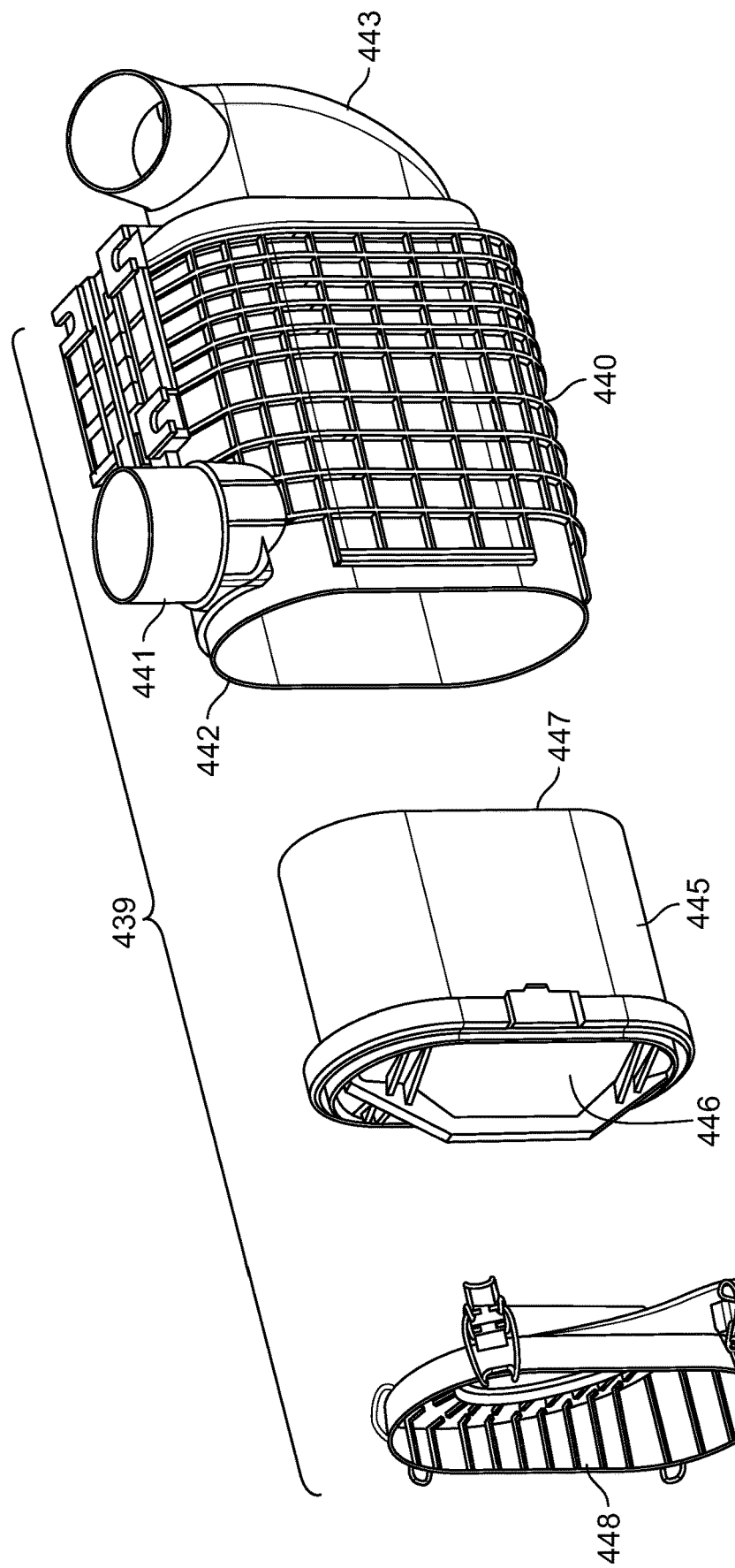
FIG. 14 is a schematic exploded view of selected portions of an assembly generally analogous to FIG. 12, but showing example usable variations therefrom.

In FIG. 14, a schematic depiction is provided, to indicate some variations that are possible with assemblies according to the present disclosure. For example, and referring to FIG. 14, an air cleaner assembly 439 is shown with a housing body variation indicated at 440. This body variation 440 would be usable, for example, in an arrangement that does not include a precleaner that requires a contaminant ejection port, and thus none is shown. Further, the air cleaner body 440 includes a side air flow inlet 441, rather than an end inlet. Typically, the inlet seal would be oriented adjacent access cover end 442. Opposite to the access cover end 442, the housing body 443 is provided with an outlet arrangement 443, with an alternate configuration to the one shown in FIG. 12. The outlet arrangement 443 could be made as a separate component from a remainder of the body 440 and be secured thereto, as an alternative, or it can be molded integral with a remainder of the body 440.

The variations indicated in FIG. 14 can be used collectively or selectively in air cleaner assemblies according to the present disclosure. In a typical arrangement not involving a precleaner, a cartridge such as filter cartridge 445 would be positioned so that an inlet end or face 446, when the cartridge 445 is installed, would be positioned sufficiently deep within the housing body 440 that the outlet 441 would communicate directly with a space upstream of the cartridge inlet end or 446. Thus, inlet air would be brought upstream of the face 446. As with cartridge 430, cartridge 445 includes an outlet flow end of face 447 opposite face inlet flow end or face 446.

In FIG. 14, an access cover 448 for the assembly 439 is depicted. The access cover 448 is removably mountable on housing body 440, for example by latch arrangement. The access cover 448 does not include a precleaner assembly, but otherwise is configured to: secure the cartridge 445 and seal oriented within the housing body 440, and to help turn inlet flow from inlet 441 toward the cartridge 445 in an efficient manner. Principles characterized in U.S. Ser. No. 61/841,005, filed Jun. 28, 2013; and, PCT/US2014/044712, filed Jun. 27, 2014, incorporated herein by reference can be used with respect to this.

C. Main Filter Cartridge Features and General Interaction(s) with the Housing Features, FIGS. 15-16A Referring back to FIG. 13, as indicated the assembly 400 depicted, as characterized, includes a main filter cartridge 430. The main filter cartridge 430, again, is a service part, and, in use, normally becomes loaded with dust and other contaminants as the air cleaner 400 is used. In due course, the main filter cartridge becomes sufficiently occluded, that servicing of air cleaner 400 is warranted, by opening the access cover 403, removing the filter cartridge 430 and then either refurbishing it or replacing it. In some instances, this operation may also involve removal of replacement or refurbishment of the optional safety filter 435 when present, but in many instances it will not.

In general terms, the main filter cartridge 430 comprises permeable filter media through which the air must pass with filtering. The filter media may be any of a variety of types. In typical applications, according to the present disclosure, the filter media will be configured in a media pack that conducts filtration of air, as the air passes in a flow direction from an inlet end of the filter media pack to an opposite outlet end of the filter media pack. Example filter media types that can be used in this matter were described herein above, and many of them may be used to some advantage and applications according to the present disclosure.

Figure 15:
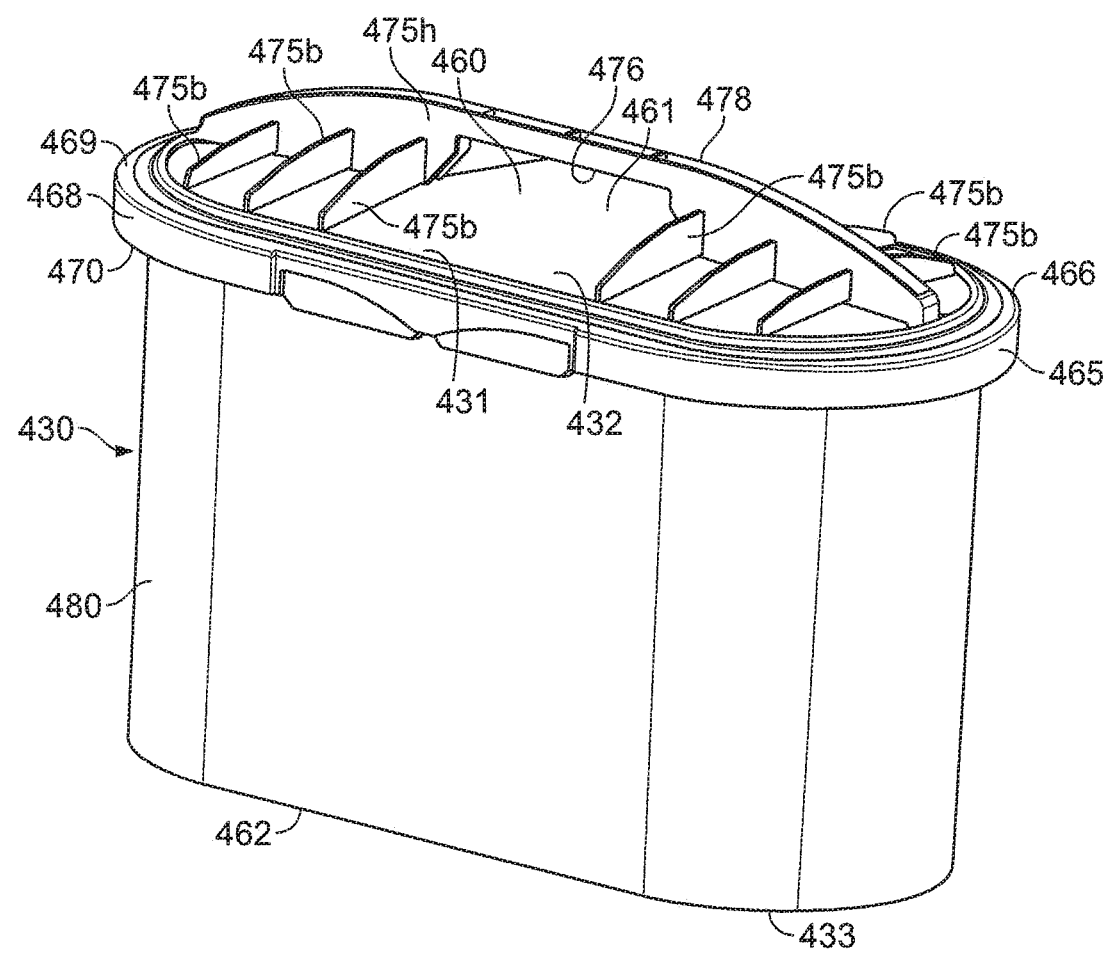
FIG. 15 is a schematic perspective view of a filter cartridge component usable in the air cleaner assembly of FIG. 12.

In FIG. 15, an example filter cartridge 430 is depicted. In general terms, the filter cartridge 430 comprises a media pack 460 positioned in extension between an inlet flow end (or face) 461 and opposite outlet flow end (or face) 462. In general terms, the filter cartridge 430, has opposite inlet and outlet flow ends (faces) 432, 433 respectively, the inlet flow end 432 of the cartridge 430 corresponding to the inlet flow end 461 of the media pack 460; and, the outlet flow end 433 of the filter cartridge 430, corresponding to the outlet flow end 462 of the media pack 460. Thus, in general, the filter cartridge 430 is a straight-through flow construction, i.e., in general air enters one end and exits the other without making a substantial turn within the media pack. In this manner, such filter cartridges are readily distinguishable from well-known cylindrical pleated media filter cartridges, in which the media is coiled around an open interior.

In general terms, in addition to the media pack 460; filter cartridge 430 generally includes a housing seal arrangement 465, thereon. The housing seal arrangement 465 generally comprises a seal member 466 secured to a remainder of the filter cartridge 430 in a manner, and at a location, such that it can form a releasable seal with an air cleaner housing in use, to inhibit air from bypassing the media pack 460 during use. To facilitate this, the seal member 466 will typically be a resilient material of a type typically used for such sealing purposes. An example is a urethane molded to an appropriate hardness usually to a shore A hardness of no greater than 22, often within the ranges 10-18; inclusive.

The example seal member 466 depicted, and as a result the overall housing seal arrangement 465, is configured and positioned as a pinch seal member 468. More specifically, it is a perimeter pinch seal member 469. By this, it is meant that the seal member 466 (and housing seal arrangement 465 generally), extends around a perimeter of the cartridge 430 at a position so that it can be pinched between two housing components under sealing pressure during use. The pinch seal member 469, depicted, is sometimes referred to as an "axial" pinch seal member, since it is configured for sealing pressure between two housing components to be applied in an axial direction, i.e., in a direction of extension of an axis extending through the media 460 from the inlet end 461 to the outlet end 462. Other types of seal arrangements can be used, however, with selected principles of the present disclosure.

Still referring to FIG. 13, the particular filter cartridge 430 depicted, includes an optional handle arrangement 475h thereon in the example oriented adjacent the cartridge inlet end 432 and projecting therefrom in a direction away from the outlet end 433. This positions and orients the handle arrangement 475h where it can be readily grasped to manage servicing of the air cleaner 400. The particular example handle arrangement 475h depicted, includes a central handle bridge 476 defining a space thereunder through which a person's fingers can extend during grasping of the handle member 475h.

The particular handle arrangement 475h depicted comprises a central elongate rib or ridge 478 that extends along a long or cross-sectional axis of the media pack 460, although alternatives are possible. This is discussed further below.

In a typical assembly, as discussed below in connection with FIGS. 34-36, the handle arrangement 475h includes a perimeter frame portion oriented to surround the media 460, and to be engaged by the seal member 468, for example by being embedded the media during assembly. Optional bridgework 475b is depicted to provide for support and structural integrity to such framework. A variety of shapes, sizes and features for the optional handle arrangement 475h can be used.

Still referring to FIG. 15, the depicted filter cartridge 430 includes an optional shell 480. The depicted shell 480 surrounds the media pack 460 and protects the media pack during handling and use. It also can be used to facilitate assembly, as discussed below. The particular shell 480 depicted, extends at least from the seal arrangement 466 to media pack end 462. The shell 480 can be constructed in a variety of ways, and an example is discussed herein below in connection with FIGS. 34-36. The shell 480, in a typical application, would comprise a preform molded plastic, piece, into which the media pack 460 is positioned during assembly of the cartridge 430.

Still referring to FIG. 15, the particular filter cartridge 430 depicted has a non-circular cross-sectional shape, although principles described here can be applied in alternate arrangements. The particular cross-sectional shape is generally oval, although, again, alternatives are possible. In many application of the present techniques, the filter cartridge will have a cross-sectional shape with a long cross-sectional axis in a plane perpendicular to air flow; (and the media pack), and a short axis perpendicular to the long axis and located along a mid-point of the layer axis with: the ratio of the length of the long axis to the short axis (at a location half-way along the length of the long axis) being at least 1.4, often at least 1.7 typically at least 1.8, and within the range of 1.6-3.0, inclusive (for example, within the range of 2.0-2.6 inclusive.

While alternatives are possible, such ratios will be typically be preferred for arrangements according to the present disclosure, in part, because they would relate to an air cleaner having an overall profile that is relatively low in one cross-dimensional to an opposite cross-dimension. Typically, the media pack is at least 100 mm long in extension between flow ends, often at least 150 mm, long, in some instances at least 200 mm long. It can be 250 mm or longer.

In general, the housing body 402 would be configured so that the sealing shelf 490 is configured to mate with the contoured sealing surface 470; and, so that any surrounding outer wall in the housing body is configured to mate with any recessed portion 468, and any recessed sections 468x, 468y therein.

The media pack may have belonged a cross-dimension in a plane perpendicular to a direction between the flow ends, of at least 200 mm, often at least 250 mm, in many instances at least 300 mm, and indeed, in some instances 380 mm or more.

Still referring to FIG. 15, for the typical application according to the present disclosure in which the seal member 468 is a perimeter pinch seal member 469, an axially directed surface 470 of the seal member 469 that is generally directed downstream, i.e., toward cartridge end 433, or media pack end 462, is a critical sealing surface for engagement with the housing 401. This will be understood from the following general characterizations relating to engagement between the cartridge 430 and the housing 401, during installation.

Figure 16:
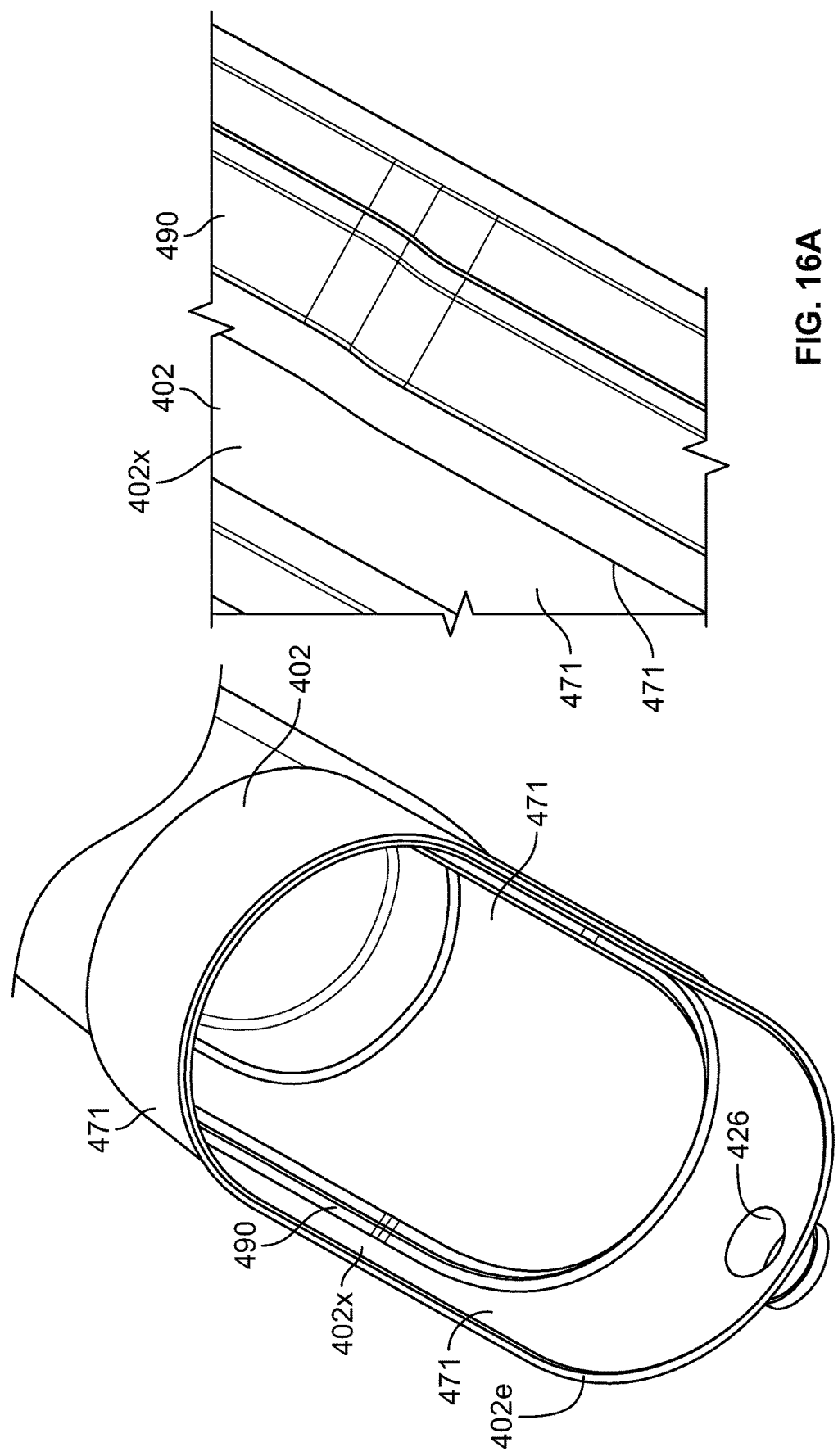
FIG. 16 is a fragmentary schematic inlet end perspective view of a housing body component depicting features usable in the housing body component of FIG. 12 and with the cartridge of FIG. 15.

Attention is now directed to FIG. 16, in which a schematic depiction of features of housing body 402 is provided. In FIG. 16, the portion of housing body 402 depicted is provided schematically, thus, it is depicted devoid of certain features not specifically relevant to the point being made here, for example, external surface ribs, mounting pads, etc. (Also, it is depicted with grid lines 471 that are not structural, but rather are artifacts from a drawing program used).

Referring to FIG. 16, at 490, an internal sealing surface or shelf is depicted, for sealing engagement with the housing seal arrangement 465 of the cartridge. It is against shelf 490 that the seal surface 470 of perimeter pinch seal member 469 is engaged (pressed or biased) to form a releasable, housing seal.

Referring to FIG. 16, it is noted that shelf 490 is recessed inwardly, relative to end 402e of the housing body 402. End 402e is the service access end, and is the end into which the cartridge 430 is installed and from which the cartridge 430 is removed during servicing. It is the end covered by the access cover 403, during use. The amount of recess from end 402e, to shelf 490, is generally managed in accord with various principles. First, if the housing 402 is one that includes a port therethrough adjacent end 402e the recess of shelf 490 is general beyond that port. In FIG. 16, the housing body 402 depicted, includes a evacuator port or dust outlet port 426 and the shelf 490 is recessed toward the outlet end from that port 426.

Also, the shelf 490 is recessed sufficiently far from end 402e, for accommodation of structure on the access cover 403. In the particular example depicted in FIG. 12, the access cover 403 was characterized as a precleaner 410, and thus the shelf 490 is recessed sufficiently far to accommodate structure and operation of the precleaner 410.

In a typical assembly according to the present disclosure, the sealing shelf 490 is recessed, from the inlet end 402e, at least 40 mm, completely there around, usually at least 80 mm, and sometimes at least 100 mm.

In general, the shelf 490 will not be recessed further than an amount necessary to accommodate the various housing and inlet features and their operation. This, however, is not critical with respect to operation, but simply advantageous with respect to having the air cleaner housing 401 not be larger (longer) and heavier than desired for a typical system of interest.

In FIG. 16A, an enlarged fragmentary view of an identified portion of the shelf 490 is shown. It can be seen projecting radially inwardly from a portion of wall 402x on the housing 402 that extends between the shelf 490 and end 402e.

Referring to FIG. 16, it is noted that that end 402e is configured to define an end in a plane generally perpendicular to a flow of direction of air through the body 402; and, shelf 490 is also similarly configured, although alternatives to each are possible. For example, each could define a plane that is not perpendicular to this direction. Further, each could be non-planar, if desired. There is also no specific requirement that the two (end 402 and shelf 490) generally define parallel planes to one another. These variations can be used to be advantage, in a variety of arrangements. It is noted that filter cartridge variations can be made, to accommodate such variations, as well as access core variations.

Indeed, for the specific assembly depicted, it is noted that shelf 490 is generally parallel, but does include variations in shape, in extension around a central axis, to accommodate variations (contouring) in the seal surface 470 of the example cartridge 430, discussed herein below.

In particular, and referring to FIGS. 15-16A, it is noted that the particular seal surface 470 of the perimeter pinched seal member 469 depicted, includes optional contouring, which can be advantageous; and, the housing shelf 490 includes contouring for mating engagement with the seal member, that can also be advantageous. These options, and example possible variations with respect to them, are referenced further herein below.

D. Example Access Cover General Features; Sealing of the Filter Cartridge in Position; General (Optional) Precleaner Features—FIGS. 17-20.

Figure 17:
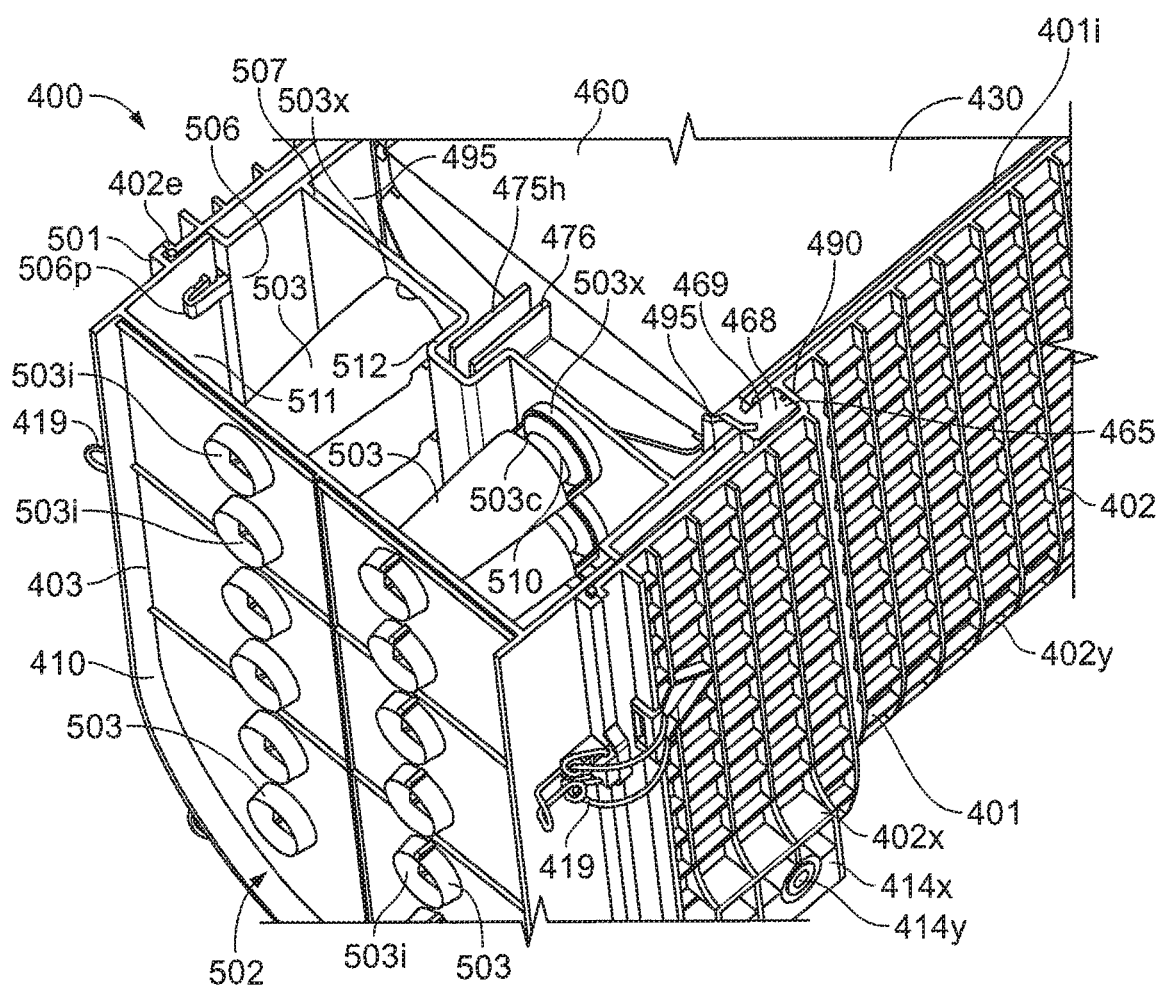
FIG. 17 is an enlarged, fragmentary, schematic, partially cross-sectional view of a portion of the air cleaner assembly of FIG. 12, adjacent the inlet end and showing internal detail.

Attention is now directed to FIG. 17, in which a fragmentary, schematic, cross-sectional view of portions of the assembled air cleaner assembly 400 is depicted. Initial focus with respect to FIG. 17, is on features relating to the securing and sealing of the cartridge 430 in place within the housing 401. In FIG. 17, the fragmentary, cross-sectional view taken is generally through a short axis of the housing 401, FIG. 12.

Referring to FIG. 17, the housing body 402 is depicted in cross-section. One of the mounting pads 414x of mounting pad arrangement 414 can be seen, with a threaded metal insert 414y positioned for engagement by a bolt during mounting. The housing body 402 can be viewed as having an upstream, inlet or first section 402 and a downstream or second section 402y, separated by one another at seal shelf 490.

The inlet end 402e of the housing body 402, then, is the open end of section 402y, remote from the shelf 490.

Still referring to FIG. 17, access cover 403 is viewable secured in position over end 402e, closing the end 402e. The access cover is constructed, sized and arranged to apply (when installed) pressure sealing to the perimeter pinch seal member 469 on the cartridge 430. To provide for this, the access cover 403 includes a pressure flange 495 oriented sized and positioned to extend into the housing body 402 sufficiently far to engage the housing seal arrangement 465, as discussed below, while applying pressure to the pinch seal member 469 sufficient to ensure sealing engagement between the seal surface 470 and the housing seal shelf 490.

Figure 17A:
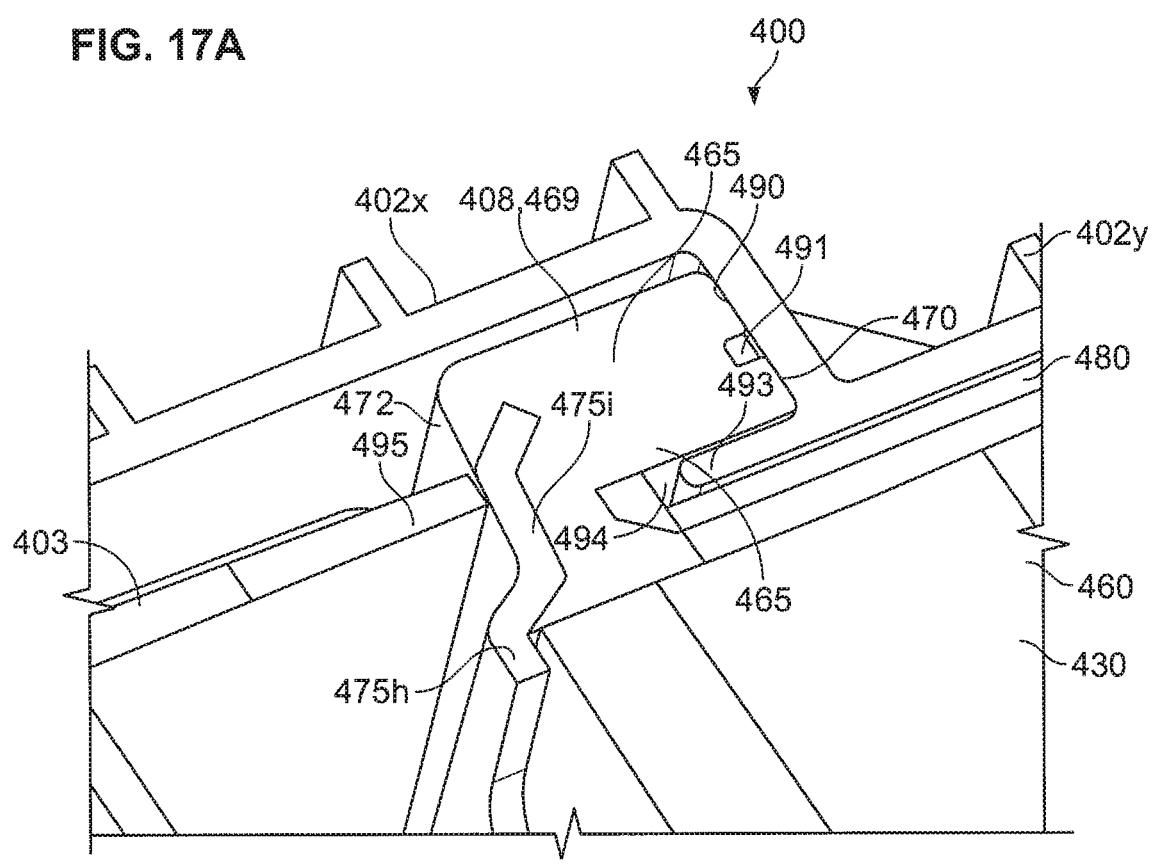
FIG. 17A is a second enlarged fragmentary schematic cross-sectional view of a portion of an air cleaner assembly of FIG. 12 and oriented analogous to FIG. 17.

With respect to engagement among the access cover 403, the seal arrangement 468 and the housing body 402, attention is now directed to FIG. 17A. FIG. 17A is an enlarged fragmentary view analogous to FIG. 17 and showing an example of where the interaction occurs.

Referring to FIG. 17A, at 469 the pinch seal member is viewable. At 470, the seal surface is depicted, biased toward (against) shelf 490. The (seal) biasing projection or pressure flange 495 on the access cover 403 can be seen pressed against surface 472 of seal arrangement 468 (surface 472 being opposite surface 470) and pushing the seal arrangement 468 toward shelf 490.

In FIG. 17A, a portion of the media pack 460 of the cartridge 430 is depicted. Also, a portion 475i of the optional handle arrangement 475h is shown embedded in a portion of the seal arrangement 465. This optional feature is discussed further herein below.

Still referring to FIG. 17A. Several features with respect to the engagement between the housing seal arrangement 468 and the housing body 402 are indicated. First, the shelf 490 is depicted with a central perimeter rib 491 thereon, that projects toward end 402e, FIG. 17, and is located to press into surface 470 during sealing to facilitate the sealing interaction. The rib 491 would typically be continuous in extension along the shelf 490 around a perimeter of the interior although alternatives are possible. A typical rib would be about 2 mm wide and 2 mm high. A typical shelf 540 will be about 5-115 mm wide.

Also, the housing 402 is depicted with an internal flange or projection 493 (a cartridge locating or centering flange) that extends into an optional groove, receiver or trough 494 located between a portion of the seal arrangement 468 and the media pack 430. This facilitates retention of the seal member 468 and is discussed further below. It is an optional, but generally advantageous, feature. Typically, the flange 493 will be continuous in the extension around the interior of the housing 402, but alternatives are possible. Typically, the flange 493 will project the distance of at least 4 mm, usually at least 8 mm, and often more from shelf 490, but alternatives are possible. Typically, the flange 493 will be sufficiently long for an end of recess 454 to bottom out thereagainst, when proper installation occurs. There may be contouring in shelf 490, but typically an end of flange 493 will be planer.

During installation, biasing pressure needs to be applied to the access cover 403, to provide for pressure of the pressure flange 495 against the cartridge 430, and in particular the housing seal arrangement 465. The biasing pressure can be applied in a variety of ways. For the example depicted in FIG. 17, the biasing pressure is provided by latches 419 of the over-center latch arrangement 418, it is noted that alternatives are possible, including fasteners such as bolts or alternate connectors.

Figure 18:
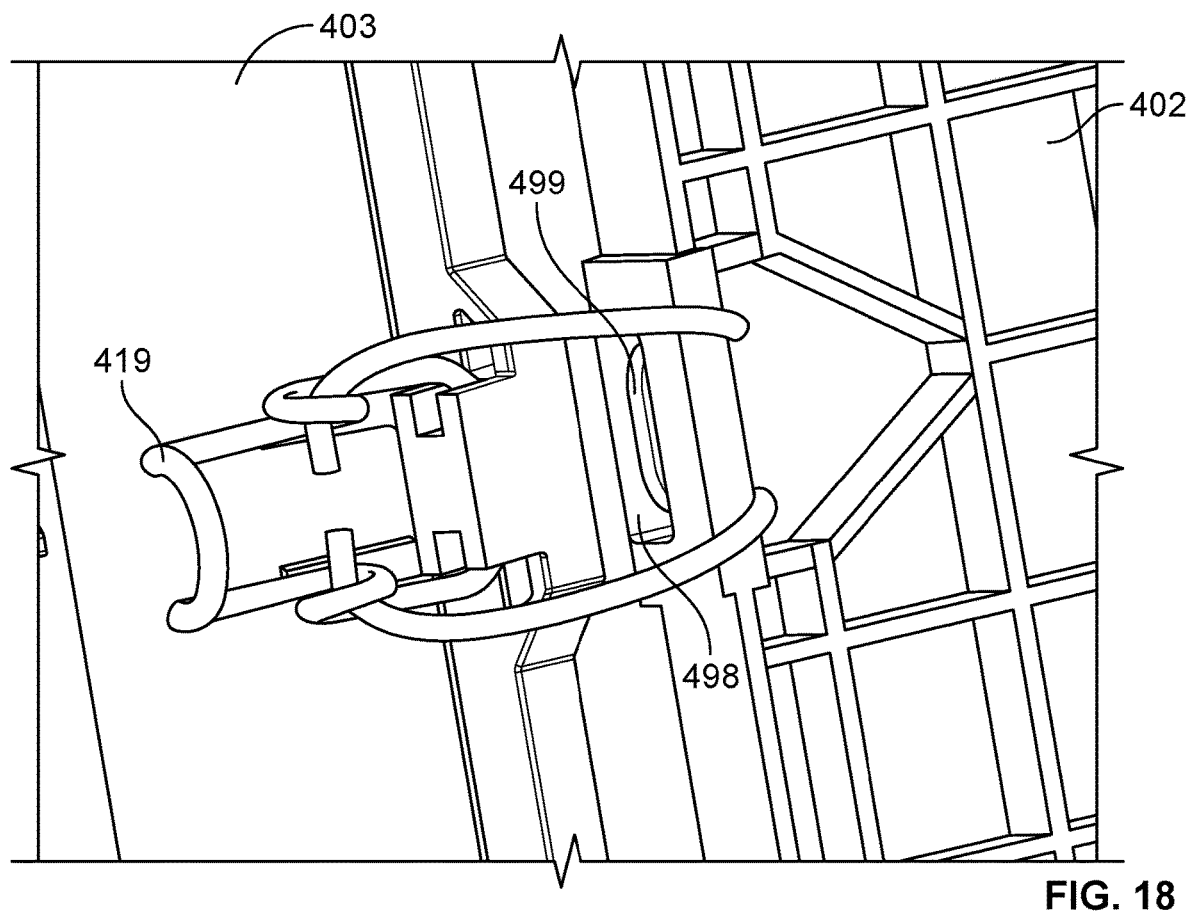
FIG. 18 is an enlarged fragmentary schematic view of a portion of the air cleaner assembly of FIG. 12 adjacent a latch portion.

In FIG. 18, one of the wire latches 419 is shown mounted on the access cover 403 and in engagement with the housing body 402. The particular housing body 402 depicted includes a receiving pocket 498 through a portion thereof, to receive end projection 499 on the latch 419, when the latch is fully secured, in a convenient manner that is fairly easy to assemble and straight forward to observe or seal if incorrect or incomplete installation has occurred.

As indicated previously, the particular access cover 403 depicted, comprises an optional precleaner assembly 410. General features and operation at a precleaner assembly 410 can be understood from reference to FIG. 17.

Referring to FIG. 17, the precleaner 410 as previously indicated, generally comprises an outer cover 410a and an inner cover 410b, secured to one another. The outer cover 410a depicted, includes a perimeter mounting flange 501, which is aligned within end 402e of the housing body 402 during installation. Typically, a weather seal member (not shown) such as an o-ring seal will be positioned between the access cover 403 and the housing body 402.

The outer cover 410a includes an array 502 of flow separator (inlet) tubes 503 therein. The tubes 503 are typically sized to project at least 40 mm, often at least 60 mm into the housing body. Typically, the tubes 503 are preformed and pressed-fit into apertures in the cover 510a during assembly. In general, each separator tube 503 includes an upstream inlet end 503i, into which air (to be filtered) entering the air cleaner assembly 400 passes. In or adjacent to the end 503i, each tube 503 includes a vane arrangement, configured to import (direct) a cyclonic flow for the inlet air. The tubes 503 generally each include an end 503x opposite the inlet end 503i. Each end 503x is pressed against a tube sheet portion 507 of inner cover 510b, discussed below. Each separator tube end 503x includes a side (cyclonic outlet) slot 503c through which contaminant (dust, particulate contamination ejector or water) separated by the flow separator arrangement exit the tubes 503 for eventual ejection through housing contamination ejection port arrangement 426, FIG. 16 in manners discussed below.

The inner cover 410b includes a perimeter (outer) wall 506 and a central tube sheet section 507. The perimeter wall 506 extends around an outer portion of the precleaner 410, and engages the outer cover 410a. The perimeter (outer) wall 506 includes pressure flange 495 thereon, the example depicted.

In more general, terms, the access cover 403 includes an inner perimeter flange that projects into the housing sufficiently far, to engage the filter cartridge, via the housing seal arrangement. That flange is generally an end of an inner perimeter shield or cover. In the example depicted, it comprises a portion of the combination outer cover and inner cover of the air precleaner assembly.

The tube sheet section 507 extends across the perimeter wall 506. It includes a plurality of outlet tubes, an example indicated at 510. One of these tubes 510 extends into each inlet tube 503, and receives air that has entered that inlet tube 503 and allows that air to pass through the tube sheet 507 to an interior 401 of the housing 401, and eventually to the cartridge 430. Typically, the outlet tubes 510 are molded (formed) integral with the remainder of the inner cover 410b.

The inner cover 410b would typically be made or molded separately from the outer cover 410a and be secured thereto. A variety of securing approaches can be used, including snap-fit or alternates. In some instances, the two may be secured together in a manner that can never be disassembled. In other applications it may be desirable to configure them to allow disassembly for servicing or internal cleaning. For the particular precleaner assembly 410 depicted in FIG. 17, the perimeter or outer flange 506 is depicted as including a plurality of snap-fit members 506p thereon, positioned for snap-fit engagement with a perimeter rim portion 511, of the outer cover 410a.

In more general terms, the precleaner assembly 410 include a snap-fit arrangement between the inner cover 410b and the outer cover 410a. The snap-fit arrangement, in general, comprises a component position on each. In the example depicted, the component position on the inner cover 410b, is a projection spring clip or spring projection method 406p; and, the member positioned on the outer cover 410a comprises a recess for recent engagement by the clip 506p. It is anticipated that a plurality of space clip 506p would be used in a typical arrangement, i.e., engaging a recess in the outer cover 510a. A variety of alternatives are possible.

Still referring to FIG. 17, the tube sheet section 507 is depicted as including an optional central receiver recess, groove or trough 512 therein, extending toward the outer cover 410a, for receipt therein of a portion of the optional handle arrangement 475h; in particular the handle ridge 476 during assembly.

It will be understood that, in general, the presence of absence of the receiver 512, and its particular shape, size and location, are optional. For example, in some applications, the precleaner 410 (or access cover 403, along with other portions of the housing 401) could be sized so that even if present, the handle arrangement 475h would not project as far as to require a receiver 512 in the full engagement. Also, the handle member 475h could be oriented differently, and thus the receiver receiving groove could be positioned differently. Of course, in some instances, the handle member 475h may be absent, or may be of a different construction.

In more general terms, the assembly 400 includes a cartridge-to-access cover projection/receiver arrangement having: a first member on the main filter cartridge 430 and a second member on the access cover 403, in this instance on the precleaner 410. In the example depicted, the member on the cartridge is a projecting member, in the form of the handle arrangement; and, the member on the access cover (or precleaner) is a projecting member, i.e., the recess or groove 512. Alternatives, however, are possible. For the particular example depicted, the groove or recess 512 generally has an elongate shape (a trough of long dimension) with a ratio of maximum depth to maximum width of at least 0.5, typically not greater than 1.5, and often within the range of 0.75-1.25, inclusive.

Figure 19:
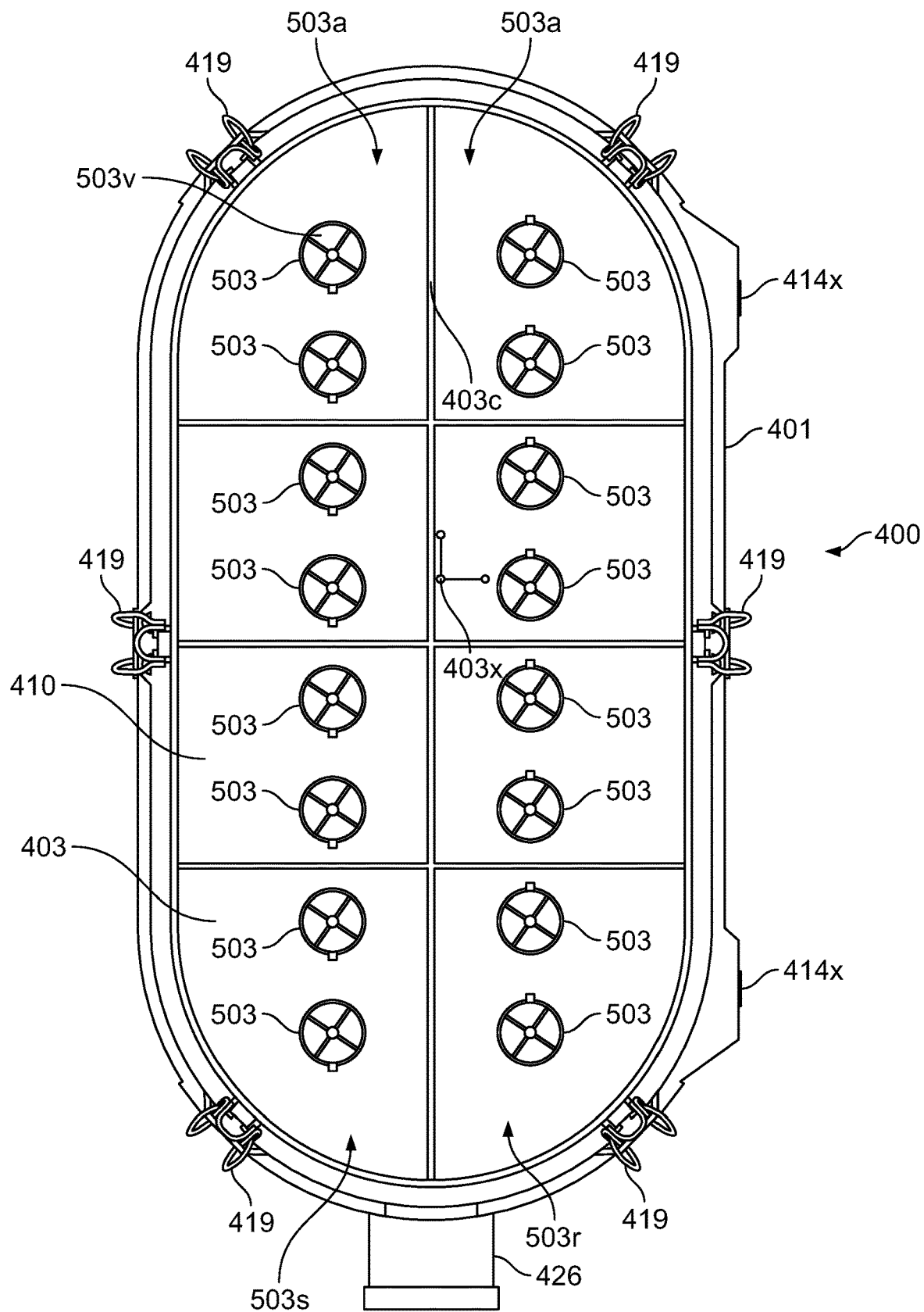
FIG. 19 is schematic, inlet end, elevational view of the air cleaner assembly of FIG. 12.

Attention is now directed to FIG. 19, a schematic plan view taken generally toward an end of the air cleaner assembly 400, in particular toward access cover 403, i.e., toward optional precleaner arrangement 410. Various features previously discussed are indicated by like reference numerals. Attention is directed to the array 503a of inlet tubes 503. The internal vane arrangements 503v can be viewed, one in each tube 503.

It is noted that the particular example array 503a depicted has the inlet tubes 503 oriented in at least two linear (in the example vertical) rows 503r, 503s, respectively. These rows 503r, 503s are each generally linear in the example depicted, with one positioned at each side of a vertical center 403x of the access cover 403.

A variety of arrangements or array configurations for the tubes 503 are possible. The linear arrangement depicted, is convenient for an assembly having a configuration generally analogous to the one depicted.

In particular, for the example depicted the long dimension of the housing is generally oriented vertically during mounting. It is typically convenient to have a linear arrangement of separator tubes 503 generally parallel to this longer dimension or vertical orientation. The number of vertical rows example (503r, 503s) is a matter of: having an adequate number of separator tubes for efficient operation; and, the amount of width (horizontal dimension) available for mounting the tubes.

Figure 20:
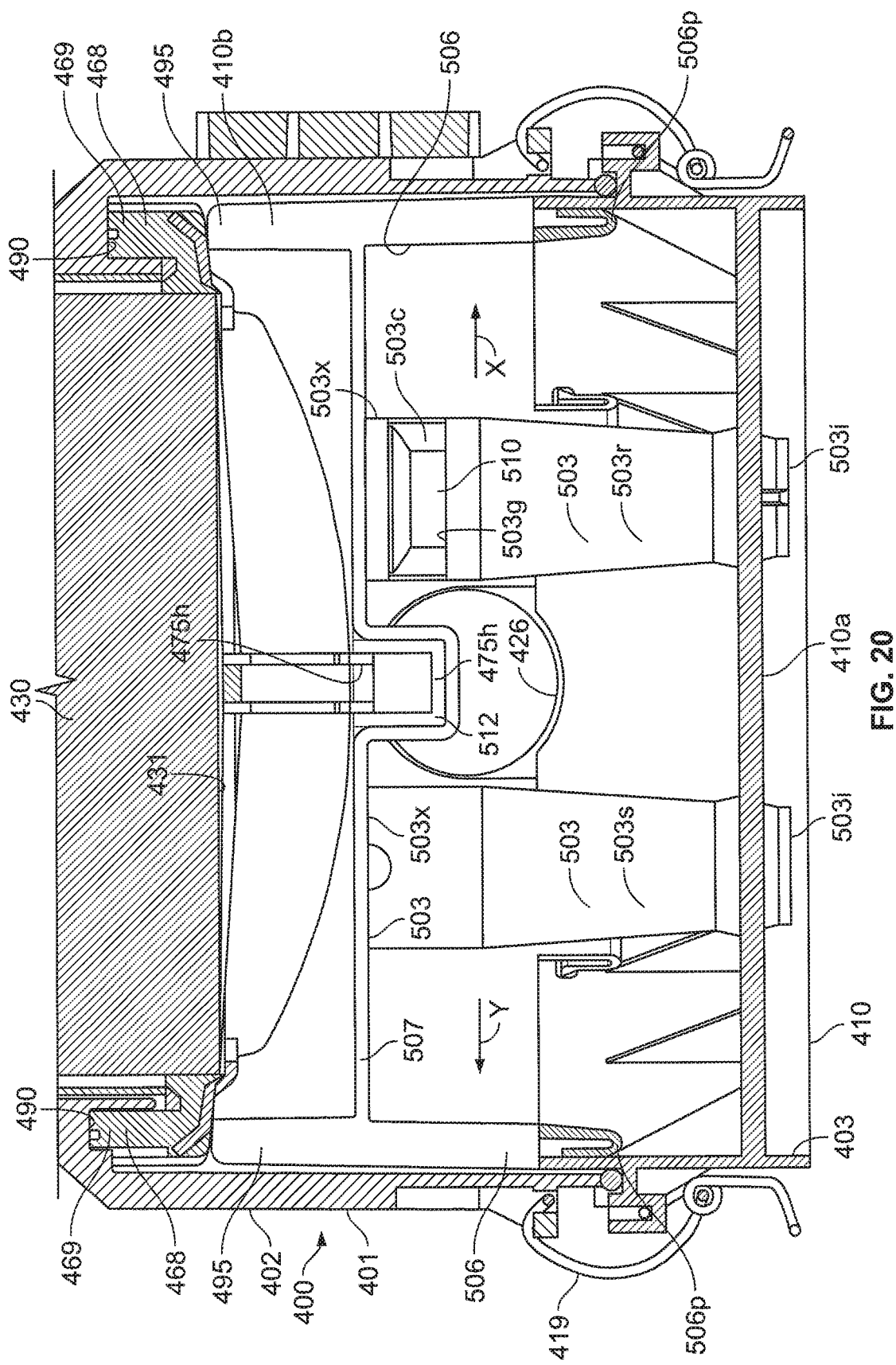
FIG. 20 is a fragmentary schematic enlarged cross-sectional view of a portion of the air cleaner assembly of FIG. 12, showing selected internal detail adjacent an inlet end.

The rotational orientation of each of the tubes 503 is also a matter of optional preference as discussed further in connection with FIG. 20.

FIG. 20 is a schematic, cross-sectional view taken through the assembly 400 in a region adjacent the precleaner 410, and directed downwardly to contaminant ejection port 426. In FIG. 20, outer cover 410a with tubes 503 therein is viewable; also viewable is inner cover 410b with pressure flange 495 and perimeter 506 with snap-fit members 506p and tube sheet 507. The optional receiving groove 512 and the tube sheet 507 is also viewable, receiving optional handle arrangement 475h on the cartridge 430.

The housing seal 468 is viewable biased against shelf 490 by the pressure flange 495.

In FIG. 20, the shelf 490 at opposite sides of the cartridge 430, is shown differently, because at these locations the seal member 469 is shaped differently, with respect to the amount of extension away from intel flow end or surface 431 of the cartridge 430, in a direction toward an opposite flow end or surface. This optional contouring of the seal member 469 is discussed further below.

Referring to FIG. 20, an optional, preferred, rotational configuration of flow separator tubes 503 will be understood. In general each tube 503 operates with a centrifugal separation of contaminant conducted internally. To accomplish this, the air entering the inlet ends 503i, as generally directed into a cyclonic pattern by the vanes 503v, FIG. 19. For purposes of this discussion, it will be assumed that each tube 503 is constructed analogously to the others. Also, it is assumed that the vane arrangement 503v is configured in each, to direct entering air into a cyclonic pattern with a clockwise rotation, viewing the inlet ends 503i from the orientation of FIG. 19, i.e., toward the access cover 403. (Alternatives to each of the these are possible).

Each tube 503, as discussed previously, includes a contaminant ejection slot 503c in a sidewall thereof. Each tube slot 503c is typically arcuate opening in a sidewall portion of 503 a tube adjacent, but spaced from, end 503x. The arcuate extension typically is within the range of 170°-190°, often about 180°. It is generally chosen/designed by the flow separator tube designer, for maximum efficiency of operation. The outlet 503c can be understood to be a cyclonic outlet, and generally swirling material will exit in a somewhat right angle direction relative to a center of the associated slot 503c. For the tube 503r on the right of FIG. 20, such an ejection course will generally direct the contaminant in the direction of arrow X; for the tubes 503s on the left in FIG. 20, it will generally direct the contaminant in the direction of arrow Y.

In general terms, it is desired for efficient separation that the contaminant make its way to the outlet port 426 in an efficient manner. A reason for the preferred path X for the tubes 503r on the right, is that it generally directs the contaminant toward the outer wall 506, and eventually downwardly toward the tube 426; and, the reason the path Y is preferred for the tubes 502l on the left, is the same, i.e., each directs the contaminant in a preferred direction for efficient separation from an interior of the precleaner 410 to the port 426. To accomplish this, it is preferred then to orient the tubes on the right 503r differently than the tubes 402l. In particular, for the tubes 503r on the right, the outlet slot 503c is directed (centered) toward the viewer; i.e., in a direction (up) away from the outlet 426; and, the tubes on the left 503s are oriented (centered) with the outlet 503c directed opposite or downwardly, i.e., toward port 426. This can lead to efficient separation.

E. The Optional Safety Filter, FIGS. 21-23

As indicated previously, the air cleaner assembly 400 depicted, can include an optional safety cartridge 435, FIG. 13 therein. An example construction for such a safety element or cartridge can be understood in general, from reference to FIGS. 21-23.

Figure 21:
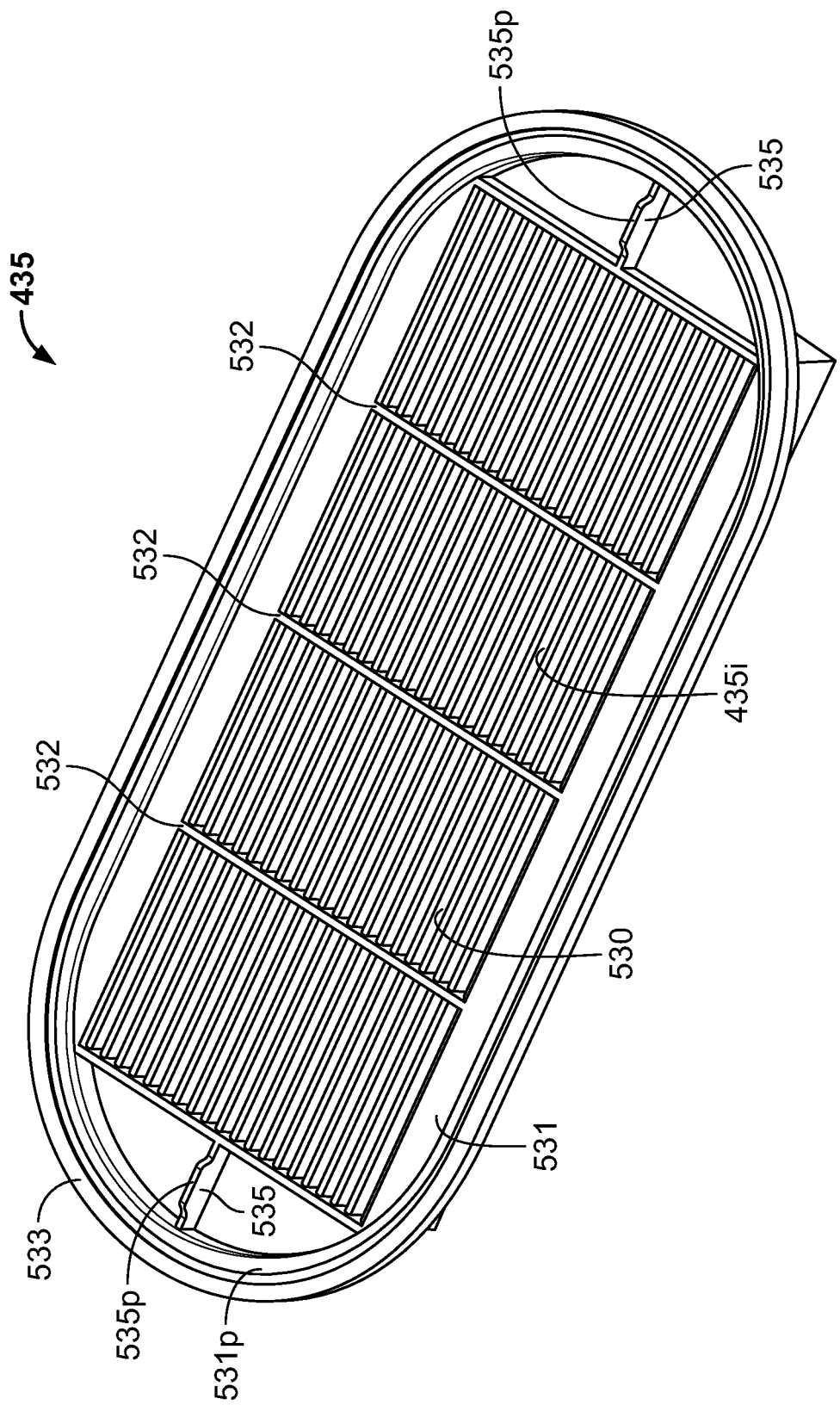
FIG. 21 is a schematic, inlet end, perspective view of a secondary or safety filter cartridge component of the assembly of FIG. 12.

Referring to FIG. 21, in general the cartridge 435 comprises media 530 through which air passing out from outlet end 432 of cartridge 430, in use, will pass as it moves to the outlet arrangement 405 (FIG. 13). The media 530 provides a number of functions. First, it will capture any dust that might pass through the main cartridge 430, for example should there be a failure in the media of cartridge 430 (or cartridge or seal integrity). Secondly, the media 530 will help prevent dust from being knocked into the outlet region 405, during servicing of cartridge 430.

As previously discussed, the cartridge 435, when used, is generally a separate component from the main cartridge 430, so it can be kept in place as the main cartridge 430 is serviced. The media 530 is generally secured in a frame 531, separate from the main cartridge 430. In the example, FIG. 21, the media 530 is pleated media, with the pleats extending in a long dimension of the frame 531. The frame 531 includes pleat spacers 532 to help maintain spacing integrity of adjacent pleats.

Typically, when the optional safety cartridge 435 is as depicted, the frame 531 is molded-in-place on the media 530, although alternatives are possible. Still referring to FIG. 21, the example depicted frame 531 includes an outer perimeter 531p with a seal member 533 positioned thereon. The seal member 533 is, generally, a resilient member and can be molded-in-place. It can also comprise a separately formed gasket attached to the frame 530.

Still referring to FIG. 21, the frame member 531 depicted includes a handle arrangement 535 thereon, to facilitate installation removal. The depicted handle arrangement 535 optionally comprises a plurality (in the example, two) spaced handle projections 535p oriented to project toward the main filter cartridge, during installation. The two example optional handle projections 535p depicted are oriented at (generally adjacent) opposite ends (longer dimension) of the frame 531 and media 530.

In the example cartridge 435 depicted in FIG. 21, the handle arrangement 535 is an integrally molded portion of the frame 531, although alternatives are possible.

In FIG. 21, the view is generally toward an inlet end or surface 435i of the cartridge 435. The inlet end or surface 435i would generally be the end that receives air flow during use.

In the example depicted, FIG. 21, the secondary or safety cartridge 435 has a long cross-dimension and a short cross-dimension; and, the handle arrangement comprises projections 535p aligned with the longer dimension; in the example depicted approximately collinear in position with the longer dimension, although alternatives are possible.

Figure 22:
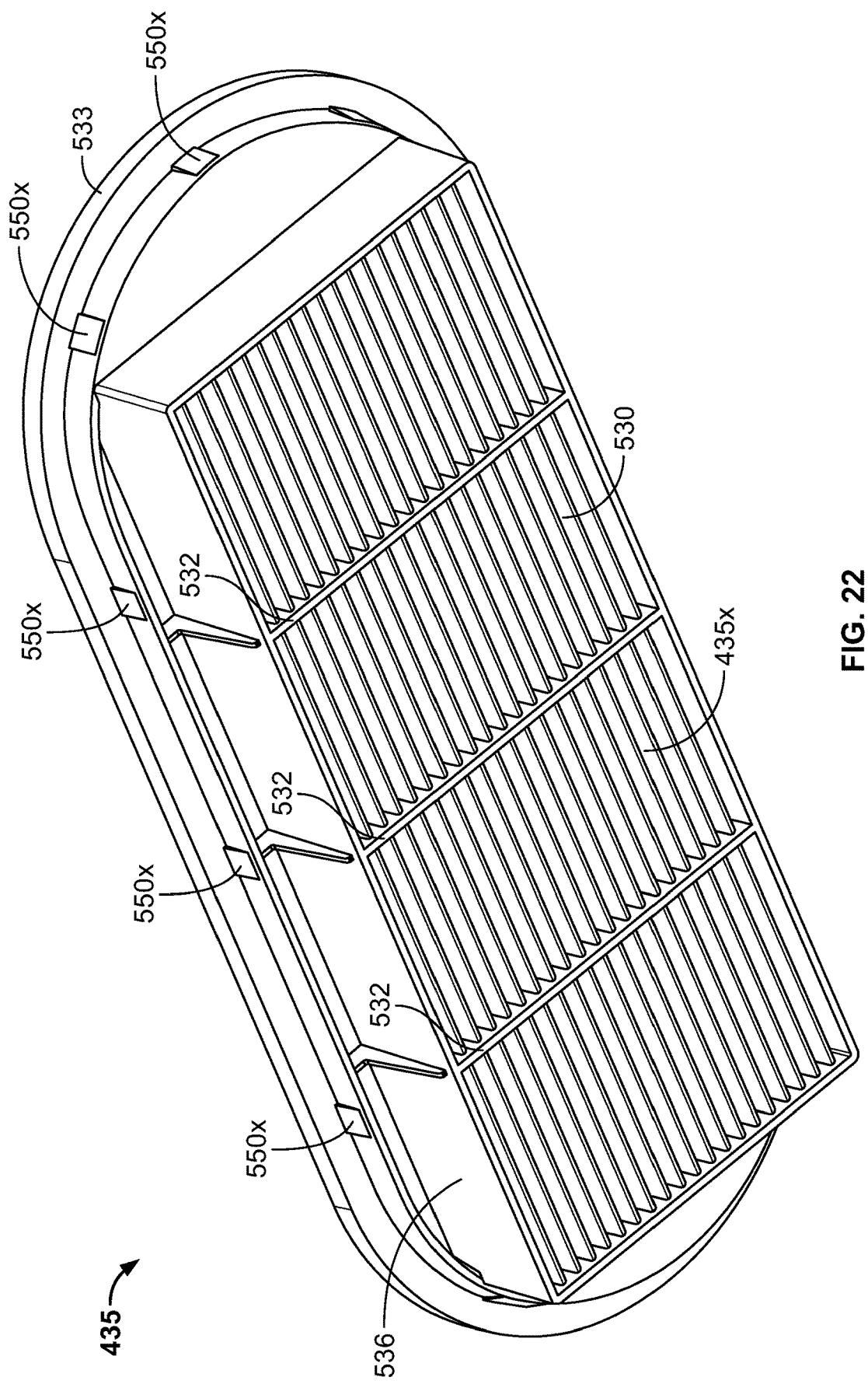
FIG. 22 is a schematic, outlet end, perspective view of the secondary filter cartridge component of the assembly of FIG. 12.

In FIG. 22, perspective view toward an opposite air flow outlet end or surface 435x of the cartridge 435 is depicted; i.e., FIG. 22 is a view opposite the view of FIG. 21. One can see that the frame section 531 includes a perimeter frame section 536 surrounding the (pleated) media 530.

Figure 23:
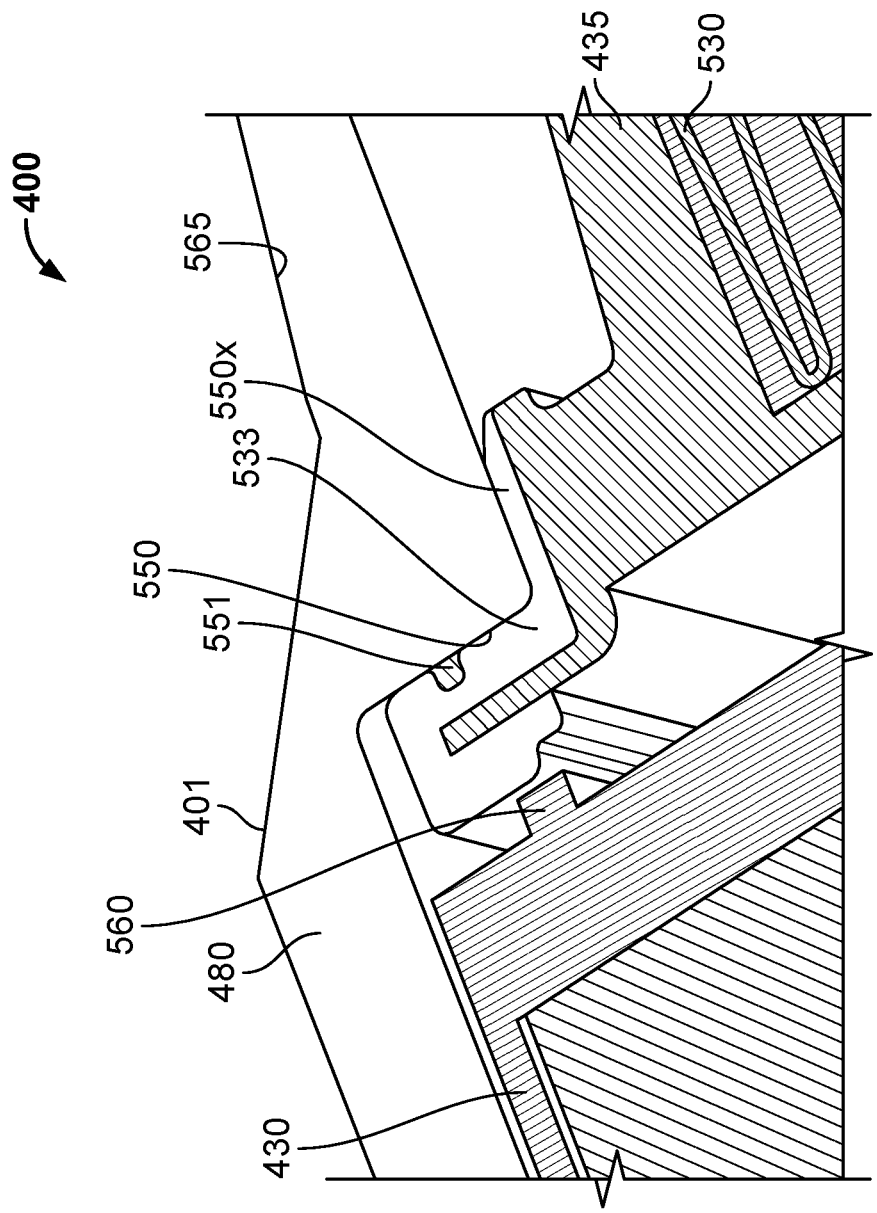
FIG. 23 is an enlarged, schematic, fragmentary cross-sectional view depicting a portion of the assembly of FIG. 12 adjacent the secondary filter cartridge of FIGS. 21 and 22.

In FIG. 23, the schematic, fragmentary and enlarged view showing the assembly 400 in the region of the safety cartridge 435 is depicted. The housing body 402 can be seen as having a safety seal shelf 550 therein for engagement by the seal member 533 on the safety cartridge 435. The safety seal shelf 550 is depicted with a perimeter sealing rib 551 thereon, projected toward the housing inlet end, FIG. 13.

In FIG. 23, the safety cartridge 435 is viewed with seal 533, pressed against surface 550 and rib 551, with biasing pressure being provided by pressure flange or abutment 560 on shell 480 of main cartridge 430. The cartridge 435 depicted is provided with an optional resilient, axial, side extension 550x positioned along a side of frame 531, to engage wall section 565 in a resilient, radial, resistance fit, manner, so that the cartridge 435 will tend to be retained in place even when the pressure from flange 560 is released by removal of the cartridge 430. In FIG. 22, optional sections 556x are shown as spaces extensions of material integral with the seal arrangement 533.

III. An Example Prototype System, FIGS. 24-26

Figure 24:
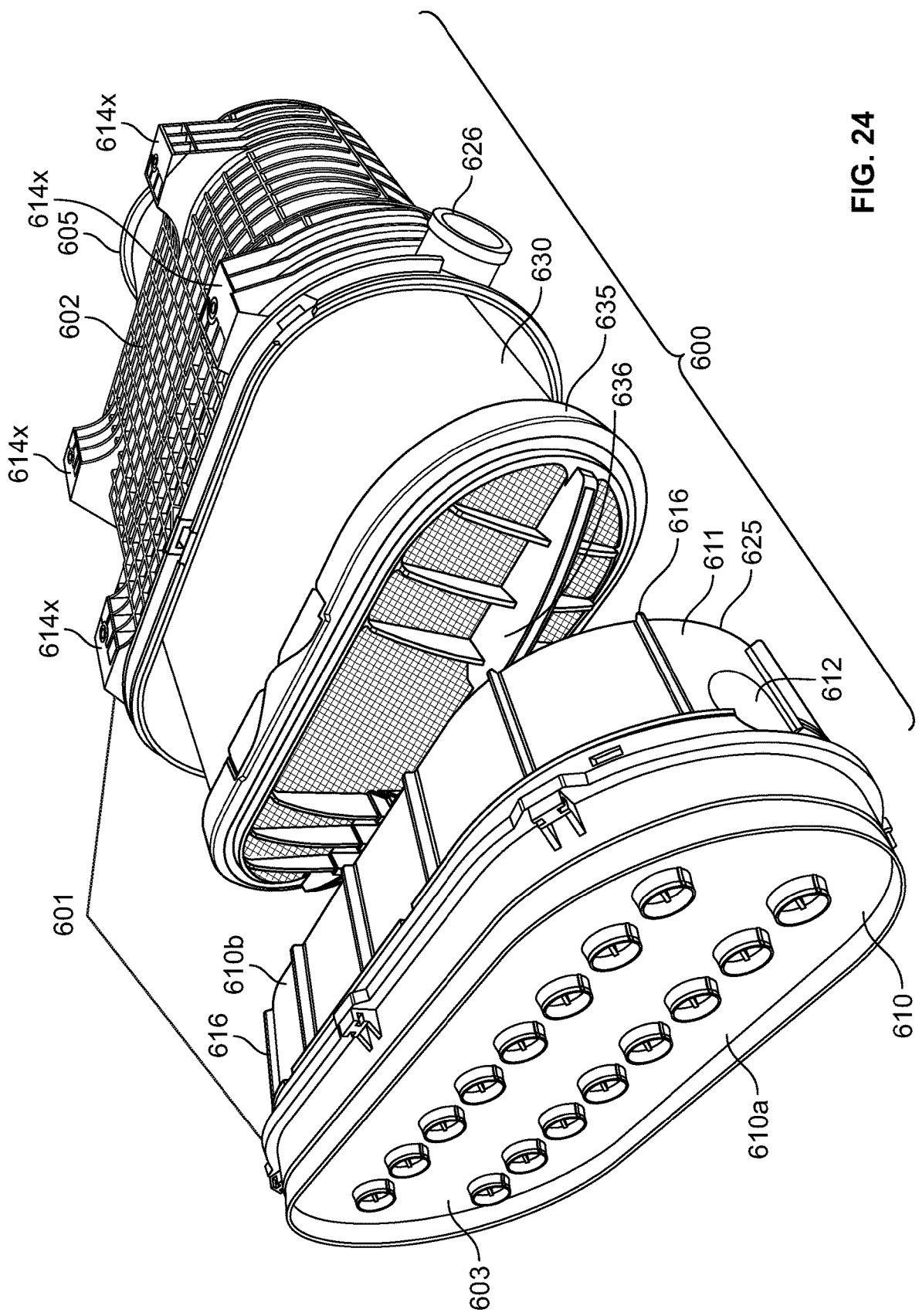
FIG. 24 is an exploded perspective view of a prototype air cleaner assembly having selected features in general accord with various features of the example assembly of FIG. 12.
Figure 25:
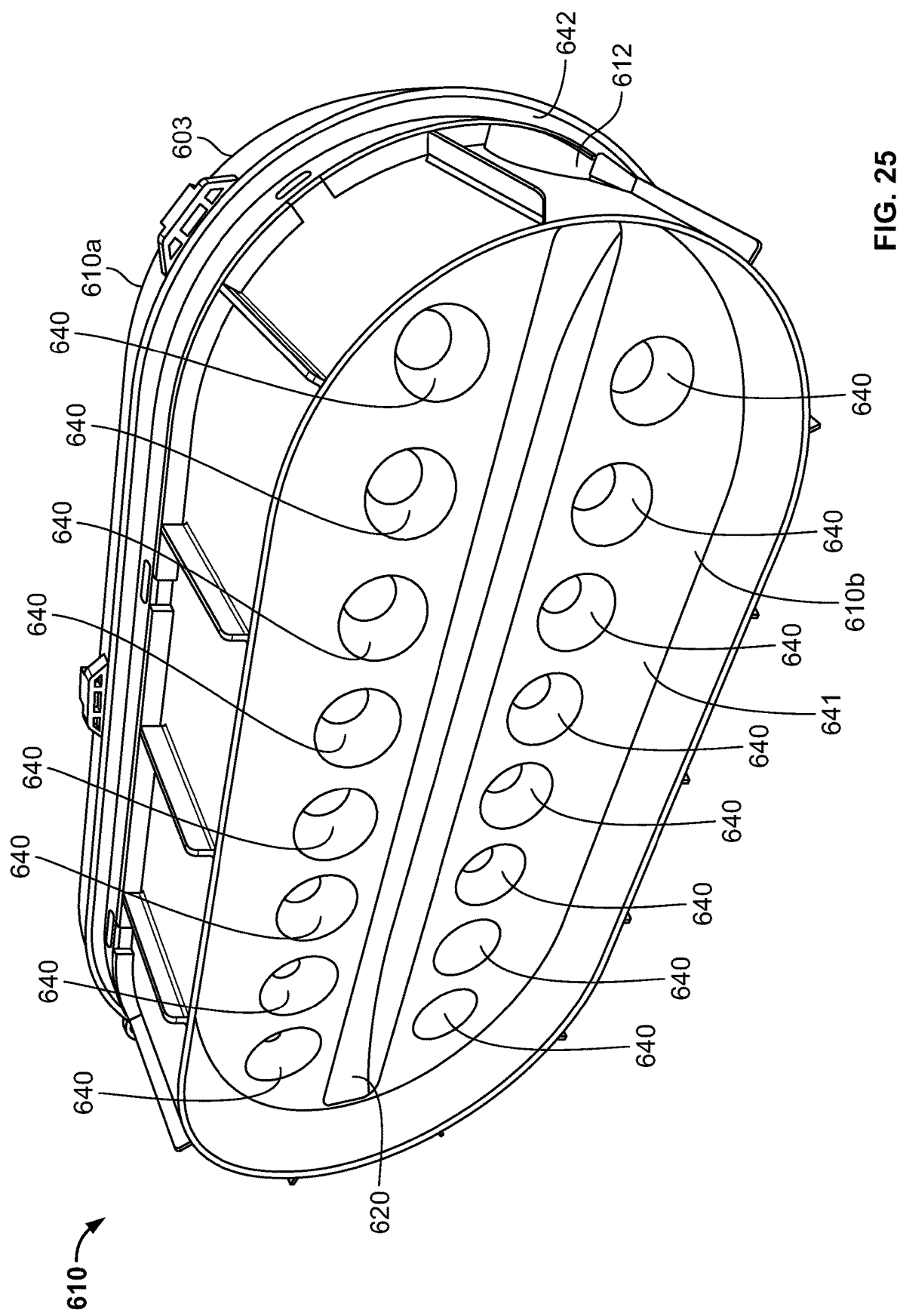
FIG. 25 is an enlarged perspective of an outlet end of a precleaner assembly of the air cleaner assembly of FIG. 24.
Figure 26:
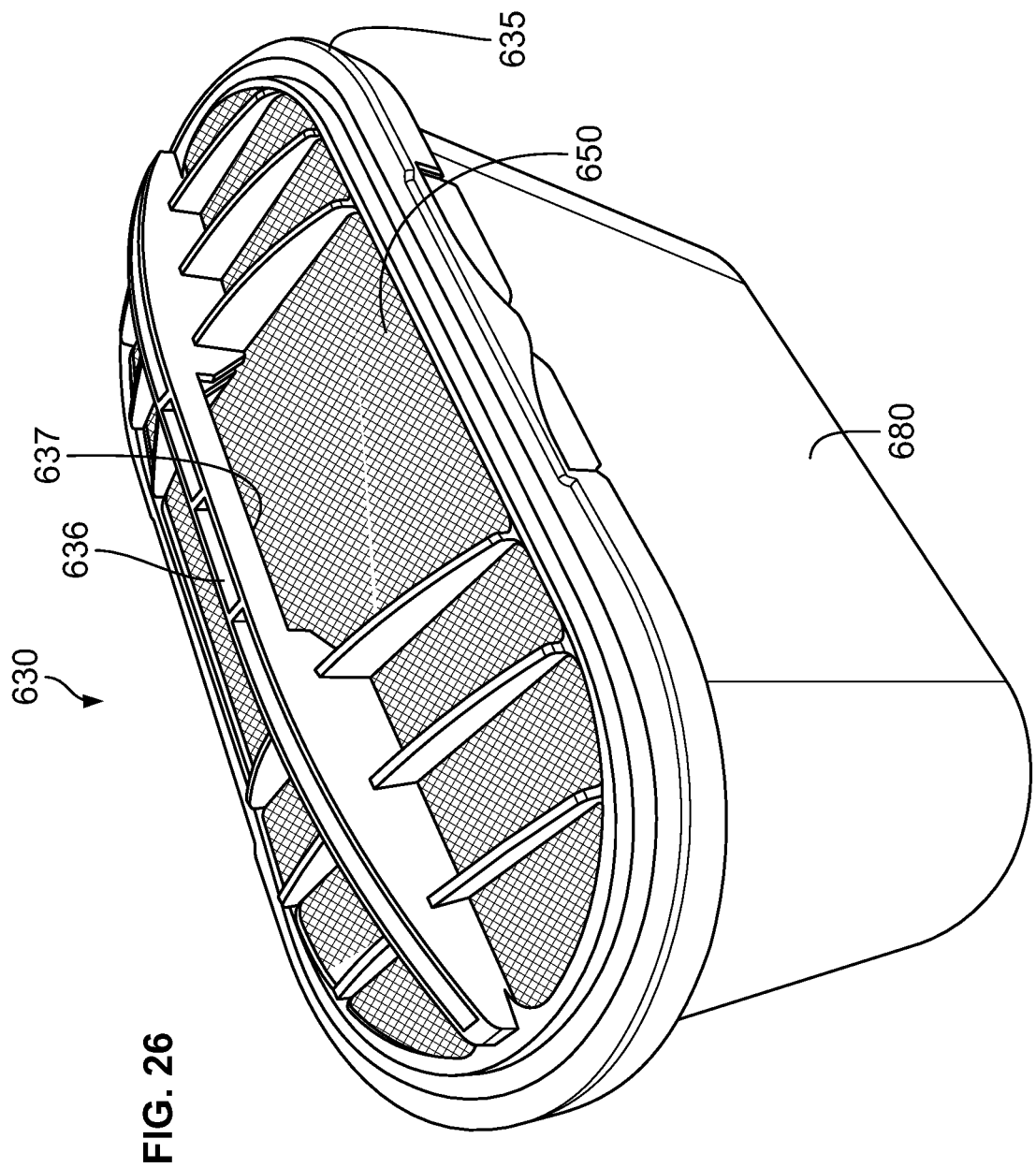
FIG. 26 is an inlet end perspective view of a prototype primary or main filter cartridge of the air cleaner assembly of FIG. 24.

In FIGS. 24-26, a prototype system is depicted, which embodies many of the features characterized herein above. Referring to FIG. 24, the prototype air cleaner assembly is generally indicated at 600, in partially exploded view. The assembly 600 includes a housing 601 comprising a body 602 and access cover 603; the access cover 603 in the example comprising a precleaner 610. Contaminant ejection from the precleaner 610 is shown through precleaner sidewall 611 at aperture 612; allowing for dust to reach contaminant ejection port 626 in the body 602.

A serviceable removable main filter cartridge 630 is depicted. The main filter cartridge 630 can be removed and replaced when the access cover 603 is removed, in general accord with descriptions herein.

Still referring to FIG. 24, it is noted that the air cleaner assembly 600 depicted, is shown oriented on its side, relative to an orientation for use. In a typical use, the air cleaner assembly 600 would be depicted with evacuator port 626 directed downwardly.

In the assembly of FIG. 24, then, access cover 603 represents an inlet end of the housing 601; an outlet from the housing being indicated at 605, for outlet air (filtered) to be moved from the assembly 600. The housing body 602 is depicted with mounting pads 614x, by which it could be secured to equipment.

Still referring to FIG. 24, the precleaner 610 is depicted as comprising an outer cover 610a secured to an inner cover 610b. The inner cover 610b is depicted as having an outer perimeter with a plurality of optional, spaced, projections 616 thereon. These optional projections 616 depicted are generally configured as axial ribs, extending in a direction of air flow through the precleaner 610. The projections 616 can provide for a plurality of functions. First, when in the form of ribs shown, and used on a molded plastic component, they can provide for strengthening, especially axial strengthen, (i.e. strengthening in the air flow through the assembly 600). The ribs can also facilitate maintaining secure, centered, positioning of the access cover 610 without rattling or movement. Finally, the ribs can help strengthen pressure flange 625, which of course, presses against a housing seal arrangement 635 on the filter cartridge 630 in use.

It is noted that in FIG. 24, the assembly 600 is depicted without latch members thereon that would typically be used during use.

In FIG. 25, a perspective view of the precleaner 610 is shown, depicted toward an interior surface or cover 610b. Here, an optional receiving groove 620, analogous to groove 512, FIG. 20, is viewable. It is into groove 620 that an optional handle arrangement 636 (FIG. 24) on the cartridge 630 would extend, during use. Of course, if the optional handle member had a different shape or orientation, the optional groove 620 would have a different shape or orientation.

Still referring to FIG. 25, outlet tubes 640 in tube sheet 641 are viewable in an array analogous to the example previously discussed in connection with FIG. 19.

In FIG. 25, optional o-ring 642 is shown positioned on the access cover 603 (i.e. on the precleaner 610) at a location where it will be compressed between the access cover and the housing body 602 during use. The o-ring 642 is a weather seal, and also will provide for a vibration dampening interaction between the access cover 603 and the body 602. Alternative cushions gaskets, or weather seal arrangements to an o-ring can be used, the o-ring 642 depicted, being an optional, typical, example.

In FIG. 26, a respective view of cartridge 630 is provided. Handle arrangement 631 with longitudinal ridge 637 is viewable, as well as media 650 and perimeter housing seal arrangement 635.

The cartridge 630 may be in general accord with the description provided herein above, for cartridge 430, FIG. 15.

It is noted, however, that the particular assembly depicted in FIGS. 24 and 25 may be provided without the optional safety filter cartridge, and thus optional shell 680, FIG. 26, may be provided without a safety element pressure flange of the type characterized herein above at 560 (FIG. 23).

IV. Some Example Selected Features and Optional Variations

A. Further Selected (Optional) Features and Variations of the Access Cover, Precleaner and Housing, FIGS. 27-30

Figure 27:
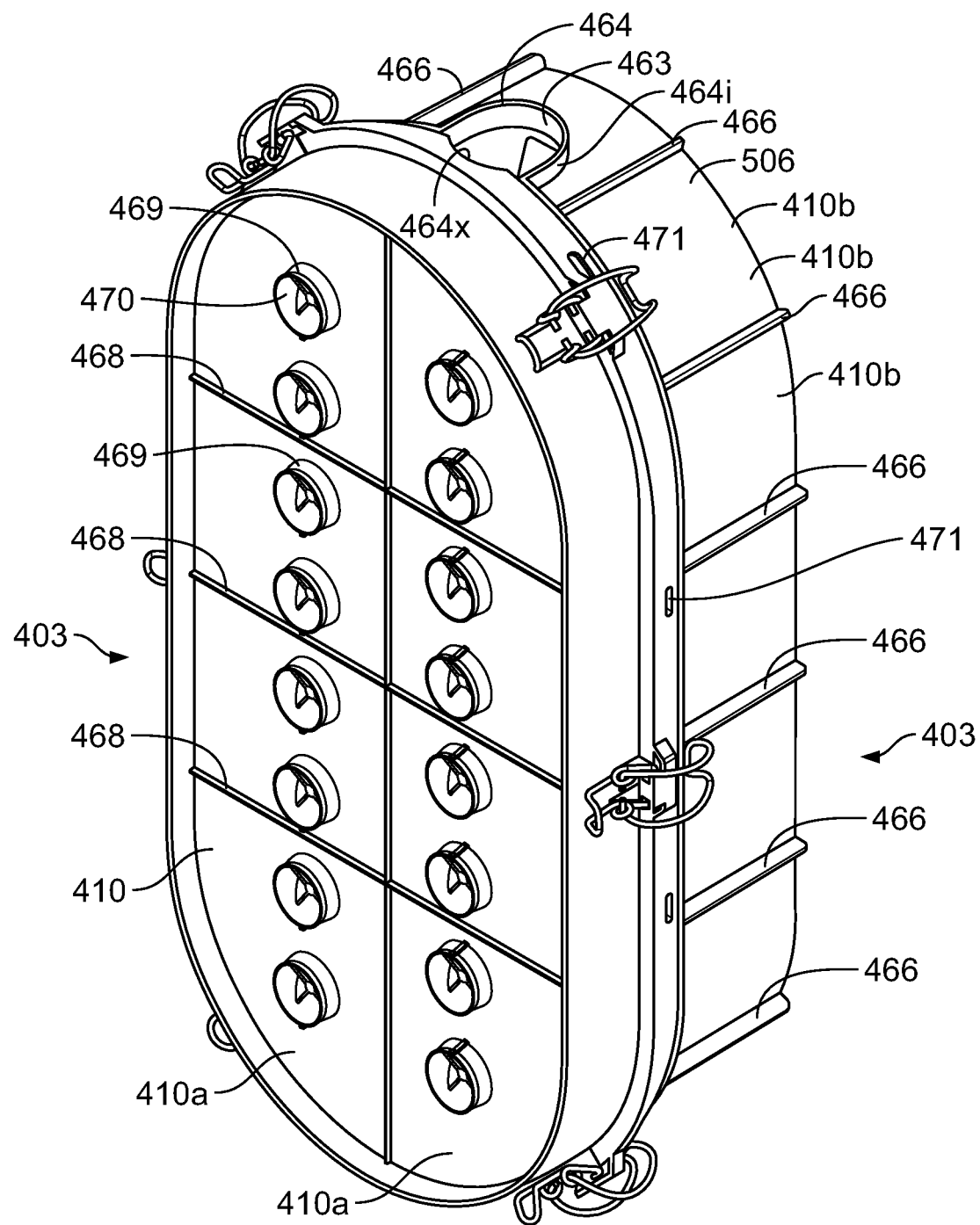
FIG. 27 is a schematic, inlet end, perspective view of a precleaner assembly usable in the air cleaner assembly of FIG. 12; the view of FIG. 27 showing the assembly in an upside-down orientation relative to normal use.

In FIG. 27, the access cover 403 comprising the optional precleaner 410 is depicted in perspective view. Here, the precleaner 410 is depicted upside down, relative to the view of FIG. 19, and its normal orientation in use. A contaminant evacuation aperture or port 463 in the perimeter wall 506 of outlet cover section 410b is viewable. It is noted that surrounding the aperture, and projecting radially outwardly from the wall 506, is provided a projection rim or sealing rib (contaminant containment projection) 464, to facilitate contaminant transport from an interior of the precleaner assembly 410 to the outlet port 426. The rib or rim 464 is positioned to extend generally across the space between the wall 506 and the housing wall section 426i (FIG. 13) in a region surrounding an entrance to the contaminant outlet port 426.

Still referring to FIG. 24, the particular rim or projection 464 depicted includes a portion 464i on the inner cover 410b in a portion 464x on the outer cover 410a.

Also referring to FIG. 27, strengthening and centering projections 466 (comprising axial ribs in the example) are provided in the inner cover 410b, for example as discussed in connection with ribs 616, FIG. 24.

Still referring to FIG. 27, outer cover 410a is depicted having strengthening ribs 468 therein, to facilitate integrity of the cover 410a. It can also be of assistance in molding.

Apertures 469 are positioned for a press fit therein, of outer flow tubes 470. Perimeter aperture 471 is positioned for snap-fit receipt of the projections on inner cover 410b. If it is desired to separate cover 410b from cover 410a, one would press on the various tabs projecting through the apertures 471.

Figure 28:
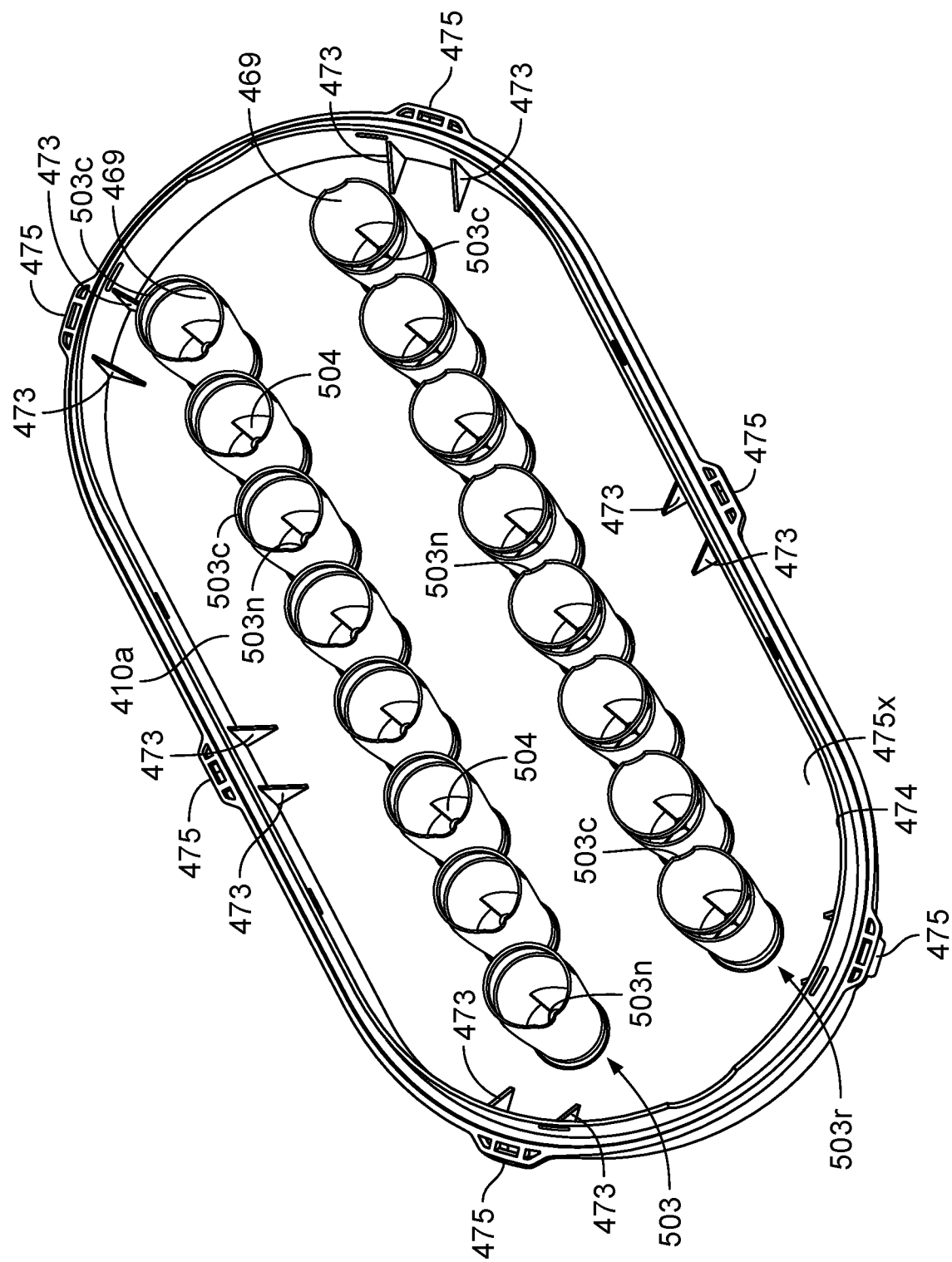
FIG. 28 is a schematic inside perspective view of an inlet component of the precleaner assembly of FIG. 27.

In FIG. 28, a view is provided of an interior view of outer cover 410a. Here, the various inlet tubes 469 (corresponding to tubes 503, FIG. 19) in two rows 503r and 503s are viewable. The interior cover 410a is depicted with strengthening ribs or gussets 473 between perimeter rim 474 and surface 475x.

A different rotational orientation of the tubes 469 in row 503r and row 503s can be used, with respect to the outlet slots 503c. It is noted that a notch 503n in each tube is positioned to engage a mating projection on the tube sheet 410b. In FIG. 28, projections 475 are depicted which comprise mounts for the various latches.

Figure 28A:
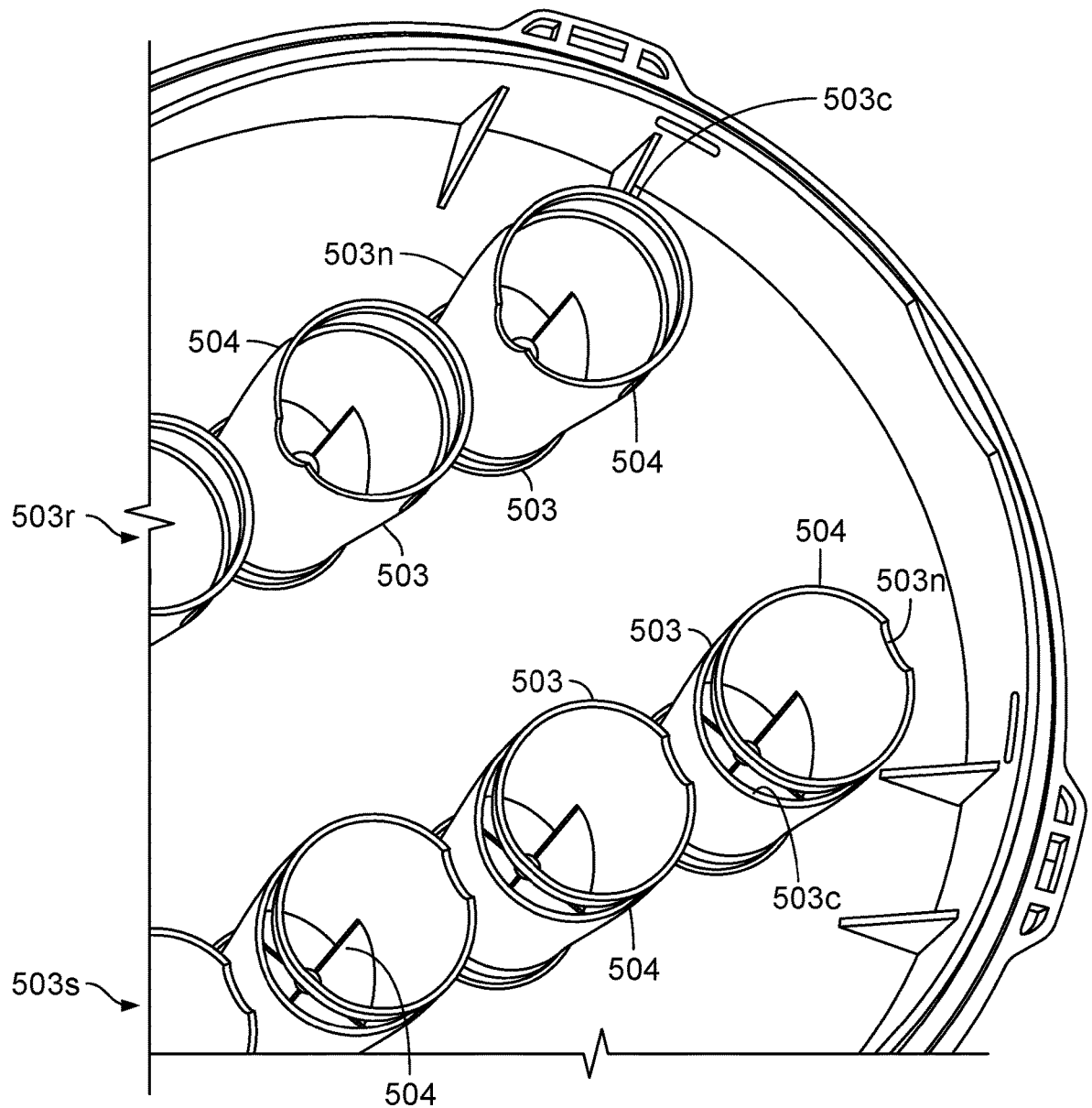
FIG. 28A is a schematic, enlarged, fragmentary view of an identified portion of FIG. 28.

FIG. 28A is an enlarged fragmentary view of a portion of FIG. 28. The individual tubes 503 can be inspected and observed to include the slide ejection slots 503c and the notches 503n. It can be seen that the tubes 503 are in the separate rows 503r, 503s and in the two rows the tubes are rotationally different with respect to slot 503c positioning relative to one another. Internal vanes 504 can also be seen, for imparting cyclonic flow.

Figure 29:
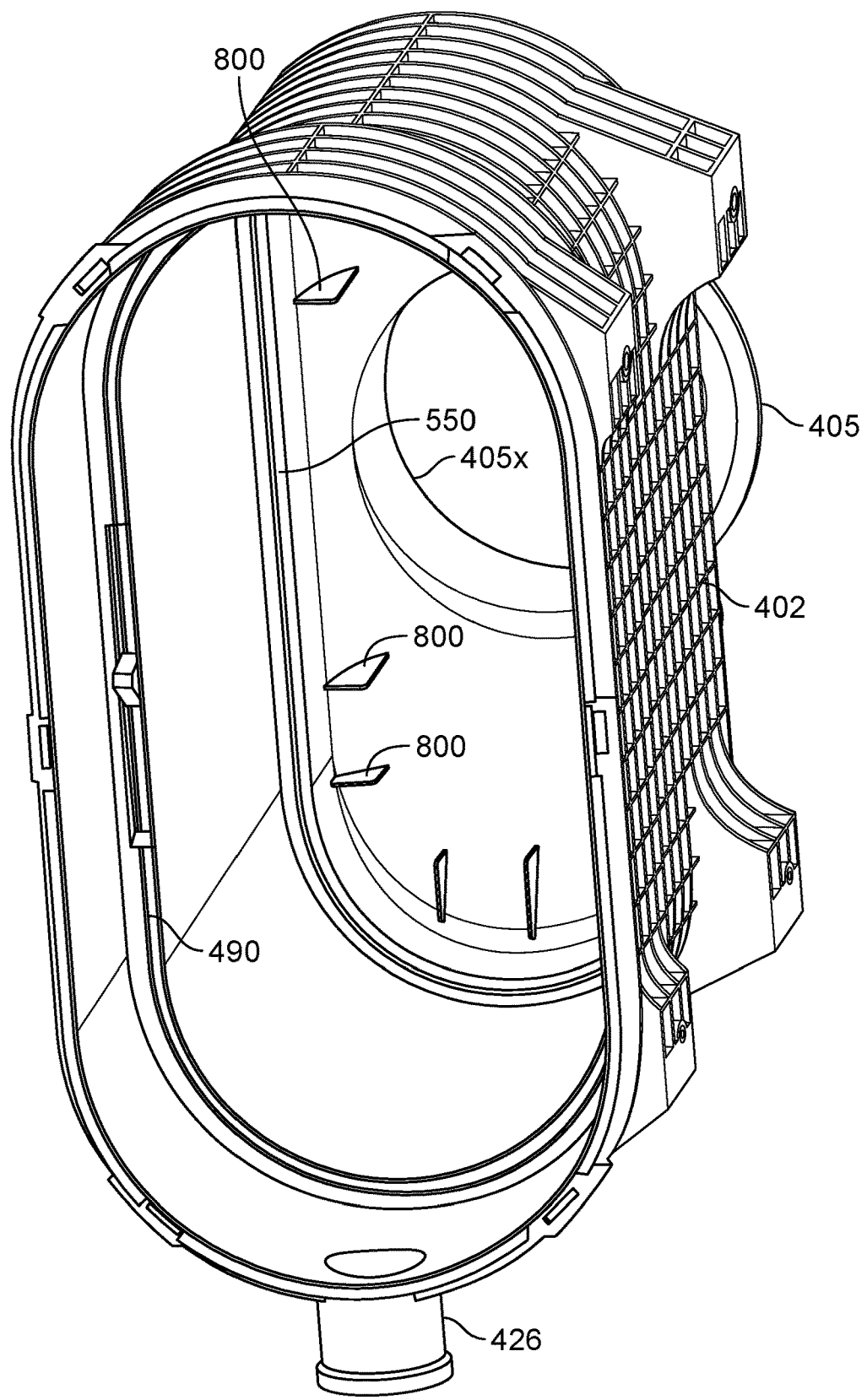
FIG. 29 is a schematic, inlet end, perspective view of a housing body component usable in the assembly of FIG. 12.

In FIG. 29, a perspective view is provided of housing body 402. Here, strengthening ribs or gussets 800, are shown.

In FIG. 29, some selected variations in the seal shelf 490 are shown. These are useable, in connection with engagement with optional variations in housing seal member on a filter cartridge. Also, seal shelf 550, for the optional safety, is viewable.

Figure 30:
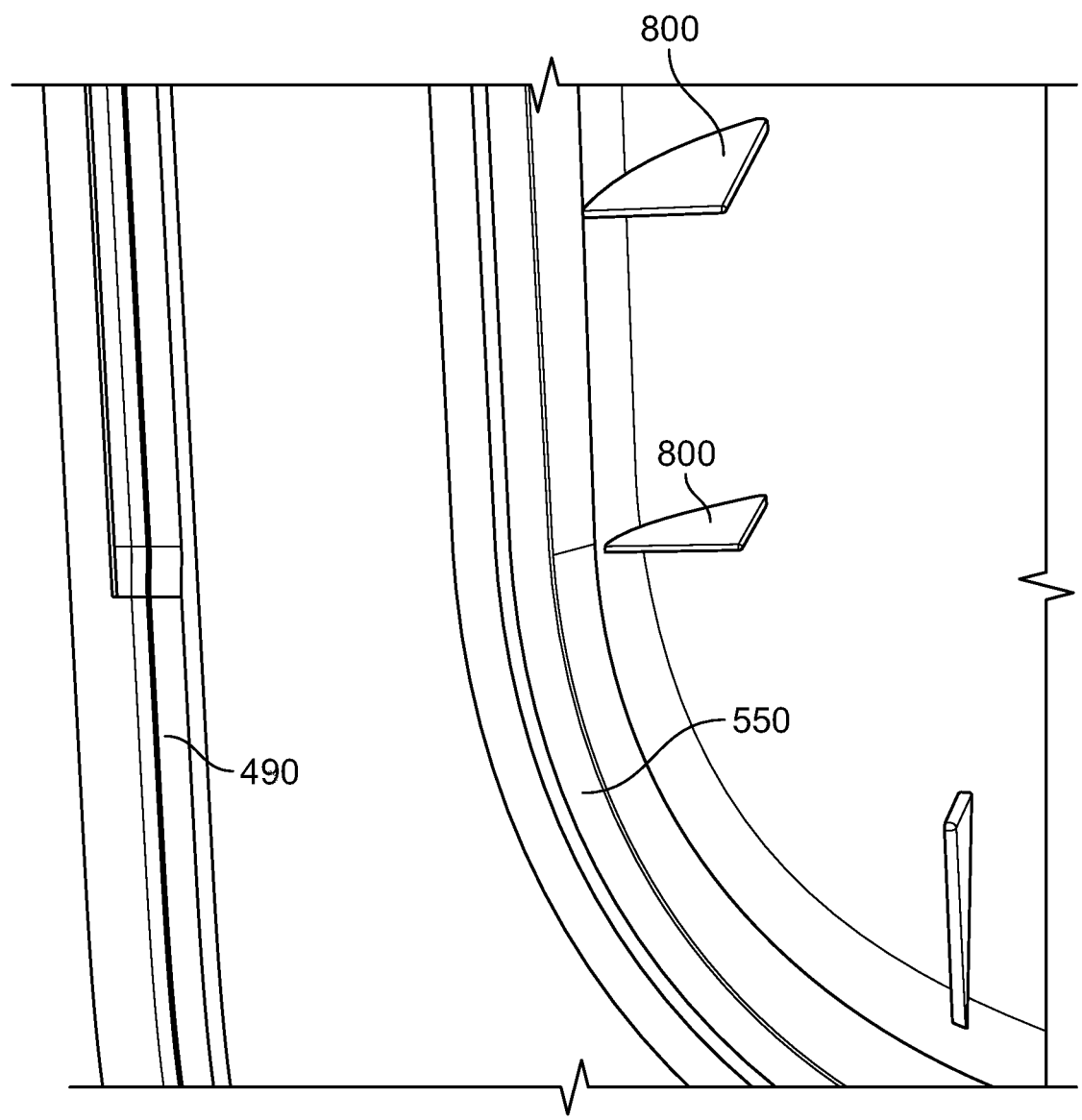
FIG. 30 is a schematic, enlarged, fragmentary perspective view of a portion of the housing body component of FIG. 29.

FIG. 30 is an enlarged fragmentary view of a portion of FIG. 29.

B. An Example Alternate Configuration (FIGS. 31-32A) for Mounting with a Long (Housing) Cross-Dimension Extending Horizontally It is noted that the particular air cleaner assembly 400 depicted in connection with FIGS. 12-12B was specifically configured for a preferred mounting in which the long cross-sectional axis of a cartridge and housing are oriented vertically, and with the dust outlet port 426 directed downwardly. The principles described herein can be applied in which an arrangement in which a cross-sectional axis of the housing and cartridge are oriented for mounting horizontally. An example of this is shown in FIGS. 31-32A.

Figure 31:
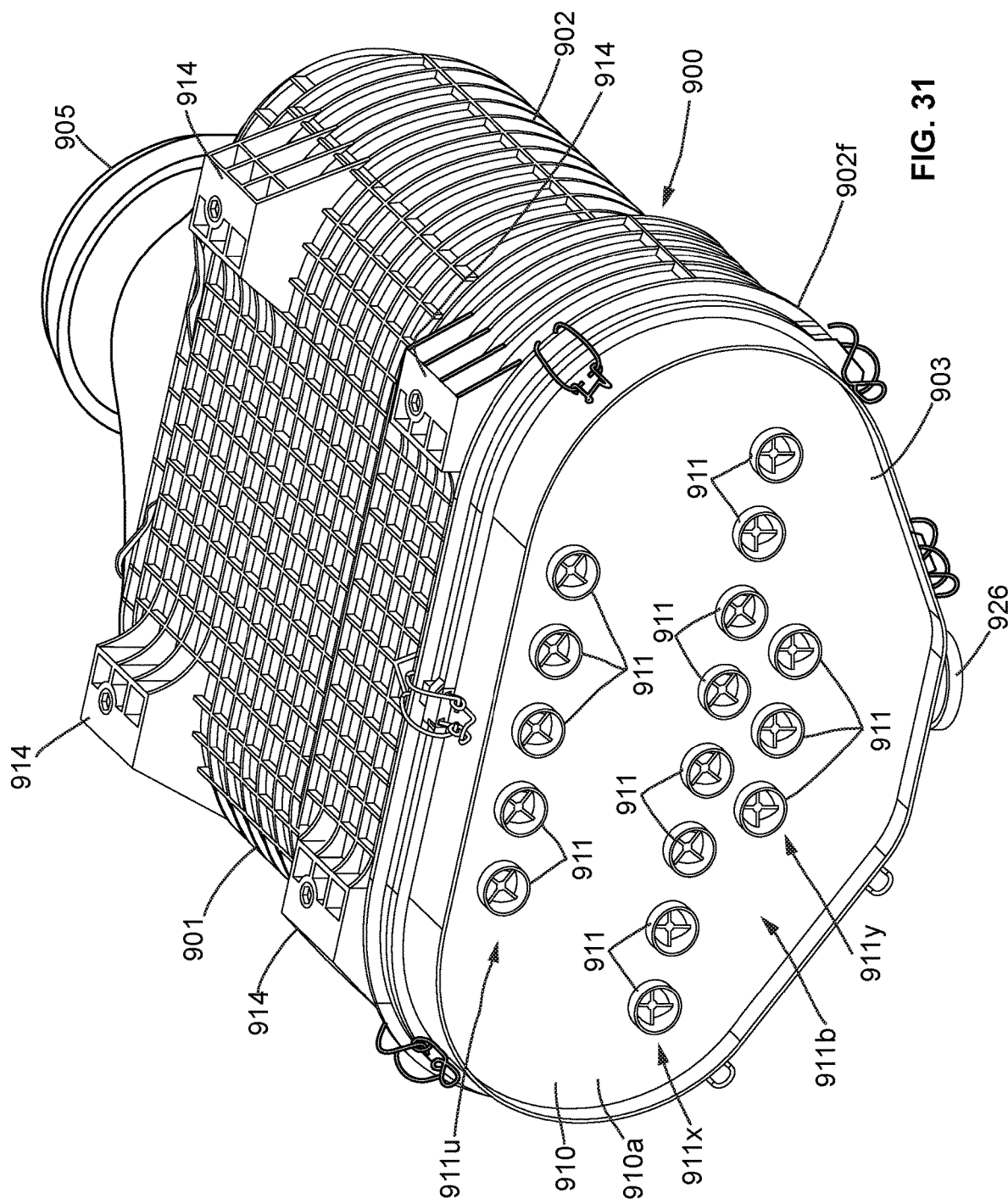
FIG. 31 is a schematic, inlet end, perspective view of an alternate air cleaner including features assembled in accord with selected ones of the general principles of the present disclosure.
Figure 32:
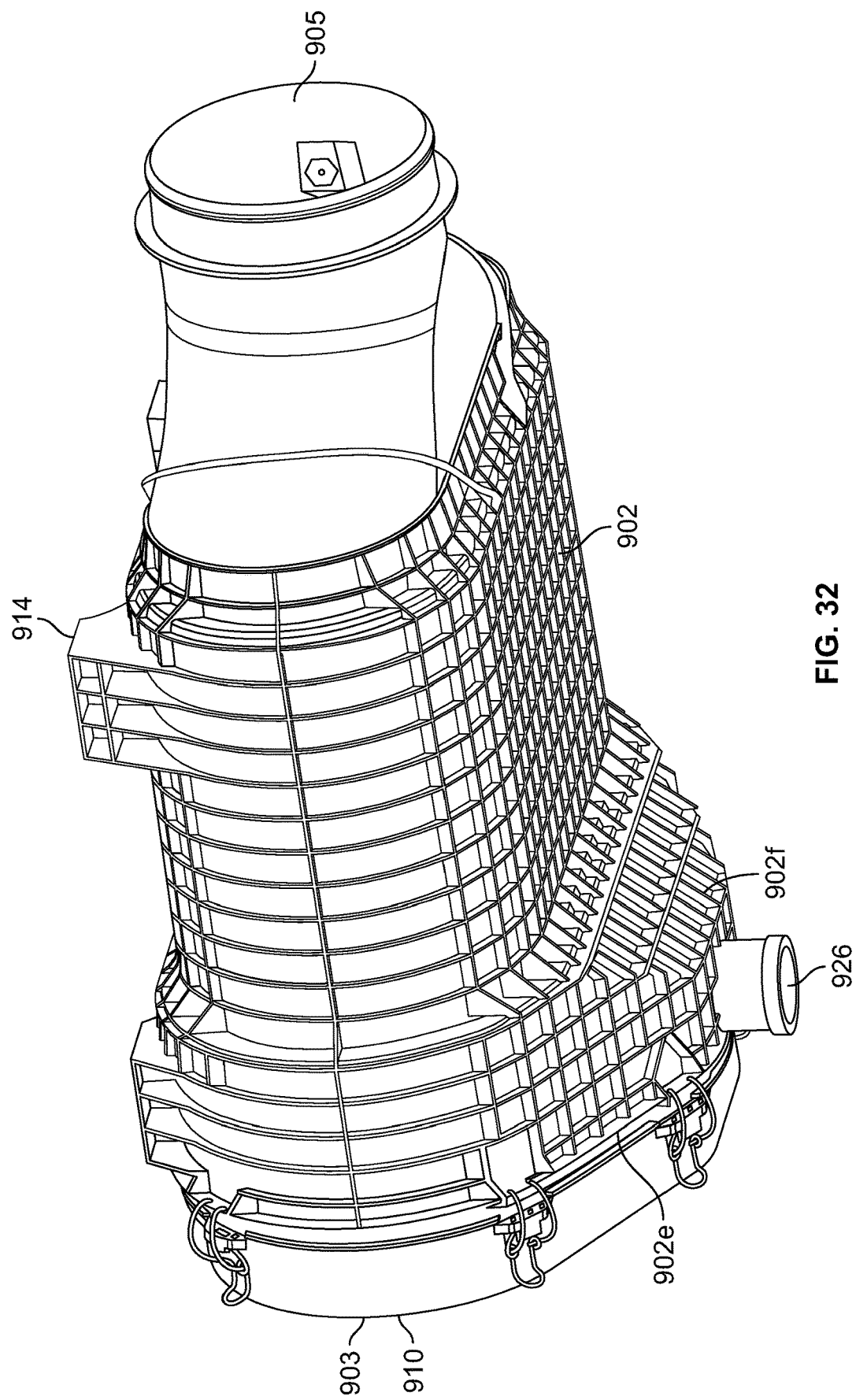
FIG. 32 is a second schematic perspective view of the air cleaner assembly of FIG. 31, the view of FIG. 32 being toward a bottom side, in use.
Figure 32A:
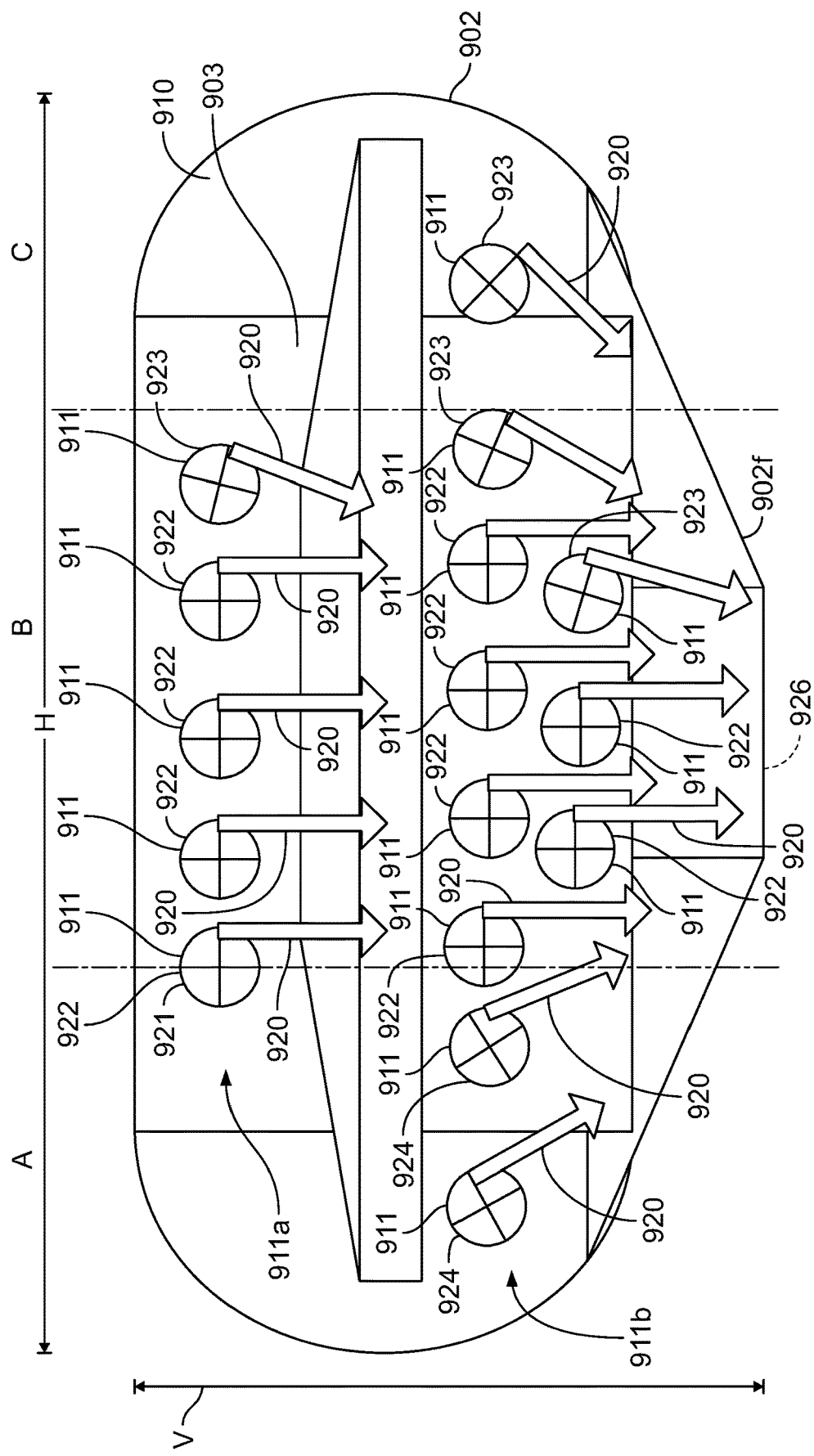
FIG. 32A is a schematic view of precleaner component features of the air cleaner assembly of FIGS. 31 and 32; the view indicating a usable orientation of separator tube features.

Referring first to FIG. 31, an air cleaner assembly 900 is depicted. The air cleaner assembly 900 comprises a housing 901, including a housing body 902 and an access cover 903. The housing 901 generally has a long cross-sectional axis and a short cross-sectional axis, each cross-sectional axis being taken adjacent an opening for the access cover and in a direction perpendicular to a flow direction from the access cover 903 to a housing outlet 905. The housing body 902 is generally configured to be mounted with a long axis generally horizontally. In the example depicted, the housing body 902 is configured to be suspended from the equipment on which it is mounted. Thus, mounting pads 914 are directed upwardly for connection with equipment.

As referenced, an air flow outlet arrangement 905 for the housing 901 is provided, in the example in the housing body 902. Of course, alternate outlet configurations can be provided. Further, the outlet arrangement 905 can be integral with the remainder of the housing body 902 or can be separately made and then attached, as previously discussed for earlier described arrangements.

In the example depicted, the axis cover 903 comprises a precleaner arrangement 910, configured and arranged for: separating selected inlet contaminant material before it reaches an internally received directed cartridge; and, directing that contaminant material to be removed from the housing 901 by ejection through outlet port 926 in housing body 902.

It is noted that a main filter cartridge (not depicted) for use with the embodiment of FIG. 31 may be generally as depicted and configured previously, for FIG. 15.

An issue with respect to the arrangement of 900 of FIG. 31, is managing positioning of separator tubes 911 in the precleaner 910. Features of significance with respect to positioning include the array orientation (rows, etc.); and, the rotational orientation of individual tubes 911, with respect to outside dust outlet apertures therethrough.

In general, with an air cleaner housing 901 (abutment 902) oriented to have a longer cross-sectional dimension positioned horizontally, in use and the contaminant ejection port 926 will be positioned in a lower funnel section 902f of the housing 901 (and body 902) configured to help direct contaminant flow to the port 926. In FIG. 32, a bottom perspective view, this funnel section 902f can be seen adjacent end 902e of the housing body 902; end 902e being opposite the outlet arrangement 905 in general corresponding to an open end on which the access cover 903 (in the example in the form of precleaner 910) is mounted.

In the example, the contaminant ejection port 926 is positioned in approximately the bottom center of funnel region 902f.

Referring to FIG. 32, we can see that the funnel-shaped portion of the housing body 902 adjacent the access cover 903 is a bottom portion that depends downwardly in steps toward the open end 902e (i.e., in an axially direction), and generally slanted downwardly from the size, toward tube arrangement 926. Alternative shapes are possible. However, the particular shape depicted is convenient for helping flow of separated contaminant to the outlet port 926.

Referring again to FIG. 31, in general, the individual tubes 911 are positioned in rows, as will be typically and preferred. The particular precleaner 910 depicted, can have an internal tube sheet with a receiving groove or receiver (not shown) on an interior surface, for receipt projecting therein, of an optional handle on a cartridge, which handle would be extending horizontally. As a result, the tubes 911 can be positioned in two arrays: an upper array 911u and a lower bottom array 911b.

The upper array 911u comprises tubes 911 oriented in a single row. The lower array 911b comprises tubes 911 oriented in more than one row, i.e. rows 911x and 911y, respectively. Of course, the number of tubes 911 and the orientation of rows, is a matter of choice for desired efficient operation, the depiction provided meant to be an example.

In addition, the orientation could be different, for example, if the optional receiving groove for a handle arrangement were not present on an interior of cover 910a.

As indicated above, an issue for consideration is the rotational orientation of the various tubes 503, with respect to the side dust outlet of each, which would generally correspond to outlets 503c, in analogous tubes 503, FIGS. 28 and 29. Principles that can be applied in connection with this, will be understood from reference to FIG. 32A.

Referring to FIG. 32A, the housing body 902 is indicated schematically. As indicated previously, it is a housing body that has a longer, horizontal, cross-dimension (to a direction of air flow) H and a short vertical cross-dimension (V) at right angles thereto. It is anticipated that typically the ratio of the horizontal (longer) cross-dimension H to the vertical (shorter) cross-dimension V will be within at least 1.4, typically at least 1.7, and often within the range of 1.8-3.5, inclusive. (In the example indicated, the vertical cross-dimension V referenced does not include the outlet port 926, but does include the funnel portion 902f of the housing 901.

The cartridge that would be used with such a housing would typically have a longer horizontal dimension to a shorter vertical dimension cross-section, for example of the type previously described for cartridge 430.

In FIG. 32A, the schematic depiction is meant to toward an exterior of the cover 903, as a schematic cross-sectional. The individual tubes 911 can be seen as oriented in upper array 911u, and bottom array 911b.

The various arrows 920 are meant to indicate the preferred general dust exit direction for each associated tube 911.

Referring to tube 921, for example, the outlet tube would be oriented with the side contaminant evacuation slot directed to the right with cyclonic flow from the vane arrangement being clockwise in the viewpoint oriented. This would tend to lead to the ejected contaminant flow in the direction of arrow 920, for the particular tube 921; i.e., directing downwardly and toward a center of the housing bottom.

In general, from the schematic depiction of FIG. 32A, principles with respect to the orientation of the various tube 911, for contaminant exit orientation can be understood. In general terms, the arrangement can be viewed as having at least one linear row of tubes 921. That row can be characterized as having: at least one left end tube, 924; at least one right end tube 923; and, at least one central tube 922.

Each central tube 922 is oriented with the ejector slot (corresponding to slot 503c previously described) oriented or directed (centered in a direction) to the right, and such that contaminated ejection from the tube 922 will be directed downwardly. On the other hand, the left end tube 924 is generally oriented with the ejection slot 503a rotated clockwise at least 5°, typically an amount within the range of 5-40°, relative to the slot of tube 922. This will tend to cause the ejection to be both downward and toward the right as shown by an arrow. The right end tube 923 is shown with the ejection slot rotated clockwise, in an amount of at least 5°, typically within the range of 5-40° inclusive, from the slot of the center tube, so that ejection of dust from the right tube 923 is generally downwardly and toward the left, as shown by the ejection arrow.

Of course, the rotation is described are when the cyclonic flow when viewed from the access cover inwardly, is generally clockwise. Alternatives would be possible with alternate locations of the slots, if the vane arrangements were configured for counter-clockwise rotation.

Still referring to FIG. 32A, it is noted that left end tube 924 is in a left ⅓, A, of a cross-dimension when viewed from the access cover inwardly; at least one central tube 922 is in a central ⅓, B, of a housing cross-section when taken along the horizontal access when viewed toward the access cover; and, far right to 923 is in a right ⅓, C, of the housing taken along a horizontal cross-dimension. This will be typical. By this, however, it is not meant that no tube within the center could be angled rather than directed directly downwardly. Indeed, variations may be possible, but the particular depiction provided is a useful example.

Other features of the assembly 900 may be generally in accord with descriptions and features previously provided herein, adapted for the shape depicted.

C. Indexing of the Filter Cartridge to the Housing Body

The filter cartridge can be configured to be positionable within the housing body in one or more rotational orientations, relative to the housing body. With a cartridge of the type depicted, see for example FIG. 15, in which the cartridge has a long cross-sectional access and a short cross-sectional access, the cartridge can be configured to be positioned in only one appropriate rotational orientation, or can be configured to be properly positionable in two rotational orientations. An indexing arrangement can be used between the cartridge and the housing, to accommodate either one rotational orientation or two as may be desired. An example such indexing arrangement can be by positioning and shaping a receiving groove in the inner tube sheet of the precleaner, to only receive the handle arrangement on the cartridge, if the cartridge is in the single, selected rotational orientation. This can be done by location or by shape (or both) of the interacting members.

D. An Example (Optional) Configuration in Which the Access Cover Does Not Include a Precleaner, FIGS. 33-33A As previously indicated, the use of a precleaner 410 as part of the air cleaner assembly 400 is optional. In some systems, it may be desirable to use selective features described herein, in an air cleaner that does not include a precleaner as part of an access cover. When this is the case, the precleaner may be part of a separate equipment from the air cleaner assembly 400, or it may be used in a system that does not have a precleaner.

Such principles can be applied with a variety of shapes of housing, including ones having a longer or axis oriented vertically when positioned for use, and one oriented with a longer axis or oriented horizontally, when positioned for use. Herein, in FIGS. 33-33A, example principles are shown for a housing which does have one long cross-sectional axis and one short cross-sectional axis, with the longer one oriented vertically in use. Of course, similar principles can be applied with the longer axis oriented horizontally in use.

Figure 33:
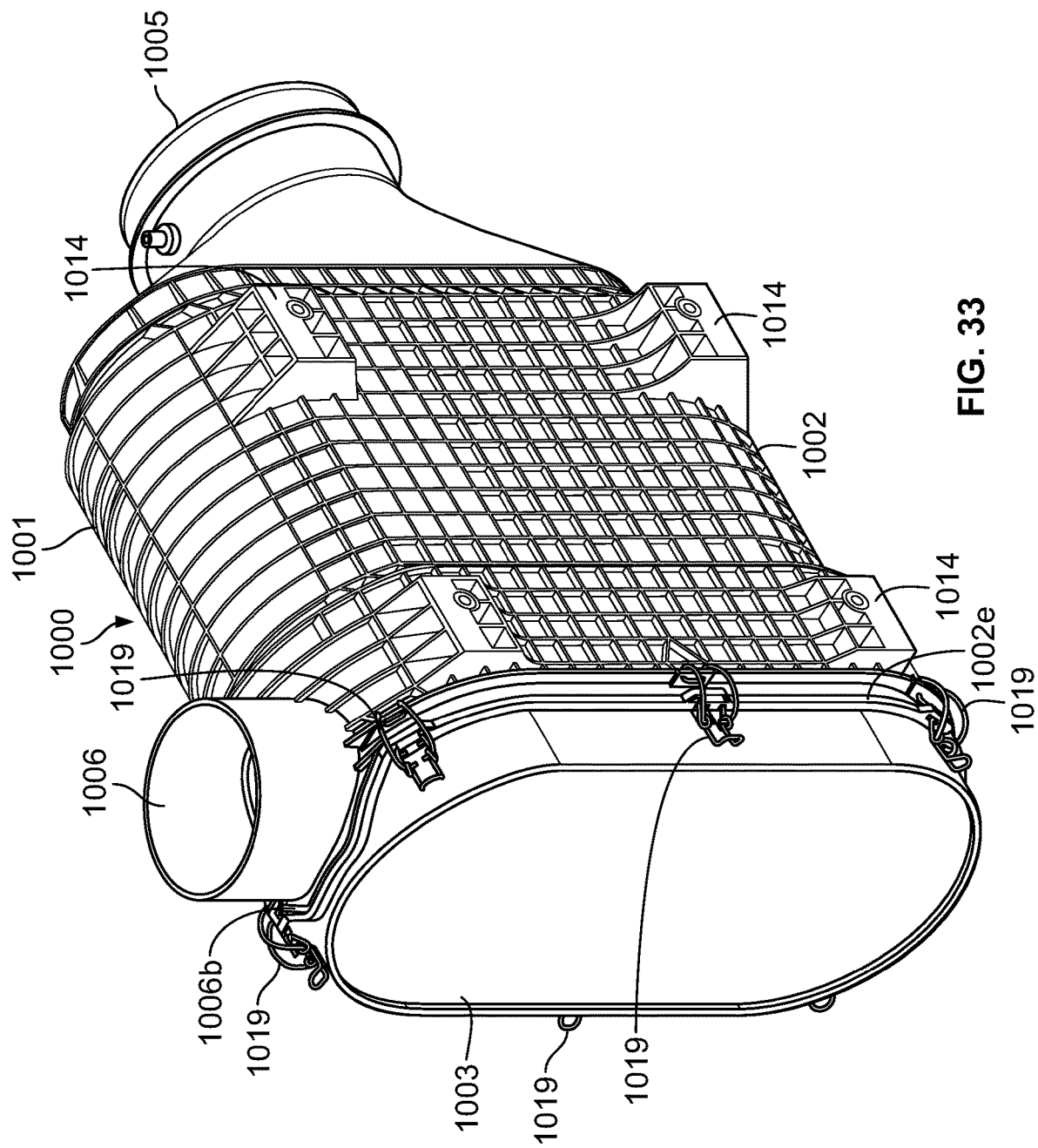
FIG. 33 is a schematic access cover end, perspective view of a further alternate air cleaner assembly using selected features of the present disclosure.
Figure 33A:
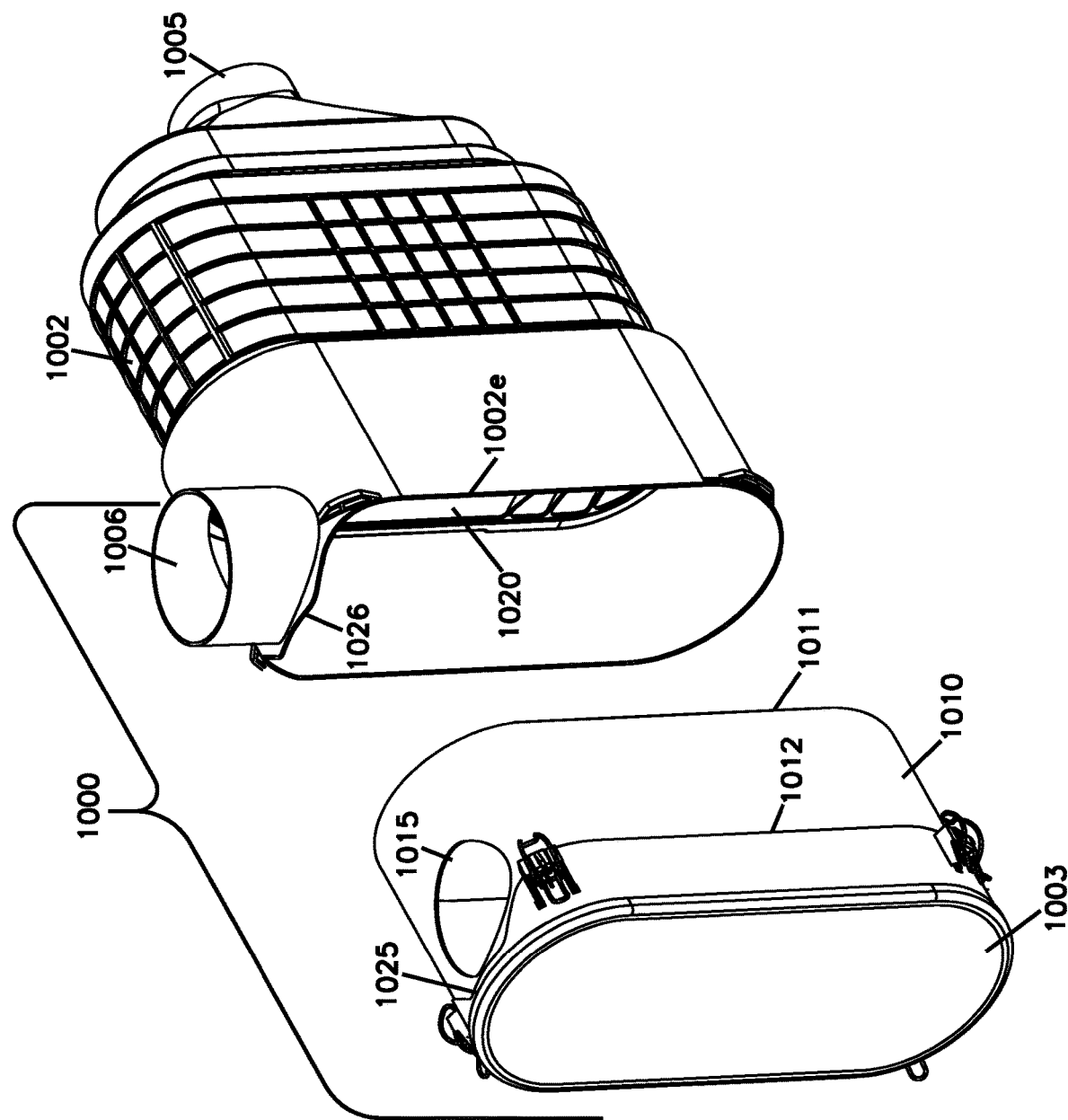
FIG. 33A is a schematic exploded perspective view of selected housing features of the air cleaner assembly of FIG. 33.

In FIGS. 33-33A, an air cleaner assembly 1000 is depicted, which does not have a precleaner as part of the access cover. In FIG. 33, air cleaner assembly 1000 is shown comprising a housing 1001 including a housing body 1002 and access cover 1003. The housing body 1002 may have features generally as previously discussed, except it does not include a contaminant evacuator port therein. Thus, the housing body includes access cover end 1002e and opposite (in air flow direction) outlet arrangement 1003. It is noted that while inlet flow can be through the access cover 1003, in the example depicted, an air flow inlet 1006 is shown in housing body 1006, at 1006a in section 1006b. It is particularly (optionally) shown to be directed upwardly, and extends through the side 1002a of the housing body 1002, which would be directed upwardly in use; mounting, being by mounting pads 1014.

The access cover 1003 is shown secured in place by latches 1019.

In FIG. 33A, an exploded, schematic view of selected features of the assembly 1000, FIG. 33 are shown. Here, the housing body 1002 can be seen as having an open end 1002e over which the access cover 1003 is removeably mounted, during use. Adjacent access cover end 1002e is provided side inlet 1006.

Referring to the access cover 1003, it is seen as having an inner perimeter wall 1010 extending axially, inwardly, to terminate of a pressure flange 1011 inner wall 1010 may, optionally, be provided with ribs analogous to ribs 466, FIG. 27.

The access cover also includes an exterior flange 1012, which engages the end 1002e of the body 1002 during use.

In FIG. 33A, it can be seen that the inner wall 1010 includes air flow aperture 1015 therethrough, to allow flow of air of inlet 1006 to enter the housing, and engage the cartridge 1020. The cartridge 1020 may be as generally described herein for main filter cartridges. A safety may be used, if desired, positioned further within the assembly.

It is desired, generally, to index the access cover 1003 so that it can be only mounted on the housing body with the aperture 1015 directed appropriately. To accomplish this, rim 1012 has a recess therein indicated at 1025, indexed to engage projection 1026 on housing body 1002.

In more general terms, an access covered housing body projection/receiver rotation arrangement can be used, to provide for selected rotational indexing between the access cover and the body. The projection/receiver arrangement may comprise a projection on one and a receiver on the other. In the example depicted, the projection is on the housing body, and the receiver is on the access cover. Alternatives are possible.

A variety of features can be provided in the access cover 1003, including a ramp arrangement to help turn air flow toward the cartridge 1020. Features in the housing, the cartridge in any optional safety may be in general accord with those described herein above for other embodiments, if desired.

V. Some Selected, Optional, Filter Cartridge Features; Methods of Assembly, FIGS. 34-36

In general terms, the main filter cartridge may be configured in accord with principles described in U.S. Ser. No. 61/841,005, filed Jun. 28, 2013; and, PCT/US2014/044712, filed Jun. 27, 2014, each of which is incorporated herein by reference. An example filter cartridge and features thereof is depicted in FIGS. 34-36A.

Referring first to FIG. 34, such a cartridge 430 is depicted, see also FIG. 15. It may be used in any of the air cleaner assemblies characterized herein. In general, cartridge 430 includes optional (preferred) outer shell 480: optional handle arrangement 475h with central bridge 476; and, perimeter housing seal arrangement 465.

The particular cartridge 430 depicted is configured for airflow into inlet end 431, with straight-through flow exiting outlet end 432. Internally received media, not shown, can be generally in accord with the media characterization described herein.

Still referring to FIG. 34, it is noted that the seal arrangement includes a contoured axial seal surface 470, depicted as having at least one projection member 470x thereon, directed away from an adjacent portion of the steel surface 470 toward outlet end 462. In the example depicted, viewed toward a side of the cartridge, two spaced projection sections 470x, 470y are shown separated by a recess 470z therebetween. Each projection section 470x, 470y typically projects at least 1 mm, usually at least 2 mm (maximally).

In general terms, when the cartridge has an oval-shape of the type characterized, with two opposite sides and two curved ends, at least one projection member 470x, 470y is aligned with (i.e., overlaps) one of the straight sides. Typically, there is a projection arrangement overlapping each of the two opposite straight sides.

The housing seal arrangement 465 includes an outer perimeter surface 468, which comprises a peripheral surface extending around the media pack and cartridge. This peripheral surface 468 may be contoured. In the example depicted, it includes a recess arrangement 468r therein, which comprises a portion of the surface 468 recessed radially inwardly from adjacent portion of the surface 468. In the example depicted, the recess portion 468r is recessed (maximally) inwardly at least 0.5 mm In the example depicted, the recessed portion itself 468r may be further contoured, with contouring indicated at line 468x, to result in a most recessed portion 468y and a less recessed portion 468z. Alternatives are possible. The example line 468x comprises two curved sections, one extending across an alignment with each projection 470x, 470y.

In general terms, typically each projection 470x, 470y, in the seal surface 470 is positioned in alignment with, (i.e., in a same location as) a recess 468r.

Figure 35:
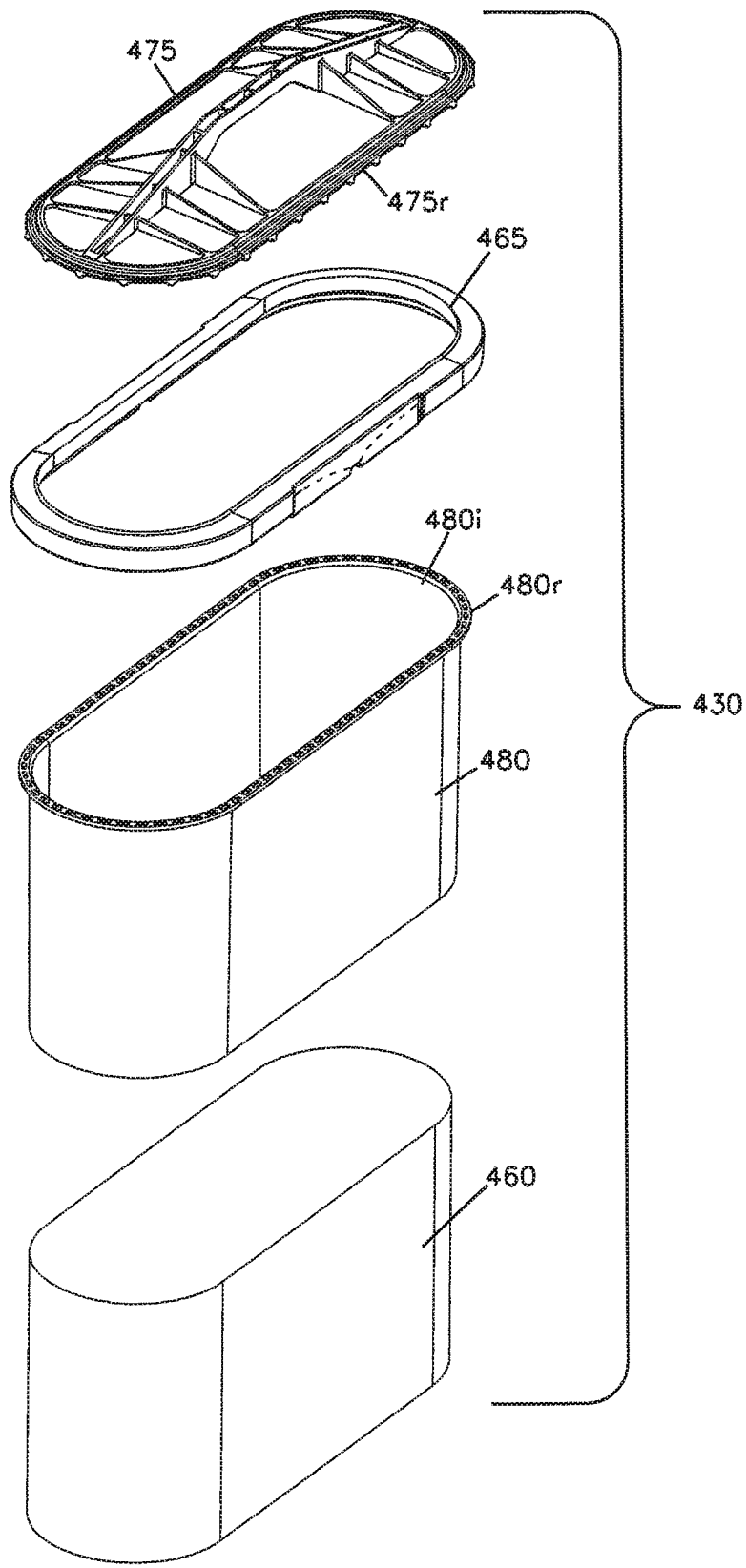
FIG. 35 is an exploded perspective view of the filter cartridge component of FIG. 34.

Attention is now directed to FIG. 35. Here, an exploded view of the cartridge 430 is shown. The media pack 460 is shown below shell 480. However, in typical assembly, the media pack 460 would be inserted into shell end 480i for reasons that will be apparent from the below description. The shell 480 can be seen as having an end rim or flange 480x thereon. The particular flange 480x depicted is a plurality of resin flow apertures therethrough, although alternatives are possible. The flange 480x depicted is continuous, but it could comprise the plurality of space projections if desired.

The seal arrangement 465 is shown as a molding. Typically, it would be molded-in-place with the media pack 460 positioned inside of the shell 480 and the handle arrangement 475h positioned in place. As a result, the seal arrangement 465 would have embedded therein the flange 480x, and also an outer perimeter rim 475r of the handle arrangement. Further, the molding 465 would generally be made to directly engage or contact media of the media pack 460.

Figure 36:
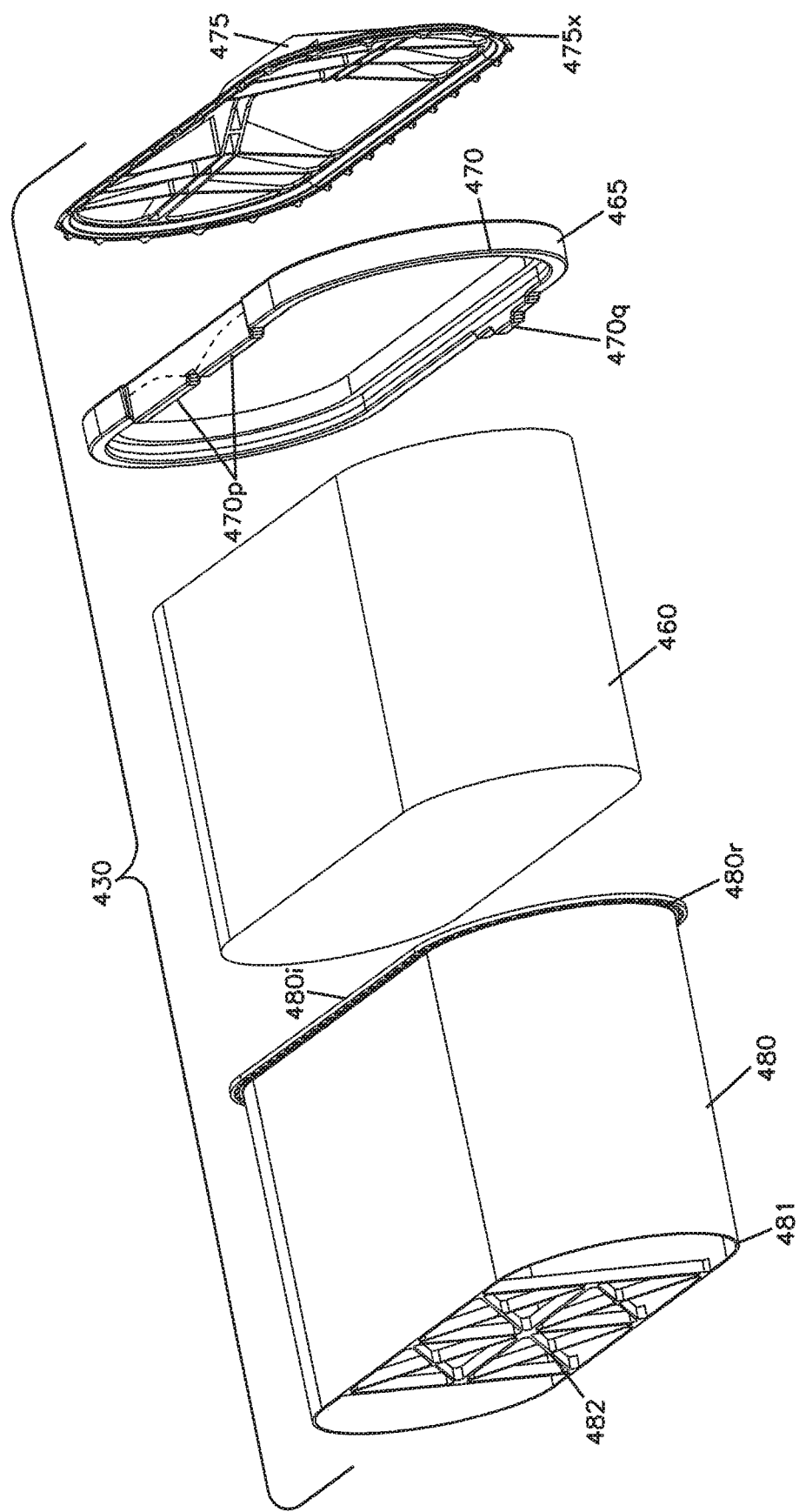
FIG. 36 is a second exploded perspective view of the filter cartridge of FIG. 34.

In FIG. 36, a second exploded view is provided. Here, an outlet end 481 from the shell 480 is shown with grid work 482 extending thereacross. This will help position the media pack 460 during assembly.

Still referring to FIG. 36, it is noted that the axial seal surface 470 is shown with a projection thereon, possessing a symmetry with respect to rotation around a central axis. One of these projections is projection arrangement 470p, generally analogous to the projection arrangement previously discussed. The second projection is projection arrangement 470q, which is shaped differently. With the sealing shelf 490 in the body configured to engage each of the projections 470p, 470q, it would be apparent that the cartridge 430 could only be installed in one rotational orientation.

As indicated in connection with FIG. 23, above, in some instances, it is desirable for the filter cartridge to include a safety cartridge pressure flange thereon. An example of this was discussed above in connection with FIG. 23, and a specific example is depicted in connection with FIG. 36A.

Figure 36A:
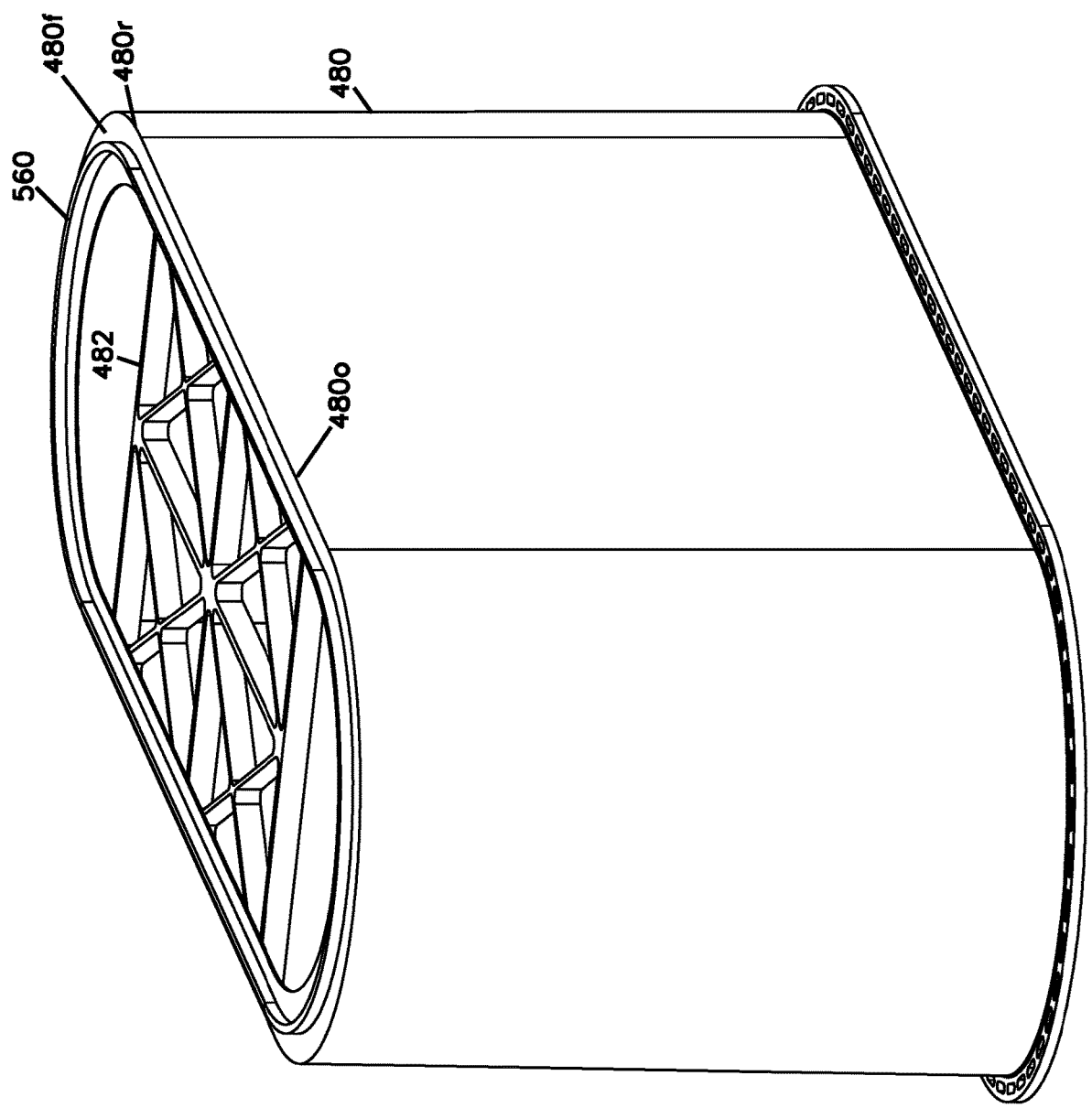
FIG. 36A is an outlet end perspective view of an alternate shell member usable in an assembly in general accord with FIG. 36, and having an optional safety filter pressure flange arrangement thereon.

Referring to FIG. 36A, a shell 480 is shown having a safety element pressure flange 560, thereon. The safety element pressure flange 560 is positioned radially inwardly from an outer rim or end 480r of the shell 480 at outlet end 480o. For mounting, the pressure flange 560 depicted, is positioned on flange or shelf 480f. Alternatives are possible. The particular flange 480f will be spaced from an end of the media pack 460, by grid work 482. This spacing prevents blinding off of the media pack adjacent to the flange 480f, alternatives are possible. The flange 480f could be configured as a grid work, with flow spaces therethrough. However, in general regions radially outside of projection 560, would not be operating for flow.

VI. Other Features and Observations

Herein, general features useable in air cleaner assemblies and components are described. They may be used independently of other features, or together with other features as deemed desirable for given application. In general accord with the present disclosure:

1. An air cleaner assembly comprising: a housing including: a housing body; and, an access cover; the housing body having: an open service access end; and, a main filter cartridge sealing shelf recessed from the open service access end; the access cover comprising a precleaner assembly including a flow separator tube arrangement comprising a plurality of flow separator tubes; the access cover being removably mounted on the housing body over the service access end and with the flow separator tube arrangement projecting into the housing body to a location surrounded by the housing body; and, the housing including: an air flow inlet arrangement; an air flow outlet arrangement; and, a contaminant evacuation port arrangement; and, a main filter cartridge removably positioned within the housing body; the main filter cartridge comprising; a media pack having an inlet end and an opposite outlet end; and, a housing seal arrangement comprising a perimeter pinch seal removably positioned sealingly biased against the main cartridge sealing shelf 2. An air cleaner assembly according to characterization 1 wherein: the access cover includes an inner perimeter inner wall thereon surrounding, and spaced from, the plurality of flow separator tubes and projecting into the housing body; the inner perimeter inner wall on the access cover having a precleaner evacuation aperture arrangement therethrough.

3. An air cleaner assembly according to any one of characterizations 1 and 2 wherein: the housing body has an interior with, at a location adjacent the open service access end: a first, longer, cross-sectional dimension; and, a second, shorter, cross-sectional dimension; the second, shorter cross-sectional dimension being a dimensional taken perpendicular to the first, longer, cross-sectional dimension, at a location half way across the first, longer, cross-sectional dimension and perpendicular thereto.

4. An air cleaner assembly according to characterization 3 wherein: a ratio of the first, longer, cross-sectional dimension to the second, shorter, cross-sectional dimension is at least 1.4.

5. An air cleaner assembly according to any one of characterizations 3 and 4 wherein: a ratio of the first, longer, cross-sectional dimension to the second, shorter, cross-sectional dimension is at least 1.7.

6. An air cleaner assembly according to any one of characterizations 3-5 wherein: a ratio of the first, longer, cross-sectional dimension to the second, shorter, cross-sectional dimension is within the range of 1.8-3.5, inclusive.

7. An air cleaner assembly according to any one of characterizations 3-6 wherein: the contaminant evacuation port arrangement, in the housing, comprises a tube directed away from a remainder of the housing in a direction generally corresponding to a direction of extension of the first, longer, cross-sectional dimension.

8. An air cleaner assembly according to characterization 7 wherein: the flow separator tube arrangement comprises at least first and second, spaced, linear rows of flow separator tubes; the first and second, spaced, linear rows each extending in a direction corresponding to a direction of extension of the first, longer, cross-sectional dimension of the housing body interior; the first, linear, row of flow separator tubes being a left, vertical, row in use when facing an outside of the access cover, and having the individual flow separator tubes therein each constructed and oriented to direct contaminant ejection therefrom to the left, in use; and, the second, linear, row of flow separator tubes being a right, vertical, row in use when facing an outside of the access cover, and having the individual flow separator tubes therein each constructed and oriented to direct contaminant ejection therefrom to the right, in use.

9. An air cleaner assembly to characterization 8 wherein: each flow separator tube includes an outer, inlet, tube having a side contaminant ejection slot therein; each outer, inlet, tube of each flow separator tube in the first linear row of flow separator tubes being rotationally oriented with the side contaminant ejection slot facing in a first direction; and, each outer, inlet, tube of each flow separator tube in the second linear row of flow separator tubes being rotationally oriented with the side contaminant ejection slot facing in a second direction; the second direction being opposite the first direction.

10. An air cleaner assembly according to characterization 9 wherein: each outer, inlet, tube in each flow separator tube in the first linear row of flow separator tubes has an inlet vane arrangement therein configured to direct flow passing through the tube in a first cyclonic direction, when viewed toward an outside of the access cover; and, each outer, inlet, tube in each flow separator tube in the second linear row of flow separator tubes has an inlet vane arrangement therein configured to direct flow passing through the tube in the first cyclonic direction, when viewed toward an outside of the access cover.

11. An air cleaner assembly to any one of characterizations 9 and 10 wherein: each side dust ejector slot in the first linear row of flow separator tubes faces downwardly, toward a bottom of the housing body having the contaminant evacuation port arrangement thereon; and, each side dust ejector slot, in the second linear row of flow separator tubes, is directed upwardly toward a top end of the housing body and opposite the bottom having the contaminant evacuation port arrangement thereon.

12. An air cleaner assembly according to any one of characterizations 9-11 wherein: each side contaminant evacuation slot in each flow separator tube extends through a sidewall portion of an associated inlet tube over an angle of arcuate extension within the range of 170°-190°, inclusive.

13. An air cleaner assembly according to any one of characterizations 3-6 wherein: the contaminant evacuation port arrangement, in the housing, comprises a tube oriented directed in a general direction of extension of the second, shorter, cross-sectional dimension.

14. An air cleaner assembly according to characterization 13 wherein: the flow separator tube arrangement comprises at least a first, linear, row of flow separator tubes; the first linear row being oriented along a direction of extension of the first, longer, cross-sectional dimension; the first row of flow separator tubes including at least: a first, left end, flow separator tube; a first, right end, flow separator tube; and, a first, central, separator tube positioned in the first, linear, row of flow separator tubes at a location between the first, left end, flow separator tube and the first, right end, flow separator tube; the first, central, flow separator tube being constructed and oriented to eject contaminant therefrom in a direction generally downwardly, in use; the first, left end, flow separator tube being constructed and oriented to eject contaminant therefrom in a direction partially downwardly and partially toward the right, in use when viewed toward an outside of the access cover; and, the first, right end, flow separator tube being constructed and oriented to eject contaminant therefrom in a direction partially downwardly and partially toward the left, in use, when viewed toward an outside of the access cover.

15. An air cleaner assembly according to characterization 14 wherein: the first, left end, flow separator tube is positioned aligned in a left one-third a horizontal extension of the inlet end of the housing body, when viewed toward an outside of the access cover; the first, right end, flow separator tube is positioned aligned in a right one-third of a horizontal extension of the inlet end of the housing body, when viewed toward an outside of the access cover; and, the first, central, flow separator tube is positioned in a central one-third of a horizontal extension of the inlet end of the housing body, when viewed toward an outside of the access cover.

16. An air cleaner assembly according to any of one characterizations 14-15 wherein: each flow separator tube, in the first, linear, row of flow separator tubes has an inlet tube with a side contaminant ejection slot; the side contaminant ejection slot of the inlet tube of the first, central, flow separator tube facing in a first direction corresponding to the direction of extension of the first, linear, row of flow separator tubes; the side contaminant ejection slot of the inlet tube of the first, left end, flow separator tube facing a direction rotated counter-clockwise an amount within the range of 5°-40°, when viewed toward an outside of the access cover, from the first direction faced by the side contaminant ejection slot of the inlet tube of the first, central, separator tube; and, the contaminant ejection slot of the inlet tube of the first right end, flow separator tube being directed in a direction rotated clockwise an amount within the range of 5°-40°, when viewed toward an outside of the access cover, from the first direction faced by the side dust ejection slot of the inlet tube of the first, central, separator tube.

17. An air cleaner assembly according to characterization 16 wherein: each side contaminant ejection slot extends along a sidewall portion of an associated inlet tube over an arcuate angle within the range of 170°-190°, inclusive.

18. An air cleaner assembly according to any one of characterizations 13-17 wherein: the housing body includes a funnel bottom section adjacent the service access end; the evacuator tube being oriented in a lower most portion of the funnel bottom section.

19. An air cleaner assembly according to characterization 18 wherein: the funnel bottom section steps downwardly in an axial direction of extension toward the service access end.

20. An air cleaner assembly according to any one of cl characterizations aims 1-19 wherein: the precleaner assembly includes an inner cover comprising an air flow outlet tube sheet extending across an air flow direction through the precleaner assembly; the air flow outlet tube sheet including a first member of an access cover-to-main filter cartridge projection/receiver arrangement thereon; and; the main filter cartridge including a second member of an access cover-to-main filter cartridge projection/receiver arrangement thereon; the first and second members of the access cover-to-main filter cartridge projection/receiver arrangement being configured to engage at a location in axial overlap with the inlet end of the media pack of the main filter cartridge.

21. An air cleaner assembly according to characterization 20 wherein: the second member of the access cover-to-main filter cartridge projection/receiver arrangement comprises a handle member on the main filter cartridge.

22. An air cleaner assembly according to characterization 21 wherein: the first member of the access cover-to-main filter cartridge projection/receiver arrangement comprises a main cartridge handle receiving recess in the air flow outlet tube sheet.

23. An air cleaner assembly according to any one of characterizations 20-21 wherein: the main cartridge handle receiving recess is a groove having a narrow width relative to its length.

24. An air cleaner assembly according to any one of characterizations 22 and 23 wherein: the main cartridge handle receiving recess has a maximum depth to maximum narrow width ratio, at a deepest location, within the range of 0.5-1.5, inclusive.

25. An air cleaner assembly according to any one of characterizations 22-24 wherein: the main cartridge handle receiving recess has a maximum depth to narrow width ratio, at a deepest location, within the range of 0.75-1.25, inclusive.

26. An air cleaner assembly according to any one of characterizations 20-23 wherein: the housing body has an interior with, at a location adjacent the open service access end: a first, longer, cross-sectional dimension; and, a second, shorter, cross-sectional dimension; the second, shorter cross-sectional dimension being a dimensional taken perpendicular to the first, longer, cross-sectional dimension, at a location half way across the first, longer, cross-sectional dimension and perpendicular thereto; the first member of the access cover-to-main filter cartridge projection/receiver arrangement comprises a receiver groove in the air flow outlet tube sheet extending generally parallel to the first, longer, cross-sectional dimension.

27. An air cleaner assembly according to characterization 26 wherein: the first member of the access cover-to-main filter cartridge projection/receiver arrangement comprises a receiver groove in the air flow outlet tube sheet that extends co-linear with the first, longer, cross-sectional dimension.

28. An air cleaner assembly according to any one of characterizations 26 and 27 wherein: the first member of the access cover-to-main filter cartridge projection/receiver arrangement comprises a receiver groove intersecting and centered on center point of the second, shorter, cross-sectional dimension.

29. An air cleaner assembly according to any one of characterizations 26 and 27 wherein: the first member of the access cover-to-main filter cartridge projection/receiver arrangement comprises a receiver groove that intersects the second, shorter, cross-section dimension at a location off-set from a center point of the second, shorter, cross-sectional dimension.

30. An air cleaner assembly according to any one of characterizations 20-29 wherein: the first member of the access cover-to-main filter cartridge projection/receiver arrangement is configured to only fully engage the second member of the access cover-to-main filter cartridge projection/receiver arrangement when the filter cartridge is in a single, selected, rotational orientation in the housing body.

31. An air cleaner assembly according to any one of characterizations 20-29 wherein: the first member of the access cover-to-main filter cartridge projection/receiver arrangement is configured to fully engage the second member of the access cover-to-main filter cartridge projection/receiver arrangement when the filter cartridge is in either one of two, selected, rotational orientations in the housing body.

32. An air cleaner assembly according to any one of characterizations 1-31 wherein: the precleaner comprises an outer cover and an inner cover; the outer cover and inner cover being separately formed pieces secured to one another.

33. An air cleaner assembly according to characterization 32 wherein: the outer cover and inner cover are removably secured to one another.

34. An air cleaner assembly according to any one of characterizations 32-33 wherein: the inner cover includes a perimeter wall section with a first member of a precleaner snap-fit projection/receiver connection arrangement thereon; and, the outer cover includes a perimeter wall section with a second member of the precleaner snap-fit projection/receiver connection arrangement thereon; the precleaner snap-fit projection/receiver connection arrangement securing the inner cover and outer cover together.

35. An air cleaner assembly according to characterization 34 wherein: the first member of a snap-fit projection/receiver arrangement comprises a plurality of spring projection members; and, the second member of a snap-fit projection/receiver arrangement comprises a plurality of receivers.

36. An air cleaner assembly according to any one of characterizations 1-35 wherein: the access cover includes an inner perimeter inner wall thereon surrounding; and, spaced from, the plurality of flow separator tubes and projecting into the housing body; the inner perimeter inner wall having an outer surface including a plurality of spaced, radially projecting, axial ribs thereon.

37. An air cleaner assembly according to characterization 30 wherein: the inner perimeter inner wall of the access cover includes a precleaner contaminant evacuation flow aperture therethrough; and, the access cover includes a radial containment projection extending around the precleaner contaminant evacuation flow aperture.

38. An air cleaner assembly according to characterization 37 wherein: the precleaner comprises an outer cover and an inner cover; the outer cover and inner cover being separately formed and secured to one another; and, the inner perimeter wall of the access cover having the precleaner evacuation flow aperture therethrough comprising at least a portion of an outer perimeter wall of the inner cover.

39. An air cleaner assembly according to characterization 38 wherein: the radial containment projection comprises: a first portion projecting radially outwardly from the outer perimeter wall of the inner cover; and, a second portion positioned on the outer cover.

40. An air cleaner assembly according to any one of characterizations 1-39 wherein: the media pack has a first media pack longer cross-dimension and a second media pack shorter cross-dimension; the first, media pack, longer cross-dimension being a cross-dimension taken in a plane perpendicular to a direction between the inlet end and the opposite outlet end; and, the second, media pack, shorter cross-dimension being taken halfway along the first, media pack, longer cross-dimension and in the plane perpendicular to a direction between the inlet end and the opposite outlet end.

41. An air cleaner assembly according to characterization 40 wherein: a ratio of the first, media pack, longer cross-dimension to the second, media pack, shorter cross-dimension is at least 1.4.

42. An air cleaner assembly according to any one of characterizations 40 and 41 wherein: a ratio of the first, media pack, longer cross-dimension to the second, media pack, shorter cross-dimension is at least 1.5.

43. An air cleaner assembly according to any one of characterizations 40-42 wherein: a ratio of the first, media pack, longer cross-dimension to the second, media pack, shorter cross-dimension is at least 1.8.

44. An air cleaner assembly according to any one of characterizations 40-43 wherein: a ratio of the first, media pack, longer cross-dimension to the second, media pack, shorter cross-dimension is within the range of 1.6-3.0, inclusive.

45. An air cleaner assembly according to characterization 44 wherein: a ratio of the first, media pack, longer cross-dimension to the second, media pack, shorter cross-dimension is within the range of 2.0-2.6, inclusive.

46. An air cleaner assembly according to any one of characterizations 1-45 wherein: the media pack is at least 100 mm long in extension between the first end, and the opposite, second, end.

47. An air cleaner assembly according to any one of characterizations 1-46 wherein: the media pack is at least 150 mm long in extension between the first end, and the opposite, second, end.

48. An air cleaner assembly according to any one of characterizations 1-47 wherein: the media pack is at least 200 mm long in extension between the first end, and the opposite, second, end.

49. An air cleaner assembly according to any one of characterizations 1-48 wherein: the media pack is at least 250 mm long in extension between the first end, and the opposite, second, end.

50. An air cleaner assembly according to any one of characterizations 1-49 wherein: the media pack has at least one cross-dimension, in a plane perpendicular to a direction between the first and second ends, of at least 250 mm.

51. An air cleaner assembly according to any one of characterizations 1-50 wherein: the media pack has at least one cross-dimension, in a plane perpendicular to a direction between the first and second ends, of at least 300 mm.

52. An air cleaner assembly according to any one of characterizations 1-51 wherein: the media pack has at least one cross-dimension, in a plane perpendicular to a direction between the first and second ends, of at least 380 mm.

53. An air cleaner assembly according to any one of characterizations 1-52 wherein: the media pack has an outer perimeter with a perimeter oval shape.

54. An air cleaner assembly according to any one of characterizations 1-53 wherein: the media pack has an outer perimeter with a perimeter oval shape having: two, opposite, straight sides; and, two, opposite, curved ends.

55. An air cleaner assembly according to any one of characterizations 1-54 wherein: the media pack comprises a coiled media strip arrangement.

56. An air cleaner assembly according to characterization 55 wherein: the coiled media strip arrangement comprises a coiled strip of a first media sheet secured to a second media sheet.

57. An air cleaner assembly according to any one of characterizations 55 and 56 wherein: the coiled media strip arrangement comprises a coiled strip of a fluted media sheet secured to a second media sheet.

58. An air cleaner assembly according to any one of characterizations 1-57 wherein: the main filter cartridge includes an outer shell surrounding the media pack and extending from the housing seal arrangement at least to an end of the media pack most remote from the housing seal arrangement.

59. An air cleaner assembly according to characterization 58 wherein: the outer shell includes an outlet end, remote from the housing seal arrangement, having a media support grid thereon.
60. An air cleaner assembly according to any one of characterizations 58-59 wherein: the outer shell includes an outlet end, remote from the housing seal arrangement, having a safety filter cartridge pressure flange thereon.
61. An air cleaner assembly according to characterization 60 wherein: the outer shell includes an outer shell outer perimeter edge, at the outlet end; the safety cartridge pressure flange being spaced radially inwardly from the outer shell outer perimeter edge.
62. An air cleaner assembly according to any one of characterizations 60 and 61 wherein: the safety cartridge pressure flange comprises at least one axial projection.
63. An air cleaner assembly according to any one of characterizations 60-62 wherein: the safety cartridge pressure flange is a single, continuous, axial ring projection.
64. An air cleaner assembly according to any one of characterizations 50-63 wherein: the outer shell, of the main filter cartridge, includes a perimeter, radially outwardly extending, projection arrangement thereon, having a portion embedded in the perimeter pinch seal of the housing seal arrangement.
65. An air cleaner assembly according to characterization 64 wherein: the perimeter projection arrangement on the outer shell comprises a perimeter flange having a plurality of resin flow apertures therethrough.
66. An air cleaner assembly according to any one of characterizations 1-65 wherein: the perimeter pinch seal includes a resilient portion molded directly to media of the media pack.
67. An air cleaner assembly according to any one of characterizations 1-66 wherein: the perimeter pinch seal includes a perimeter, axial, seal surface oriented facing in a direction corresponding to a direction of the outlet end of the media pack.
68. An air cleaner assembly according to characterization 67 wherein: the perimeter, axial, seal surface is spaced from the media by a housing portion receiving groove.
69. An air cleaner assembly according to characterization 68 wherein: the housing body includes main filter cartridge stabilizing flange projecting into the housing portion receiving groove to a location between the perimeter, axial, seal surface and the media pack.
70. An air cleaner assembly according to characterization 69 wherein: the main filter cartridge includes a peripheral seal mounting projection projecting radially outwardly from the media pack and into the housing seal arrangement.
71. An air cleaner assembly according to characterization 70 wherein: the main filter cartridge includes an outer shell surrounding the media pack and extending from the housing seal arrangement at least to an end of the media pack remote from the housing seal arrangement; and, the peripheral seal mounting projection is a radially outwardly extending flange on the outer shell.
72. An air cleaner assembly according to any one of characterizations 67-71 wherein: the perimeter, axial, seal surface, of the perimeter pinch seal, is a contoured surface.
73. An air cleaner assembly according to any one of characterizations 66-72 wherein: the perimeter, axial, seal surface includes a contoured shape with at least two, spaced, axial projection sections thereon.
74. An air cleaner assembly according to any one of characterizations 66-72 wherein: the perimeter, axial, seal surface has an oval ring shape with: two, opposite, straight sides, and, two, opposite, curved ends.
75. An air cleaner assembly according to characterization 74 wherein: the perimeter, axial, seal surface has a contoured shape with at least one axial projection section positioned in overlap with a first one of the two, opposite, straight sides.
76. An air cleaner assembly according to characterization 75 wherein: the perimeter, axial, seal surface has a contoured shape with at least two, spaced, axial, projection sections in overlap with a first one of the two, opposite, straight sides.
77. An air cleaner assembly according to any one of characterizations 75-76 wherein: the perimeter, axial seal surface has a contoured shape with at least one axial projection section positioned in overlap with each one of the two, opposite, straight sides.
78. An air cleaner assembly according to any one of characterizations 75-77 wherein: each projection section, of the perimeter, axial, seal surface, has a relative projection relief of at least 3 mm.
79. An air cleaner assembly according to any one of characterizations 1-78 wherein: the perimeter pinch seal has an outer, peripheral, radially outwardly directed surface with at least one recess section therein.
80. An air cleaner assembly according to any one of characterizations 1-79 wherein: the perimeter pinch seal has an outer, peripheral, radially outwardly directed surface with at least two, spaced, recessed sections therein.
81. An air cleaner assembly according to any one of characterizations 79-80 wherein: the outer, peripheral, radially outwardly directed perimeter surface has a perimeter shape with two, opposite, straight sides and two, opposite, curved ends.
82. An air cleaner assembly according to characterization 81 wherein: each one of the two, opposite, straight sides of the radially directed perimeter surface, has at least one recessed section thereon.
83. An air cleaner assembly according to any one of characterizations 81 and 82 wherein: at least one of the two, opposite, sides has at least two spaced recessed sections therein.
84. An air cleaner assembly according to any one of characterizations 79-83 wherein: a recess section, in the outer, peripheral, radially outwardly directed surface, includes an inner step therein having an upper, curved, edge; the upper, curved edge facing in a direction corresponding to a direction of the outlet end of the media pack.
85. An air cleaner assembly according to characterization 84 wherein: a recess section, in the outer, peripheral, radially outwardly directed surface, includes an inner step configured with two upper, curved edge section, each curving in extension toward a center and in a direction corresponding to the outlet end of the media pack.
86. An air cleaner assembly according to characterization 85 wherein: each recess section, in the outer, peripheral radially outwardly directed surface, has a maximum depth of relative recess of at least 1 mm.
87. An air cleaner assembly according to any one of characterizations 79-86 wherein: the perimeter pinch seal includes a perimeter, axial, seal surface oriented facing in a direction corresponding to a direction of the outlet end of the media pack; the perimeter, axial, seal surface being a contoured surface with at least one axial projection section oriented aligned with each recess section in the outer, peripheral, radially outwardly directed surface of the perimeter pinch seal.

88. An air cleaner assembly according to any one of characterizations 1-87 wherein: the access cover includes a main filter cartridge pressure flange therein; the perimeter pinch seal being engaged by the main filter cartridge pressure flange and press against the main filter cartridge sealing shelf 89. An air cleaner assembly according to any one of characterizations 1-88 wherein: the housing body includes a perimeter, axial, rib projection on the main filter cartridge sealing shelf and oriented axially pressed into the perimeter pinch seal.

90. An air cleaner assembly according to characterization 89 wherein: the perimeter, axial, rib projection on the main filter cartridge sealing shelf is a continuous rib, in extension around an interior of the housing body.

91. An air cleaner assembly according to any one of characterizations 1-90 wherein: the main filter cartridge sealing shelf is positioned between an axially extending portion of the housing body extending toward the open service access end, and, an air flow outlet end of the housing body.

92. An air cleaner assembly according to any one of characterizations 1-91 wherein: the main filter cartridge sealing shelf includes at least one seal projection contour receiving recess therein.

93. An air cleaner assembly according to any one of characterizations 1-92 wherein: the main filter cartridge sealing shelf includes at least two seal projection contour receiving recesses therein.

94. An air cleaner assembly according to characterization 93 wherein: the main air filter cartridge sealing shelf has a perimeter shape with two, opposite, straight sides; and, at least one seal projection contour receiving recess is oriented in each one of the two, opposite, straight sides.

95. An air cleaner assembly according to any one of characterizations 92-94 wherein: the main filter cartridge sealing shelf at least two seal projection contour reading recess are located in one of the straight sides.

96. An air cleaner assembly according to any one of characterizations 1-95 wherein: the main filter cartridge is shaped and configured such that it can be fully installed in any one of only two rotational orientations, relative to the housing.

97. An air cleaner assembly according to any one of characterizations 1-95 wherein: the main filter cartridge is shaped and configured such that it can be fully installed in only one rotational orientation, relative to the housing.

98. An air cleaner assembly according to any one of characterizations 1-97 wherein: the access cover is shaped and configured to be mountable on the housing body, in only one rotational orientation.

99. An air cleaner assembly according to any one of characterizations 1-98 including: a resilient weather basket between the access cover and the housing body.

100. An air cleaner assembly according to any one of characterizations 1-99 including: a safety filter cartridge separate from the main filter cartridge, positioned in the housing body at a location between the main filter cartridge and the air flow outlet arrangement.

101. An air cleaner assembly according to characterization 100 wherein: the safety filter cartridge comprises pleated media.

102. An air cleaner assembly according to any one of characterizations 100-101 wherein: the safety filter cartridge includes a frame surrounding media.

103. An air cleaner assembly according to any one of characterizations 100-102 wherein: the safety filter cartridge includes a resilient, peripheral, safety seal member thereon.

104. An air cleaner assembly according to characterization 103 wherein: the resilient, peripheral, safety seal member includes an axially directed seal surface oriented directed away from the main filter cartridge.

105. An air cleaner assembly according to characterization 104 wherein: the housing includes a safety filter cartridge sealing shelf thereon, removably, sealingly, engaged by the axially directed seal surface on the safety seal member.

106. An air cleaner assembly according to characterization 105 wherein: the safety filter cartridge sealing shelf includes a safety cartridge engaging rib projecting into the axial directed seal surface on the safety seal member.

107. An air cleaner assembly according to characterization 105 wherein: the safety cartridge engaging rib is a continuous, peripheral, rib.

108. An air cleaner assembly according to any one of characterizations 100-107 wherein: the safety filter cartridge includes a handle arrangement thereon projecting toward the main filter cartridge.

109. An air cleaner assembly according to characterization 108 wherein: the handle arrangement comprises two, spaced, handle projections.

110. An air cleaner assembly according to characterization 109 wherein: the safety filter cartridge includes a perimeter shape with a first, longer, safety filter cartridge cross-dimension and a second, shorter, safety filter cross-dimension halfway along the longer, safety filter, cross-dimension; each of the first and second cross-dimensions being in a plane perpendicular to an air flow direction through the safety filter cartridge.

111. An air cleaner assembly according to characterization 110 wherein: the handle arrangement includes two, elongate, spaced projections each extending in a general direction of the first, longer, safety filter cross-dimension.

112. An air cleaner assembly according to any one of characterizations 100-111 wherein: the safety filter cartridge includes media surrounded by a frame; the safety filter cartridge includes a resilient arrangement thereon: located between the frame and a surrounding portion of the housing body; and, compressed radially against the surrounding portion of the housing body.

113. An air cleaner assembly according to characterization 112 wherein: the resilient arrangement comprises a plurality of axial projections.

114. An air cleaner assembly according to characterization 113 wherein: the safety filter cartridge includes a molded-in-place safety filter axial pinch seal; and, the resilient arrangement comprises a plurality of projections molded integral with the safety filter axial pinch seal.

115. An air cleaner assembly according to any one of characterizations 1-114 wherein: the flow separator tube arrangement is configured to project at least 40 mm into the housing body.

116. An air cleaner assembly according to any one of characterizations 1-115 wherein: the flow separator tube arrangement is configured to project at least 60 mm into the housing body.

117. An air cleaner assembly according to any one of characterizations 1-116 wherein: the flow separator tube arrangement is configured to project at least 80 mm into the housing body.
118. An air cleaner assembly comprising: a housing including: a housing body; an access cover; an air flow inlet arrangement and an air flow outlet arrangement; the housing body having an open service access end; an air flow outlet; a main filter cartridge sealing shelf recessed from the service access end; and, a safety filter cartridge sealing shelf recessed from the service access end with the main filter cartridge receiving shelf being positioned between the service access end and the safety filter cartridge sealing shelf; and, the access cover including an inner projection with a perimeter rim projecting into the housing body to a location surrounded by the housing body; and, a main filter cartridge removably positioned within the housing body; the main filter cartridge comprising; a media pack having an inlet end and an opposite outlet end; and, a housing seal arrangement comprising a perimeter pinch seal positioned biased against the main cartridge sealing shelf by the inner projection on the access cover; and, a safety filter cartridge, separate from the main filter cartridge, having a perimeter seal removably biased against the safety filter cartridge sealing shelf, by the main filter cartridge.
119. An air cleaner assembly according to characterization 118 wherein: the inner perimeter rim extends over an axial distance of at least 50 mm.
120. An air cleaner assembly according to any one of characterizations 118-119 wherein: the inner perimeter rim includes a side air flow aperture arrangement therethrough.
121. An air cleaner assembly according to any one of characterizations 118-120 wherein: the inner projection has an outer surface with a plurality of spaced, axially extending, projection ribs thereon.
122. An air cleaner assembly comprising: a housing including an air flow inlet and an air flow outlet; the housing comprising a housing body and an access cover; housing body having an open service access end; an air flow outlet; and, a main filter cartridge sealing shelf recessed from the service access end; and, the access cover including an inner projection with a perimeter rim projecting into the housing body to a location surrounded by the housing body; and, the inner perimeter rim extending over an axial distance of at least 50 mm; the inner perimeter rim including a side air flow aperture arrangement therethrough; and, the inner projection having an outer surface with a plurality of spaced, axially extending, projection ribs thereon.
123. An air cleaner assembly according to any one of characterizations 118-122 wherein: the housing body has an interior with, at a location adjacent the open service access end: a first, longer, cross-sectional dimension; and, a second, shorter, cross-sectional dimension; the second, shorter cross-sectional dimension being a dimensional taken perpendicular to the first, longer, cross-sectional dimension, at a location half way across the first, longer, cross-sectional dimension and perpendicular thereto.
124. An air cleaner assembly according to characterization 123 wherein: a ratio of the first, longer, cross-sectional dimension to the second, shorter, cross-sectional dimension is at least 1.4.
125. An air cleaner assembly according to any one of characterizations 123-124 wherein: a ratio of the first, longer, cross-sectional dimension to the second, shorter, cross-sectional dimension is at least 1.7.
126. An air cleaner assembly according to any one of characterizations 123-125 wherein: a ratio of the first, longer, cross-sectional dimension to the second, shorter, cross-sectional dimension is within the range of 1.8-3.5, inclusive.
127. An air cleaner assembly according to any one of characterizations 118-126 wherein: the air cleaner housing includes a side air flow inlet.
128. An air cleaner assembly according to any one of characterizations 118-127 wherein: the media pack is at least 100 mm long in extension between the first end, and the opposite, second, end.
129. An air cleaner assembly according to any one of characterizations 118-127 wherein: a ratio of the first, media pack, longer cross-dimension to the second, media pack, shorter cross-dimension is at least 1.4.
130. An air cleaner assembly according to any one of claims 118-127 wherein: a ratio of the first, media pack, longer cross-dimension to the second, media pack, shorter cross-dimension is at least 1.7.
131. An air cleaner assembly according to any one of characterizations 118-127 wherein: the media pack is at least 150 mm long in extension between the first end, and the opposite, second, end.
132. An air cleaner assembly according to any one of characterizations 118-131 wherein: the media pack has at least one cross-dimension, in a plane perpendicular to a direction between the first and second ends, of at least 250 mm.
133. An air cleaner assembly according to any one of characterizations 118-132 wherein: the media pack has at least one cross-dimension, in a plane perpendicular to a direction between the first and second ends, of at least 300 mm.
134. An air cleaner assembly according to any one of characterizations 118-133 wherein: the media pack has at least one cross-dimension, in a plane perpendicular to a direction between the first and second ends, of at least 380 mm.
135. An air cleaner assembly according to any one of characterizations 118-139 wherein: the media pack has an outer perimeter with a perimeter oval shape.
136. An air cleaner assembly according to any one of characterizations 118-136 wherein: the media pack has an outer perimeter with a perimeter oval shape having: two, opposite, straight sides; and, two, opposite, curved ends.
137. An air cleaner assembly according to any one of characterizations 118-136 wherein: the media pack comprises a coiled media strip arrangement.
138. An air cleaner assembly according to characterizations 118-137 wherein: the coiled media strip arrangement comprises a coiled strip of a first media sheet secured to a second media sheet.
139. An air cleaner assembly according to any one of characterizations 118-138 wherein: the coiled media strip arrangement comprises a coiled strip of a fluted media sheet secured to a second media sheet.
140. An air cleaner assembly according to any one of characterizations 118-139 wherein: the main filter cartridge includes an outer shell surrounding the media pack and extending from the housing seal arrangement at least to an end of the media pack most remote from the housing seal arrangement.

141. An air cleaner assembly according to characterization 140 wherein: the outer shell includes an outlet end, remote from the housing seal arrangement, having a media support grid thereon.

142. An air cleaner assembly according to any one of characterizations 140-141 wherein: the outer shell includes an outlet end, remote from the housing seal arrangement, having a safety filter cartridge pressure flange thereon.

143. An air cleaner assembly according to characterization 142 wherein: the outer shell includes an outer shell outer perimeter edge, at the outlet end; the safety cartridge pressure flange being spaced radially inwardly from the outer shell outer perimeter edge.

144. An air cleaner assembly according to any one of characterizations 142 and 143 wherein: the safety cartridge pressure flange comprises at least one axial projection.

145. An air cleaner assembly according to any one of characterizations 142-144 wherein: the safety cartridge pressure flange is a single, continuous, axial ring projection.

146. An air cleaner assembly according to any one of characterizations 132-145 wherein: the outer shell, of the main filter cartridge, includes a perimeter, radially outwardly extending, projection arrangement thereon, having a portion embedded in the perimeter pinch seal of the housing seal arrangement.

147. An air cleaner assembly according to characterization 146 wherein: the perimeter projection arrangement on the outer shell comprises a perimeter flange having a plurality of resin flow apertures therethrough.

148. An air cleaner assembly according to any one of characterizations 118-147 wherein: the perimeter pinch seal includes a perimeter, axial, seal surface oriented facing in a direction corresponding to a direction of the outlet end of the media pack.

149. An air cleaner assembly according to characterization 148 wherein: the perimeter, axial, seal surface is spaced from the media by a housing portion receiving groove.

150. An air cleaner assembly according to characterizations 118-149 wherein: the housing body includes main filter cartridge stabilizing flange projecting into the housing portion receiving groove to a location between the perimeter, axial, seal surface and the media pack.

151. An air cleaner assembly according to characterization 150 wherein: the main filter cartridge includes a peripheral seal mounting projection projecting radially outwardly from the media pack and into the housing seal arrangement.

152. An air cleaner assembly according to characterization 151 wherein: the main filter cartridge includes an outer shell surrounding the media pack and extending from the housing seal arrangement at least to an end of the media pack remote from the housing seal arrangement; and, the peripheral seal mounting projection is a radially outwardly extending flange on the outer shell.

153. An air cleaner assembly according to any one of characterizations 148-152 wherein: the perimeter, axial, seal surface, of the perimeter pinch seal, is a contoured surface.

154. A main air filter cartridge removeable for use in an air cleaner assembly; the air filter cartridge comprising; a media pack comprising media extending between inlet and outlet opposite, flow ends; a housing seal arrangement comprising a perimeter pinch seal; a shell surrounding the media pack and extending at least from the perimeter pinch seal to at least the outlet flow end of the media; the shell having an outlet end rim remote from the media inlet end; and, a safety filter cartridge pressure flange positioned on the shell at a location spaced radially inwardly from the end rim.

155. A main filter cartridge according to characterization 60 including: main cartridge features characterized in any one of air cleaner assembly characterizations 1-154.

What is claimed is:

1. An air cleaner assembly comprising:
   (a) a housing including: a housing body; and, an access cover;
      (i) the housing body having: an open service access end; and, a main filter cartridge sealing shelf recessed from the open service access end;
      (ii) the access cover comprising a precleaner assembly including a flow separator tube arrangement comprising a plurality of cyclonic flow separator tubes;
         (A) the access cover being removably mounted on the housing body over the service access end and with the flow separator tube arrangement projecting into the housing body to a location surrounded by the housing body; and,
      (iii) the housing body including: an air flow inlet arrangement; an air flow outlet arrangement; and, a contaminant evacuation port arrangement; and,
   (b) a main filter cartridge removably positioned within the housing body; the main filter cartridge comprising;
      (i) a media pack having an inlet end and an opposite outlet end; and,
      (ii) a housing seal arrangement comprising a perimeter pinch seal removably positioned sealingly biased against the main cartridge sealing shelf.

2. An air cleaner assembly according to claim 1 wherein:
   (a) the housing body includes a funnel bottom section adjacent the service access end;
      (i) an evacuator tube being oriented in a lower most portion of the funnel bottom section.

3. An air cleaner assembly according to claim 1 wherein:
   (a) the precleaner assembly includes an inner cover comprising an air flow outlet tube sheet extending across an air flow direction through the precleaner assembly;
      (i) the air flow outlet tube sheet including a first member of an access cover-to-main filter cartridge projection/receiver arrangement thereon; and
      (ii) the main filter cartridge including a second member of an access cover-to-main filter cartridge projection/receiver arrangement thereon;
      (iii) the first and second members of the access cover-to-main filter cartridge projection/receiver arrangement being configured to engage at a location in axial overlap with the inlet end of the media pack of the main filter cartridge.

4. An air cleaner assembly according to claim 1 wherein:
   (a) the precleaner assembly comprises an outer cover and an inner cover;
      (i) the outer cover and inner cover being separately formed pieces secured to one another.

5. An air cleaner assembly according to claim 1 wherein:
   (a) the media pack comprises a coiled media strip arrangement.

6. An air cleaner assembly according to claim 1 wherein:
   (a) the access cover includes a main filter cartridge pressure flange therein;
      (i) the perimeter pinch seal being engaged by the main filter cartridge pressure flange and press against the main filter cartridge sealing shelf.

7. An air cleaner assembly according to claim 1 wherein:
(a) the housing body includes a perimeter, axial, rib projection on the main filter cartridge sealing shelf and oriented axially pressed into the perimeter pinch seal.

8. An air cleaner assembly according to claim 1 wherein:
(a) the main filter cartridge is shaped and configured such that it can be fully installed in only one rotational orientation, relative to the housing.

9. An air cleaner assembly according to claim 1 including:
(a) a safety filter cartridge separate from the main filter cartridge, positioned in the housing body at a location between the main filter cartridge and the air flow outlet arrangement.

10. An air cleaner assembly according to claim 1 wherein:
(a) the access cover includes a perimeter wall thereon surrounding, and spaced from, the plurality of flow separator tubes and projecting into the housing body;
   (i) the perimeter wall on the access cover having a precleaner evacuation aperture arrangement therethrough.

11. An air cleaner assembly according to claim 10 wherein:
(a) the housing body has an interior with, at a location adjacent the open service access end:
   (i) a first, longer, cross-sectional dimension; and,
   (ii) a second, shorter, cross-sectional dimension; the second, shorter cross-sectional dimension being a dimensional taken perpendicular to the first, longer, cross-sectional dimension, at a location half way across the first, longer, cross-sectional dimension and perpendicular thereto.

12. An air cleaner assembly according to claim 11 wherein:
(a) the contaminant evacuation port arrangement, in the housing, comprises a tube directed away from a remainder of the housing in a direction generally corresponding to a direction of extension of the first, longer, cross-sectional dimension.

13. An air cleaner assembly according to claim 12 wherein:
(a) the flow separator tube arrangement comprises at least first and second, spaced, linear rows of flow separator tubes; the first and second, spaced, linear rows each extending in a direction corresponding to a direction of extension of the first, longer, cross-sectional dimension of the housing body interior.

14. An air cleaner assembly according to claim 1 wherein:
(a) the access cover includes an inner perimeter inner wall thereon surrounding; and, spaced from, the plurality of flow separator tubes and projecting into the housing body;
   (i) the inner perimeter inner wall having an outer surface including a plurality of spaced, radially projecting, axial ribs thereon.

15. An air cleaner assembly according to claim 14 wherein:
(a) the inner perimeter inner wall of the access cover includes a precleaner contaminant evacuation flow aperture therethrough; and,
(b) the access cover includes a radial containment projection extending around the precleaner contaminant evacuation flow aperture.

16. An air cleaner assembly according to claim 15 wherein:
(a) the precleaner comprises an outer cover and an inner cover;
   (i) the outer cover and inner cover being separately formed and secured to one another; and,
   (ii) the inner perimeter wall of the access cover having the precleaner evacuation flow aperture therethrough comprising at least a portion of an outer perimeter wall of the inner cover.

17. An air cleaner assembly according to claim 16 wherein:
(a) the radial containment projection comprises:
   (i) a first portion projecting radially outwardly from the outer perimeter wall of the inner cover; and,
   (ii) a second portion positioned on the outer cover.

18. An air cleaner assembly according to claim 1 wherein:
(a) the perimeter pinch seal includes a resilient portion molded directly to media of the media pack.

19. An air cleaner assembly according to claim 18 wherein:
(a) the perimeter pinch seal includes an axial seal surface spaced from the media by a housing portion receiving groove.

* * * * *